United States Patent
Oga

(10) Patent No.: US 8,447,224 B2
(45) Date of Patent: *May 21, 2013

(54) DATA PROCESSING TERMINAL SYSTEM AND TRANSMITTING AND RECEIVING METHOD USING THE SAME

(75) Inventor: Toshiyuki Oga, Tokyo (JP)

(73) Assignee: NEC Corporation, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 13/370,037

(22) Filed: Feb. 9, 2012

(65) Prior Publication Data

US 2012/0155517 A1 Jun. 21, 2012

Related U.S. Application Data

(62) Division of application No. 12/193,829, filed on Aug. 19, 2008, now Pat. No. 8,126,390, which is a division of application No. 10/551,415, filed as application No. PCT/JP2004/004618 on Mar. 31, 2004, now Pat. No. 7,471,926.

(30) Foreign Application Priority Data

Apr. 1, 2003 (JP) .................... 2003-098295

(51) Int. Cl.
*H04K 3/00* (2006.01)
(52) U.S. Cl.
USPC .............................. 455/1; 455/313; 455/323
(58) Field of Classification Search
USPC ............. 455/1, 313, 323, 333, 334, 424, 500, 455/502, 554.2, 556.1, 557
See application file for complete search history.

(56) References Cited

U.S. PATENT DOCUMENTS

| 5,535,252 A | 7/1996 | Kobayashi |
| 6,078,502 A | 6/2000 | Rostoker et al. |
| 6,700,943 B1 | 3/2004 | Miller |
| 6,766,153 B2 | 7/2004 | Kozak et al. |

(Continued)

FOREIGN PATENT DOCUMENTS

| JP | 6-14069 A | 1/1994 |
| JP | 6-284159 A | 10/1994 |

(Continued)

OTHER PUBLICATIONS

U.S. Non-Final Office Action dated Jun. 25, 2012 issued in corresponding U.S. Appl. No. 13/350,289.

(Continued)

*Primary Examiner* — Tuan H Nguyen
(74) *Attorney, Agent, or Firm* — Sughrue Mion, PLLC

(57) ABSTRACT

An information processing terminal system includes an information processing terminal (6); and a transmitting and receiving unit (5) which is attached to the information processing terminal. The transmitting and receiving unit (5) converts a reception wave signal from a network into a reception analog baseband signal. The transmitting and receiving unit (5) converts the reception analog baseband signal into a reception digital baseband signal in synchronization with a clock. The information processing terminal (6) converts the reception digital baseband signal into a reception data in synchronization with a clock, and a transmission data into a transmission digital baseband signal in synchronization with the clock. The transmitting and receiving unit (5) converts the transmission digital baseband signal into a transmission analog baseband signal in synchronization with the clock. The transmitting and receiving unit (5) converts the transmission analog baseband signal into a transmission modulation wave signal to output to the network.

14 Claims, 27 Drawing Sheets

U.S. PATENT DOCUMENTS

| | | |
|---|---|---|
| 6,839,447 B2 * | 1/2005 | Nielsen et al. ............... 381/312 |
| 7,050,779 B2 | 5/2006 | Ono et al. |
| 2003/0118081 A1 | 6/2003 | Philips et al. |

FOREIGN PATENT DOCUMENTS

| | | | |
|---|---|---|---|
| JP | 6311104 A | 11/1994 |
| JP | 7-177055 A | 7/1995 |
| JP | 08139656 A | 5/1996 |
| JP | 8-149035 A | 6/1996 |
| JP | 08149035 A | 6/1996 |
| JP | 10135922 A | 5/1998 |
| JP | 10200647 A | 7/1998 |
| JP | 11-122377 A | 4/1999 |
| JP | 11191741 A | 7/1999 |
| JP | 11220698 A | 8/1999 |
| JP | 11-346186 A | 12/1999 |
| JP | 200013279 A | 1/2000 |
| JP | 2000013269 A | 1/2000 |
| JP | 200092142 A | 3/2000 |
| JP | 2000115120 A | 4/2000 |
| JP | 2000151553 A | 5/2000 |
| JP | 2000165270 A | 6/2000 |
| JP | 2000224286 A | 8/2000 |
| JP | 200124542 A | 1/2001 |
| JP | 200128066 A | 1/2001 |
| JP | 200144882 A | 2/2001 |
| JP | 2001-103099 A | 4/2001 |
| JP | 2001196869 A | 7/2001 |
| JP | 2001223760 A | 8/2001 |
| JP | 2001245344 A | 9/2001 |
| JP | 200264399 A | 2/2002 |
| JP | 2002141862 A | 5/2002 |
| JP | 2002183692 A | 6/2002 |
| JP | 2002190765 A | 7/2002 |
| JP | 2002314449 A | 10/2002 |
| JP | 2002-328745 A | 11/2002 |
| JP | 2002351813 A | 12/2002 |
| JP | 2003018229 A | 1/2003 |
| JP | 200264845 A | 2/2003 |
| WO | 98/20407 A | 5/1998 |
| WO | WO 02101640 A1 | 12/2002 |

OTHER PUBLICATIONS

Japanese Office Action issued in Japanese Application No. 2011-211617 dated Oct. 4, 2012.

* cited by examiner

DATA PROCESSING TERMINAL SYSTEM AND TRANSMITTING AND RECEIVING METHOD USING THE SAME

CROSS REFERENCE TO RELATED APPLICATIONS

This application is a divisional of U.S. patent application Ser. No. 12/193,829, filed Aug. 19, 2008, which is a divisional of U.S. patent application Ser. No. 10/551,415, filed Nov. 17, 2005, which is a National Stage of International Application No. PCT/JP2004/004618, filed Mar. 31, 2004, which claims priority from Japanese Patent Application No. 2003-098295, filed on Apr. 1, 2003, the contents of all of which are incorporated herein by reference in their entirety.

TECHNICAL FIELD

The present invention relates to a data processing terminal system, in which a communication apparatus as a transmitting and receiving apparatus and a data processing terminal are combined, and a transmitting and receiving method of the same.

BACKGROUND ART

Connection to a network using a data processing terminal has been frequently conducted. In accordance with this, a communication system to connect to the network by radio has been developed in a communication apparatus for connecting to the network by radio in particular, has good compatibility with the data processing terminal having a built-in microprocessor, and is often incorporated as a part of the data processing terminal. Therefore, as a condition required for a radio interface, in addition to the condition required for a general communication apparatus, it is necessary to meet the condition required for the data processing terminal, which specifically is a small size, low power consumption, and small generated heat. On the other hand, there is a demand for higher transmission capacity.

As the data processing terminal system in a first conventional example, a "software radio apparatus" is mentioned in Japanese Laid Open Patent Application 2002-64399. The data processing terminal system in the first conventional example has a CPU (Central Processing Unit), an antenna control unit, a RF/IF unit, a D/A converter, and an A/D converter.

In the first conventional example, the CPU is provided for the purpose of controlling a communication function block, and the CPU is not mounted to the data processing terminal system for the purpose of carrying out a general data processing as considered as an original intended purpose of the data processing terminal (for example, the processing other than communication, such as spreadsheet processing and word-processing). For this reason, in the data processing terminal system in the first conventional example, the signal processing section (CPU) is tightly connected through dedicated signal lines, with the antenna control unit, the RF/IF unit, the D/A converter, the A/D converter, and the like, all of which are not configured to be easily taken out.

However, since a function of the communication apparatus is not used when the connection to the network is not carried out, it is desirable that the data processing terminal system has a configuration in which the communication apparatus can be easily attached and detached optionally, in order not to lose portability in using the data processing terminal system as the data processing terminal.

FIG. 1 shows a configuration of the data processing terminal system using a microwave-band quadrature amplitude modulation wave, as the data processing terminal system in a second conventional example. The data processing terminal system in the second conventional example has the antenna 51, a microwave transmitting and receiving unit 17, and a microprocessor signal processing unit 18. The antenna 51 and the microwave transmitting and receiving unit 17 are a transmitting and receiving apparatus (communication apparatus). The microprocessor signal processing unit 18 is a data processing terminal.

The microwave transmitting and receiving unit 17, at the time of reception, demodulates a reception RF (Radio Frequency) signal as a modulation wave received through the antenna 51 to reception data, and outputs the demodulated reception data to the microprocessor signal processing unit 18. The microwave transmitting and receiving unit 17, at the time of transmission, converts transmission data from the microprocessor signal processing unit 18 into a transmission RF signal as the modulation wave, and transmits the converted transmission RF signal through the antenna 51.

The microwave transmitting and receiving unit 17 is provided with a high-frequency processing unit 21, and a modulation and demodulation processing unit 89.

The high-frequency processing unit 21, at the time of the reception, converts the reception RF signal received through the antenna 51 into a reception IF (Intermediate Frequency) signal; and outputs the converted reception IF signal to the modulation and demodulation processing unit 89. The high-frequency processing unit 21, at the time of the transmission, converts a transmission IF signal from the modulation and demodulation processing unit 89 into the transmission RF signal, and outputs the converted transmission RF signal through the antenna 51.

The modulation and demodulation processing unit 89, at the time of the reception, converts the reception IF signal from the high-frequency processing unit 21 into the reception data, and outputs the converted reception data to the microprocessor signal processing unit 18. The modulation and demodulation processing unit 89, at the time of the transmission, converts the transmission data from the microprocessor signal processing unit 18 into the transmission IF signal, and outputs the converted transmission IF signal to the high-frequency processing unit 21.

The high-frequency processing unit 21 is provided with a duplexer (DUP) 52, a low noise amplifier (LNA) 53, band-pass filters (BPF) 54, 56, 60, and 62, frequency converters (CONV) 55 and 61, local oscillators (OSC) 57 and 58, and a power amplifier (PA) 59.

The duplexer (DUP) 52 is provided with a reception signal band-pass filter (not shown) and a transmission signal band-pass filter (not shown).

The local oscillators (OSC) 57 and 58 generate a local oscillation signal.

The modulation and demodulation processing unit 89 is provided with a demodulator (DEM) 70, a modulator (MOD) 23, and a baseband processing unit. The base band processing unit is provided with analog/digital (A/D) converters 24-1 and 24-2, digital/analog (D/A) converters 25-1 and 25-2, a clock generator (CLOCK GEN) 27, a decoder (DEC) 71, an encoder (ENC) 72, and a microwave transmitting and receiving unit interface (I/F) 73.

The demodulator (DEM) 70 is provided with a carrier-wave recovering circuit (not shown) and a reception symbol clock recovering circuit (not shown).

The microwave transmitting and receiving unit interface (I/F) 73 is provided with a reception data buffer circuit (not shown), a transmission data buffer circuit (not shown), an identification data processing circuit (not shown), and a timing adjusting circuit (not shown).

The microprocessor signal processing unit 18 is provided with a clock generator (CLOCK GEN) 30, a microprocessor signal processing unit interface (I/F) 74, and a microprocessor signal processing circuit 75 as a CPU.

The clock generator 30 generates a reference clock, and outputs the generated reference clock to the microprocessor signal processing unit interface 74 and the microprocessor signal processing circuit 75. The microprocessor signal processing unit interface 74 outputs a bus clock signal synchronous with the reference clock, to the microwave transmitting and receiving unit interface 73.

The microprocessor signal processing unit interface 74 is provided with the reception data buffer circuit (not shown), the transmission data buffer circuit (not shown), and the timing adjusting circuit (not shown).

The microprocessor signal processing circuit (CPU) 75 has a microprocessor (not shown), a memory (not shown), an input and output unit (not shown), and the like. A plurality of programs (not shown) are stored in the memory.

The microprocessor signal processing circuit (CPU) 75 carries out the general data processing (processing other than the communication function) based on a general program (for example, a spreadsheet processing program and a word-processing program) (not shown) among a plurality of programs stored in the memory. The data processing terminal system of the second conventional example is configured to be able to attach and detach the microwave transmitting and receiving unit 17. When the general data processing is carried out, the function of the microwave transmitting and receiving unit 17 is not used. For this reason, a user can separate the microwave transmitting and receiving unit 17 and the microprocessor signal processing unit 18, and use the data processing terminal system in the second conventional example as the data processing terminal, only with the function of the microprocessor signal processing unit 18.

Next, an operation when the data processing terminal system in the second conventional example receives a signal will be described.

In the reception signal band-pass filter of the duplexer (DUP) 52, a frequency band of the reception RF signal is set. The reception signal band-pass filter extracts only the reception RF signal received through the antenna 51, and outputs the extracted reception RF signal to the low noise amplifier (LNA) 53. In case of a quadrature amplitude modulation signal (QAM modulation signal), the reception RF signal is a signal having a carrier-wave frequency generated by carrying out quadrature modulation to a reception analog baseband signal (reception analog BB signal) having a symbol frequency (reception symbol frequency), by use of an in-phase carrier wave and a quadrature carrier wave that is shifted by 90 degrees in phase from the in-phase carrier wave.

The low noise amplifier (LNA) 53 amplifies the reception RF signal from the duplexer (DUP) 52 to a level enough for the demodulator (DEM) 70 to carry out a signal processing. The low noise amplifier (LNA) 53 then outputs the amplified reception RF signal to the frequency converter (CONV) 55 through the band-pass filter (BPF) 54. An undesired frequency component other than the carrier-wave frequency band set in the band-pass filter (BPF) 54 is removed from the reception RF signal from the low noise amplifier (LNA) 53.

The frequency converter (CONV) 55 mixes the reception RF signal obtained by removing the undesired frequency component, with the local oscillation signal generated by the local oscillator (OSC) 57 to convert into the reception intermediate frequency signal (reception IF signal). The frequency converter (CONV) 55 outputs the converted reception IF signal to the modulation and demodulation processing unit 89 through the band-pass filter (BPF) 56. The carrier-wave frequency band set in the band-pass filter (BPF) 56 is selected for the reception IF signal from the frequency converter (CONV) 55.

The demodulator (DEM) 70 converts the reception IF signal from the band-pass filter (BPF) 56 into the reception analog baseband signal (reception analog BB signal). In the case of the QAM modulation signal, the demodulator (DEM) 70 recovers the carrier wave of the reception IF signal, and carries out the coherent detection. That is, the carrier-wave recovering circuit of the demodulator (DEM) 70 generates (recovers) the in-phase carrier wave and the quadrature carrier wave from the reception IF signal. The demodulator (DEM) 70 carries out the coherent detection to the QAM modulation waves (the in-phase carrier wave and the quadrature carrier wave) to convert the QAM modulation waves (the in-phase carrier wave and the quadrature carrier wave) into an analog in-phase component signal (analog I signal) and an analog quadrature component signal (analog Q signal) as the reception analog BB signal, and to output the converted analog I signal and analog Q signal to the A/D converters 24-1 and 24-2.

A reception symbol clock recovering circuit of the demodulator (DEM) 70 generates (recovers) the reception symbol clock that has the frequency n times (n is an integer number) larger than the reception symbol frequency, and is superimposed on the reception IF signal. The reception symbol clock recovering circuit of the demodulator (DEM) 70 outputs the generated (recovered) reception symbol clock to the A/D converters 24-1 and 24-2, the decoder (DEC) 71, and the microwave transmitting and receiving unit interface 73.

The A/D converters 24-1 and 24-2 carries out sampling of the analog I signal and the analog Q signal from the demodulator (DEM) 70 by use of a sampling clock synchronous with the reception symbol clock. Thus, the A/D converters 24-1 and 24-2 generates (converts into) a digital in-phase component signal (digital I signal) and a digital quadrature component signal (digital Q signal) as a reception digital baseband signal (reception digital BB signal), and outputs the generated (converted) digital I signal and digital Q signal to the decoder (DEC) 71. The digital in-phase component signal (digital I signal) and the digital quadrature component signal (digital Q signal) correspond to amplitudes of the carrier waves of the analog I signal and the analog Q signal at the time of the sampling.

The decoder (DEC) 71 carries out an error correction process and a decoding process to the digital I signal and the digital Q signal as the reception digital BB signal in synchronization with the reception symbol clock, and outputs the processed digital I signal and digital Q signal to the microwave transmitting and receiving unit interface 73.

The identification data processing circuit of the microwave transmitting and receiving unit interface 73 inputs the reception digital BB signal from the decoder (DEC) 71; generates the reception data to which a removing process of data for signal identification (identification data removing process) in a radio zone has been carried out; and stores the generated reception data in a reception data buffer circuit. The input and output of the microwave transmitting and receiving unit interface 73 is asynchronous. For this reason, the timing adjusting circuit carries out the timing adjusting process for adjusting the timing when the reception data stored in the reception data buffer circuit is outputted to the microprocessor signal processing unit 18. The microwave transmitting and receiving unit interface 73 outputs the reception data to the microprocessor signal processing unit 18 in synchronization with the bus clock from the microprocessor signal processing unit 18.

The microprocessor signal processing unit interface 74 of the microprocessor signal processing unit 18 stores the reception data from the microwave transmitting and receiving unit 17 (microwave transmitting and receiving unit interface 73) in the reception data buffer circuit in synchronization with the reference clock from the clock generator 30. The input and output of the microprocessor signal processing unit interface 74 is asynchronous. For this reason, the timing adjusting circuit carries out the timing adjusting process for adjusting the timing when the reception data stored in the reception data buffer circuit is outputted to the microprocessor signal processing circuit (CPU) 75. The microprocessor signal processing unit interface 74 outputs the reception data to the microprocessor signal processing circuit (CPU) 75 in synchronization with the reference clock from the clock generator 30.

The microprocessor signal processing circuit (CPU) 75 executes an application program (an e-mail processing program, for example) (not shown) among a plurality of programs stored in the memory.

Based on the application program (the e-mail processing program, for example), the microprocessor signal processing circuit (CPU) 75 processes the reception data from the microprocessor signal processing unit interface 74 in synchronization with the reference clock from the clock generator 30.

Next, an operation when the data processing terminal system in the second conventional example transmits a signal will be described.

The microprocessor signal processing circuit (CPU) 75 outputs the transmission data generated based on the application program to the microprocessor signal processing unit interface 74 in synchronization with the reference clock from the clock generator 30.

The microprocessor signal processing unit interface 74 stores the transmission data from the microprocessor signal processing circuit (CPU) 75 in the transmission data buffer circuit in synchronization with the reference clock from the clock generator 30. Since the input and output of the microprocessor signal processing unit interface 74 is asynchronous, the timing adjusting circuit carries out the timing adjusting process for adjusting the timing when the transmission data stored in the transmission data buffer circuit is outputted to the microwave transmitting and receiving unit 17 (the microwave transmitting and receiving unit interface 73). The microprocessor signal processing unit interface 74 outputs the transmission data to the microwave transmitting and receiving unit interface 73 in synchronization with the reference clock from the clock generator 30.

The clock generator 27 generates the transmission symbol clock having a transmission symbol frequency, and outputs the generated transmission symbol clock to the D/A converters 25-1 and 25-2, the encoder (ENC) 72, and the microwave transmitting and receiving unit interface 73.

The microwave transmitting and receiving unit interface 73 stores the transmission data from the microprocessor signal processing unit 18 in the transmission data buffer circuit in synchronization with the bus clock from the microprocessor signal processing unit interface 74. Since the input and output of the microwave transmitting and receiving unit interface 73 is asynchronous, the timing adjusting circuit carries out the timing adjusting process for adjusting the timing when the transmission data stored in the transmission data buffer circuit is outputted to the encoder (ENC) 72. The identification data processing circuit of the microwave transmitting and receiving unit interface 73 carries out a signal identification data adding process (identification data adding process) in the radio zone to the transmission data in synchronization with the transmission symbol clock from the clock generator 27, and outputs the processed transmission data to the encoder (ENC) 72.

The encoder (ENC) 72 carries out a redundant data adding process for the error correction and an encoding process to the transmission data from the microwave transmitting and receiving unit interface 73 in synchronization with the transmission symbol clock from the clock generator 27. The encoder (ENC) 72 then generates the digital I signal and the digital Q signal as the transmission digital baseband signal (transmission digital BB signal), and outputs the generated digital I signal and digital Q signal to the D/A converters 25-1 and 25-2.

The D/A converters 25-1 and 25-2 convert the digital I signal and the digital Q signal into the analog I signal and the analog Q signal as the transmission analog baseband signal (transmission analog BB signal), that show the amplitudes of the carrier waves, in synchronization with the transmission symbol clock from the clock generator 27. Then, the D/A converters 25-1 and 25-2 and outputs the converted analog I signal and analog Q signal to the modulator (MOD 23).

The modulator (MOD) 23 carries out the quadrature modulation to the analog I signal and the analog Q signal as the transmission analog baseband signal (transmission analog BB signal), by use of the in-phase carrier wave and the quadrature carrier wave, and generates the transmission IF signal. The modulator (MOD) 23 then outputs the generated transmission IF signal to the frequency converter (CONV) 61 through the band-pass filter (BPF) 62. At this time, the transmission IF signal is limited to the carrier-wave frequency band that is set in the band-pass filter (BP) 62.

The frequency converter (CONV) 61 mixes the transmission IF signal from the band-pass filter (BPF) 62 with the local oscillation signal generated by the local oscillator (OSC) 58, and converts the mixed transmission IF signal into the transmission RF signal. The frequency converter (CONV) 61 outputs the converted transmission RF signal to the power amplifier (PA) 59 through the band-pass filter (BPF) 60. An undesired frequency component other than the carrier-wave frequency band that is set in the band-pass filter (BPF) 60 is removed from the transmission RF signal from the frequency converter (CONV) 61.

The power amplifier (PA) 59 amplifies transmission power to the extent of a power level necessary to transmit the transmission RF signal, and outputs the transmission RF signal to the duplexer (DUP) 52.

The frequency band of the transmission RF signal is set in a transmission signal band-pass filter of the duplexer (DUP) 52. The transmission signal band-pass filter extracts only the transmission RF signal from the power amplifier (PA) 59, and outputs the extracted transmission RF signal to the network through the antenna 51.

The transmission of the data between the microwave transmitting and receiving unit interface 73 and the microprocessor signal processing unit interface 74 is carried out in synchronization with the reference clock generated by the clock generator 30. The reference clock is asynchronous with the reception symbol clock generated by the demodulator (DEM) 70 and the transmission symbol clock generated by the clock generator 27. Specific examples in the data transmission system are Peripheral Components Interconnect bus (PCI bus), Card bus, and the like.

However, there are problems as mentioned below, in the data processing terminal system in the second conventional example.

In the data processing terminal system in the second conventional example, the error correction process, the encoding/decoding process, the identification data adding/removing process, and the like are carried out in the identification data processing circuit of the decoder (DEC) 71, the encoder (ENC) 72, and the microwave transmitting and receiving unit interface 73 in the microwave transmitting and receiving unit 17. For this reason, in the data processing terminal system in the second conventional example, the data processing terminal system becomes larger in size due to a built-in circuit for carrying out such processes in the microwave transmitting and receiving unit 17.

In the data processing terminal system in the second conventional example, the reception data buffer circuit, the transmission data buffer circuit, and the timing adjusting circuit are required, which are related to the timing adjusting process. Therefore, in the data processing terminal system in the second conventional example, the data processing terminal system becomes larger in size due to the circuit incorporated into the microwave transmitting and receiving unit 17 and the microprocessor signal processing unit 18 (the microwave transmitting and receiving unit interface 73 and the microprocessor signal processing unit interface 74) to carry out the timing adjusting process.

The data processing terminal system that can realize downsizing is desired.

In the data processing terminal system in the second conventional example, the microwave transmitting and receiving unit 17 incorporates the identification data processing circuit of the decoder (DEC) 71, the encoder (ENC) 72, and the microwave transmitting and receiving unit interface 73. For this reason, in the data processing terminal system in the second conventional example, extra power is consumed by a circuit for carrying out such processes. In general, the power consumption is proportional to the signal processing clock frequency (the reception symbol clock and the transmission symbol clock). Therefore, the power consumption is increased if an operation frequency of the microprocessor signal processing circuit (CPU) 75 becomes higher with the increase in a signal capacity.

In the data processing terminal system in the second conventional example, the microwave transmitting and receiving unit 17 and the microprocessor signal processing unit 18 (the microwave transmitting and receiving unit interface 73 and the microprocessor signal processing unit interface 74) incorporate the reception data buffer circuit, the transmission data buffer circuit, and the timing adjusting circuit, in order to carry out the timing adjusting process. For this reason, in the data processing terminal system in the second conventional example, the extra power is consumed by a circuit for carrying out the timing adjusting process.

The data processing terminal system that can realize low power consumption is desired.

In the data processing terminal system in the second conventional example, the microwave transmitting and receiving unit 17 incorporates the identification data processing circuit of the decoder (DEC) 71, the encoder (ENC) 72, and the microwave transmitting and receiving unit interface 73. For this reason, in the data processing terminal system in the second conventional example, a heat generated in accordance with the transmission and reception (the input and output) of the signal is excessively increased due to the circuit for carrying out such processes. The heat is increased in addition to the power consumption if the operation frequency of the microprocessor signal processing circuit (CPU) 75 becomes higher with the increase in the signal capacity. If the signal processing clock frequency is made higher due to the increase in the transmission capacity, the power consumption by the decoder (DEC) 71, the encoder (ENC) 72, and the microwave transmitting and receiving unit interface 73 increases, leading to a cause of the increase in the heat.

In the data processing terminal system in the second conventional example, the microwave transmitting and receiving unit 17 and the microprocessor signal processing unit 18 (the microwave transmitting and receiving unit interface 73 and the microprocessor signal processing unit interface 74) incorporate the reception data buffer circuit, the transmission data buffer circuit, and the timing adjusting circuit, for the purpose of carrying out the timing adjusting process. For this reason, in the data processing terminal system in the second conventional example, the heat generated in accordance with the transmission and reception (the input and output) is excessively increased due to the circuit for carrying out the timing adjusting process.

The data processing terminal system that can realize low heat generation is desired.

If the microwave transmitting and receiving unit 17 has a shape similar to a card, the condition for radiating heat generated by the microwave transmitting and receiving unit 17 is set more strictly than usual. Therefore, manufacturing cost increases for realizing a configuration in which the heat generated by the microwave transmitting and receiving unit 17 can be fully radiated.

In the data processing terminal system in the second conventional example, the microwave transmitting and receiving unit 17 and the microprocessor signal processing unit 18 (the microwave transmitting and receiving unit interface 73 and the microprocessor signal processing unit interface 74) incorporate the reception data buffer circuit, the transmission data buffer circuit, and the timing adjusting circuit, for the purpose of carrying out the timing adjusting process. For this reason, in the data processing terminal system in the second conventional example, the manufacturing cost increases excessively for manufacturing the circuit that carries out the timing adjusting process.

The data processing terminal system that can realize the reduction in cost is desired.

In the data processing terminal system in the second conventional example, there is a possibility that the timing adjusting process causes a transmission delay and the reduction in throughput. This problem becomes more apparent as the signal capacity increases in a portion between the microwave transmitting and receiving unit 17 (the microwave transmitting and receiving unit interface 73) and the microprocessor signal processing unit 18 (the microprocessor signal processing unit interface 74).

The data processing terminal system that can prevent the reduction in the throughput is desired.

In conjunction with the above, a software radio apparatus is disclosed in Japanese Laid Open Patent Application (JP-P2001-44882A). The software radio apparatus is configured to have one or more antennas, an antenna control unit, a radio signal processing unit, a signal processing unit, and an external interface unit. Processors are respectively incorporated into the antenna control unit, the radio signal processing unit, and the external interface unit. Additionally, a signal interface for communicating the control data is provided between the above respective units and the signal processing unit. The software radio apparatus is characterized by having a configuration, in which each unit described above controls its own operation in software by using the incorporated processor, based upon the control data on the signal interface. Here, the antenna carries out the transmission and reception of the radio signal. The antenna control unit carries out switching of the transmission and reception of the antenna, directivity control of the antenna, and the like. The radio signal processing unit, at the time of the reception, receives the signal from the above-mentioned antenna control unit, and carries out such signal processing as frequency conversion into the IF frequency or the baseband, band limiting, and level adjustment A/D conversion. The radio signal processing unit, at the time of the transmission, after the signal processing like D/A conversion band limiting for the supplied signal, carries out frequency conversion for the supplied signal into the RF frequency, and outputs the signal to the antenna control unit. The signal processing unit, at the time of the reception, receives the reception signal digitized by the radio signal processing unit, and carries out demodulation signal processing. The signal processing unit, at the time of the transmission, has a function of carrying out modulation signal processing to a signal supplied through an external interface unit, and outputting the processed signal to the radio signal processing unit. The signal processing unit also has a configuration in which it is possible to carry out the control of the foregoing by the incorporated processor, and to switch at least a part of the software necessary for the operation of the processor. The external interface unit, at the time of the reception, outputs the signal to which the demodulation signal processing is carried out by the signal processing unit, achieving matching with the external interface. The external interface unit, at the time of the transmission, outputs to the signal processing unit, achieving interface matching with an external apparatus.

Also, a data transmission system is disclosed in Japanese Laid Open Patent Application (JP-P2000-92142A). The data transmission system is characterized by having a transmitting unit for transmitting a signal obtained by adding predetermined frequency conversion data modulated with sub data outside the band of modulation output of main data to be transmitted; and a receiving unit for extracting the above-mentioned frequency conversion data from reception output of the transmission signal, controlling a signal as a reference for the frequency conversion on the reception side based upon the extracted frequency conversion data, and decoding the above-mentioned sub data.

Also, a signal transmitting apparatus is disclosed in Japanese Laid Open Patent Application (JP-P2000-151553A). The signal transmitting apparatus, on the transmission side, carries out the frequency conversion to an IF signal and transmits the converted IF signal. The signal transmitting apparatus, on the reception side, carries out the frequency conversion to a received signal to obtain an IF signal. A section of generating a pilot signal and a section of adding the pilot signal to the IF signal are provided on the side of the transmission. A section of extracting the above-mentioned pilot signal and a section of carrying out the frequency conversion to the above-mentioned pilot signal are provided on the side of the reception. The signal transmitting apparatus is characterized by carrying out the frequency conversion by using the above-mentioned pilot signal obtained by the frequency conversion as a local signal, to obtain the IF signal.

Also, a radio base station apparatus and a resource data checking method are disclosed in Japanese Laid Open Patent Application (JP-P2002-64845A). The radio base station apparatus is characterized by having a communication processing section in which the configuration of a hardware resources is optionally changeable in accordance with set resource data; and a base station controlling section for checking the resource data of the hardware resources set to the communication processing section with prerecorded resource management data in a constant time interval, and for changing the configuration of the communication section in accordance with a checking result.

DISCLOSURE OF INVENTION

Therefore, an object of the present invention is to provide an information processing terminal system with usefulness improved.

Another object of the present invention is to provide an information processing terminal system in which downsizing can be realized.

Still another object of the present invention is to provide an information processing terminal system in which low power consumption can be realized.

Further still another object of the present invention is to provide an information processing terminal system in which low heat generation can be realized.

It is another object of the present invention to provide an information processing terminal system in which low cost can be realized.

Still another object of the present invention is to provide an information processing terminal system in which decrease in throughput can be prevented.

Therefore, to achieve the above object(s), the information processing terminal system of the present invention is provided with an information processing terminal and a transmitting and receiving unit that can be attached to or detached from the information processing terminal. The transmitting and receiving unit is provided with a transmission and reception processing section, a demodulation section, a modulation section and a baseband processing section. When the transmitting and receiving unit is attached to the information processing terminal, the transmission and reception processing section outputs a reception modulation wave signal from a network to the demodulation section and transmits a transmission modulation wave signal from the modulation section to the network. The demodulation section converts the reception modulation wave signal from the transmission and reception processing section into a reception analog baseband signal. The baseband processing section converts the reception analog baseband signal into a reception digital signal to output to the information processing terminal, and converts a transmission digital signal from the information processing terminal into a transmission analog baseband signal. The modulation section converts the transmission analog baseband signal into the transmission modulation wave signal. The baseband processing section and the information processing terminal operate in synchronization with a clock. The reception digital signal contains a reception data. The transmission digital signal contains a transmission data.

In the above-mentioned information processing terminal system, the baseband processing section converts the reception analog baseband signal into a reception digital baseband signal as the reception digital signal to output to the information processing terminal; and converts a transmission digital baseband signal as the transmission digital signal from the information processing terminal into the transmission analog baseband signal. The information processing terminal converts the reception digital baseband signal from the baseband processing section into the reception data and converts the transmission data into the transmission digital baseband signal.

In the above-mentioned information processing terminal system, the information processing terminal is provided with an interface and a control unit configured to convert the reception digital baseband signal supplied through the interface from the baseband processing section into the reception data and the transmission data into the transmission digital baseband signal, to output to the baseband processing section through the interface. The demodulation section generates and outputs a reception symbol clock having a frequency to the baseband processing section, the interface and the control unit as a clock.

In the above-mentioned information processing terminal system, the information processing terminal is provided with the interface and a control unit configured to convert the reception digital baseband signal supplied through the interface from the baseband processing section into the reception data; and to convert the transmission data into the transmission digital baseband signal to output to the baseband processing section through the interface. The transmitting and receiving unit is further provided with a clock generator. The demodulation section generates and outputs a reception symbol clock having a frequency to the clock generator. The clock generator generates a second reception symbol clock based on the reception symbol clock from the demodulation section to output to the baseband processing section, the interface and the control unit as a clock. The second reception symbol clock is synchronous with the reception symbol clock and has a frequency different from the frequency of the reception symbol clock.

In the above-mentioned information processing terminal system, the information processing terminal the interface, a control unit configured to convert the reception digital baseband signal supplied through the interface from the baseband processing section into the reception data; and to convert the transmission data into the transmission digital baseband signal to output to the baseband processing section through the interface, and a clock generator. The demodulation section generates and outputs the reception symbol clock having a frequency to the baseband processing section, the interface and the clock generator as the clock. The clock generator receives the reception symbol clock from the demodulation section as a first clock, and generates and outputs a second clock synchronous with the first clock to the control unit as a clock. When the first clock is not supplied, the clock generator generates the second clock through the self-oscillation to output to the control unit as a clock.

In the above-mentioned information processing terminal system, the information processing terminal is provided with the interface and a control unit configured to convert the reception digital baseband signal supplied through the interface from the baseband processing section into the reception data; and to converts the transmission data into the transmission digital baseband signal to output to the baseband processing section through the interface. The transmitting and receiving unit is further provided with a clock generator. The transmission and reception processing section generates and outputs a reference signal having a frequency to the clock generator. Based on the reference signal from the transmission and reception processing section, the clock generator recovers a carrier of the reception modulation wave signal to output to the demodulation section; and generates and outputs a reception symbol clock to the baseband processing section, the interface and the control unit as a clock. The reception symbol clock is synchronous with the reference signal. The demodulation section, the baseband processing section, the interface and the control unit operate in synchronization with the reception symbol clock.

In the above-mentioned information processing terminal system, the information processing terminal is provided with the interface, and a control unit configured to convert the reception digital baseband signal supplied through the interface from the baseband processing section into the reception data; and to convert the transmission data into the transmission digital baseband signal to output to the baseband processing section through the interface. The transmitting and receiving unit is further provided with a clock generator. The clock generator generates a clock through self-oscillation and outputs it to the baseband processing section, the interface and the control unit.

In the above-mentioned information processing terminal system, the information processing terminal is provided with the interface, a control unit configured to convert the reception digital baseband signal supplied through the interface from the baseband processing section into the reception data; and a clock generator configured to control the transmission data into the transmission digital baseband signal. The clock generator generates a clock through self-oscillation to output to the baseband processing section, the interface and the control unit.

In the above-mentioned information processing terminal system, the baseband processing section converts the reception analog baseband signal into the reception data as the reception digital signal to output to the information processing terminal and converts the transmission data as the transmission digital signal from the information processing terminal into the transmission analog baseband signal.

In the above-mentioned information processing terminal system, the information processing terminal is provided with an interface and a control unit configured to receive the reception data through the interface from the baseband processing section and to output the transmission data to the baseband processing section through the interface. The demodulation section generates and outputs the reception symbol clock having a frequency to the baseband processing section, the interface and the control unit as a clock.

In the above-mentioned information processing terminal system, the information processing terminal is provided with an interface and a control unit configured to receive the reception data through the interface from the baseband processing section and to output the transmission data to the baseband processing section through the interface. The transmitting and receiving unit is further composed of a clock generator. The demodulation section generates and outputs the reception symbol clock having a frequency to a clock generator. The clock generator generates the second reception symbol clock based on the reception symbol clock from the demodulation section to output to the baseband processing section, the interface and the control unit as the clock. The second reception symbol clock is synchronous with the reception symbol clock and has a frequency different from the frequency of the reception symbol clock.

In the above-mentioned information processing terminal system, the information processing terminal is provided with an interface, a control unit configured to receive the reception data through the interface from the baseband processing section and to output the transmission data to the baseband processing section through the interface, and a clock generator. The demodulation section generates and outputs the reception symbol clock having a frequency to the baseband processing section, the interface and the clock generator as the clock. The clock generator receives the reception symbol clock from the demodulation section as the first clock, and generates and outputs the second clock synchronous with the first clock to the control unit as the clock. When the first clock is not received, the clock generator generates the second clock through self-oscillation to output to the control unit as the clock.

In the above-mentioned information processing terminal system, the information processing terminal is composed of an interface and a control unit configured to receive the reception data through the interface from the baseband processing section, and to output the transmission data to the baseband processing section through the interface. The transmitting and receiving unit is further composed of a clock generator. The transmission and reception processing section generates and outputs the reference signal having a frequency to a clock generator. Based on the reference signal from the transmission and reception processing section, the clock generator recovers a carrier of the reception modulation wave signal to outputs to the demodulation section, and generates and outputs a reception symbol clock to the baseband processing section, the interface and the control unit as the clock. The reception symbol clock is synchronous with the reference signal. The demodulation section, the baseband processing section, the interface and the control unit operate in synchronization with the reception symbol clock.

In the above-mentioned information processing terminal system, the information processing terminal is composed of an interface and a control unit configured to receive the reception data through the interface from the baseband processing section, and to output the transmission data to the baseband processing section through the interface. The transmitting and receiving unit is further composed of a clock generator. The clock generator generates the clock through self-oscillation to output to the baseband processing section, the interface and the control unit.

In the above-mentioned information processing terminal system, the information processing terminal is composed of an interface and a control unit configured to receive the reception data through the interface from the baseband processing section, and to output the transmission data to the baseband processing section through the interface. The transmitting and receiving unit is further composed of a clock generator. The clock generator generates a clock through self-oscillation to output to the baseband processing section, the interface and the control unit.

In order to achieve the above object(s), the information processing terminal system of the present invention is composed of an information processing terminal and a transmitting and receiving unit can be attached to and detached from the information processing terminal. The transmitting and receiving unit is composed of a transmission and reception processing section, a demodulation section, a modulation section and a baseband processing section. When the transmitting and receiving unit is attached to the information processing terminal, the transmission and reception processing section outputs a reception modulation wave signal from a network to the demodulation section and transmits a transmission modulation wave signal from the modulation section to the network. The demodulation section converts the reception modulation wave signal from the transmission and reception processing section into a reception analog baseband signal. The baseband processing section converts the reception analog baseband signal into a reception digital baseband signal and converts a transmission digital baseband signal from the information processing terminal into a transmission analog baseband signal. The modulation section converts the transmission analog baseband signal into a transmission modulation wave signal. The information processing terminal converts the reception digital baseband signal from the baseband processing section into a reception data and converts a transmission data into the transmission digital baseband signal.

In order to achieve the above object(s), a transmitting and receiving method of an information processing terminal of the present invention is a transmitting and receiving method of the information processing terminal attached to a detachable transmitting and receiving unit. The transmitting and receiving method includes (a) in the transmitting and receiving unit, demodulating a reception modulation wave signal from a network to convert into a reception analog baseband signal; (b) in the transmitting and receiving unit, converting the reception analog baseband signal into a reception digital signal containing a reception data in synchronization with a clock; (c) in the information processing terminal, receiving the reception digital signal in synchronization with the clock; (d) in the information processing terminal, transmitting a transmission digital signal containing a transmission data in synchronization with the clock; (e) in the transmitting and receiving unit, converting the transmission digital signal into a transmission analog baseband signal in synchronization with the clock; (f) in the transmitting and receiving unit, converting the transmission analog baseband signal into a transmission modulation wave signal; and (g) in the transmitting and receiving unit, transmitting the converted transmission modulation wave signal to the network.

In the above-mentioned transmitting and receiving method of the information processing terminal, the (b) step includes (b1) in the transmitting and receiving unit, converting the reception analog baseband signal into the reception digital baseband signal as the reception digital signal. The (c) step includes (c1) in the information processing terminal, converting the reception digital baseband signal into the reception data. The (d) step includes (d1) in the information processing terminal, converting the transmission data into the transmission digital baseband signal as the transmission digital signal. The (e) step includes (e1) in the transmitting and receiving unit, converting the transmission digital baseband signal into the transmission analog baseband signal.

In the above-mentioned transmitting and receiving method of the information processing terminal, the (b) step includes (b2) in the transmitting and receiving unit, converting the reception analog baseband signal into the reception data as the reception digital signal. The (c) step includes (c2) in the information processing terminal, receiving the reception data. The (d) step includes (d2) in the information processing terminal, outputting the transmission data as the transmission digital signal to the transmitting and receiving unit. The (e) step includes (e2) in the transmitting and receiving unit, converting the transmission data into the transmission analog baseband signal.

In order to achieve the above object(s), a transmitting and receiving method of an information processing terminal of the present invention is a transmitting and receiving method of an information processing terminal to which a detachable transmitting and receiving unit is attached. The transmitting and receiving method of an information processing terminal includes (h) in the transmitting and receiving unit, demodulating a reception modulation wave signal from a network to convert into a reception analog baseband signal; (i) in the transmitting and receiving unit, converting the reception analog baseband signal into a reception digital baseband signal; (j) in the information processing terminal, converting the reception digital baseband signal into a reception data; (k) in the information processing terminal, converting a transmission data into a transmission digital baseband signal; (l) in the transmitting and receiving unit, converting the transmission digital baseband signal into a transmission analog baseband signal; (m) in the transmitting and receiving unit, converting the transmission analog baseband signal into a transmission modulation wave signal; (n) in the transmitting and receiving unit, transmitting the transmission modulation wave signal to the network.

In order to achieve the above object(s), a transmitting and receiving unit of the present invention is used for an information processing terminal system composed of an information processing terminal and the transmitting and receiving unit that can be attached to or detached from the information processing terminal. The transmitting and receiving unit is provided with a transmission and reception processing section, a demodulation section, a modulation section and a baseband processing section. When the transmitting and receiving unit is attached to the information processing terminal, the transmission and reception processing section outputs a reception modulation wave signal from a network to the demodulation section and transmits a transmission modulation wave signal from the modulation section to the network. The demodulation section converts the reception modulation wave signal from the transmission and reception processing section into a reception analog baseband signal. The baseband processing section converts the reception analog baseband signal into a reception digital signal to output to the information processing terminal and converts a transmission digital signal from the information processing terminal into the transmission analog baseband signal. The modulation section converts the transmission analog baseband signal into the transmission modulation wave signal. The baseband processing section and the information processing terminal operate in synchronization with the clock. The reception digital signal contains a reception data and the transmission digital signal contains a transmission data.

In the above-mentioned transmitting and receiving unit, the baseband processing section converts the reception analog baseband signal into the reception digital baseband signal as the reception digital signal to output to the information processing terminal, and a transmission digital baseband signal as the transmission digital signal from the information processing terminal into the transmission analog baseband signal. The information processing terminal converts the reception digital baseband signal from the baseband processing section into the reception data and converts the transmission data into the transmission digital baseband signal.

In the above-mentioned transmitting and receiving unit, the baseband processing section converts the reception analog baseband signal into the reception data as the reception digital signal output to the information processing terminal, and a transmission data as the transmission digital signal from the information processing terminal into the transmission analog baseband signal.

In order to achieve the above object(s), an information processing terminal of the present invention is used for an information processing terminal system composed of an information processing terminal to or from which the transmitting and receiving unit can be attached or detached. The transmitting and receiving unit is provided with a transmission and reception processing section, a demodulation section, a modulation section and a baseband processing section. When the transmitting and receiving unit is attached to the information processing terminal, the transmission and reception processing section outputs a reception modulation wave signal from a network to the demodulation section and transmits a transmission modulation wave signal from the modulation section to the network. The demodulation section converts the reception modulation wave signal from the transmission and reception processing section into a reception analog baseband signal. The baseband processing section converts the reception analog baseband signal into a reception digital signal to output to the information processing terminal and converts a transmission digital signal from the information processing terminal into a transmission analog baseband signal. The modulation section converts the transmission analog baseband signal into a transmission modulation wave signal. The baseband processing section and the information processing terminal operate in synchronization with the clock. The reception digital signal contains a reception data and the transmission digital signal contains a transmission data.

In the above-mentioned information processing terminal, the baseband processing section converts the reception analog baseband signal into the reception digital baseband signal as the reception digital signal to output to the information processing terminal, and converts a transmission digital baseband signal as the transmission digital signal from the information processing terminal into the transmission analog baseband signal. The information processing terminal converts the reception digital baseband signal from the baseband processing section into the reception data and converts the transmission data into the transmission digital baseband signal.

In the above-mentioned information processing terminal, the baseband processing section converts the reception analog baseband signal into the reception data as the reception digital signal to output to the information processing terminal, and converts a transmission data as the transmission digital signal from the information processing terminal into the transmission analog baseband signal.

In order to achieve the above object(s), a transmitting and receiving unit of the present invention is used for an information processing terminal system composed of an information processing terminal and the transmitting and receiving unit that can be attached to or detached from the information processing terminal. The transmitting and receiving unit is provided with a transmission and reception processing section, a demodulation section, a modulation section and a baseband processing section. When the transmitting and receiving unit is attached to the information processing terminal, the transmission and reception processing section outputs a reception modulation wave signal from a network to the demodulation section and transmits a transmission modulation wave signal from the modulation section to the network. The demodulation section converts the reception modulation wave signal from the transmission and reception processing section into a reception analog baseband signal. The baseband processing section converts the reception analog baseband signal into a reception digital baseband signal and converts a transmission digital baseband signal from the information processing terminal into a transmission analog baseband signal. The modulation section converts the transmission analog baseband signal into the transmission modulation wave signal.

In order to achieve the above object(s), a transmitting and receiving unit of the present invention is used for an information processing terminal system composed of an information processing terminal and the transmitting and receiving unit that can be attached to or detached from the information processing terminal. The transmitting and receiving unit is provided with a transmission and reception processing section, a demodulation section, a modulation section and a baseband processing section. When the transmitting and receiving unit is attached to the information processing terminal, the transmission and reception processing section outputs a reception modulation wave signal from a network to the demodulation section and transmits a transmission modulation wave signal from the modulation section to the network. The demodulation section converts the reception modulation wave signal from the transmission and reception processing section into the reception analog baseband signal. The baseband processing section converts the reception analog baseband signal into a reception digital baseband signal and converts a transmission digital baseband signal from the information processing terminal into the transmission analog baseband signal. The modulation section converts the transmission analog baseband signal into the transmission modulation wave signal. The information processing terminal converts the reception digital baseband signal from the baseband processing section into the reception data and converts a transmission data into the transmission digital baseband signal.

BEST MODE FOR CARRYING OUT THE INVENTION

Hereinafter, a data processing terminal system according to the present invention will be in detail with reference to the attached drawings.

[First Embodiment]

Figure 2:
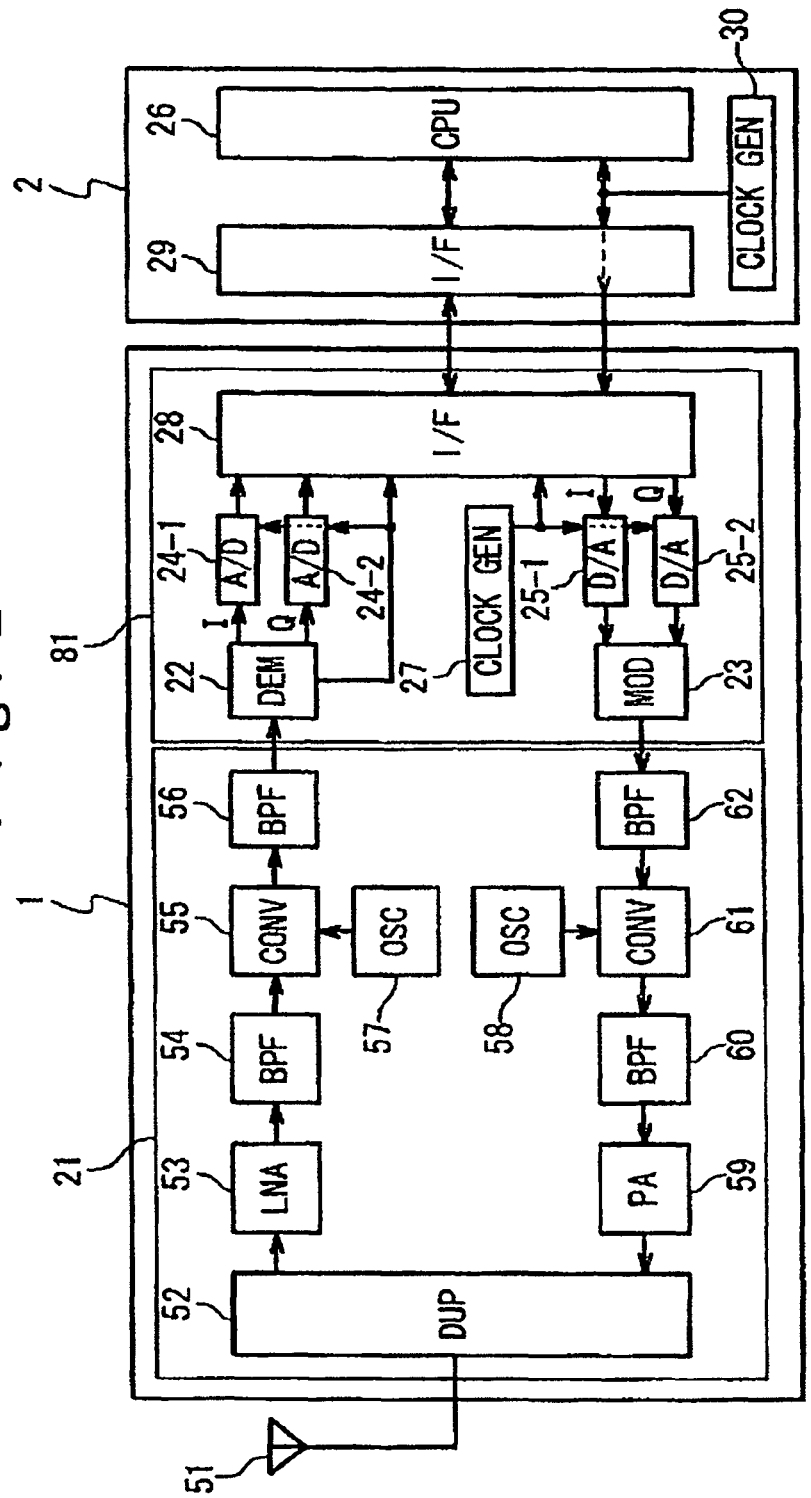
FIG. 2 shows a configuration of an information processing terminal system according to a first embodiment of the present invention.

FIG. 2 shows a configuration of a data processing terminal system using a microwave-band quadrature amplitude modulation wave, as the data processing terminal system according to the first embodiment of the present invention. In the data processing terminal system of the first embodiment, reductions in size, generated heat, and costs are realized, and usefulness (portability, economical efficiency) is improved.

The data processing terminal system in the first embodiment is provided with the antenna 51 connected to a network, a microwave transmitting and receiving unit 1, and a microprocessor signal processing unit 2. The antenna 51 and the microwave transmitting and receiving unit 1 are transmitting and receiving apparatus (communication apparatus). The microprocessor signal processing unit 2 is a data processing terminal. A PDA (Personal Digital Assistant) and a portable computer are exemplified as the data processing terminal.

The microwave transmitting and receiving unit 1, at the time of reception, demodulates a reception high frequency signal (reception RF signal) as a modulation wave received through the antenna 51 to a reception digital baseband signal (reception digital BB signal), and outputs the converted reception digital baseband signal to the microprocessor signal processing unit 2. The microwave transmitting and receiving unit 1, at the time of transmission, converts a transmission digital baseband signal (transmission digital BB signal) from the microprocessor signal processing unit 2 into a transmission high frequency signal (transmission RF signal) as the modulation wave, and transmits the converted transmission radio frequency signal through the antenna 51.

Figure 1:
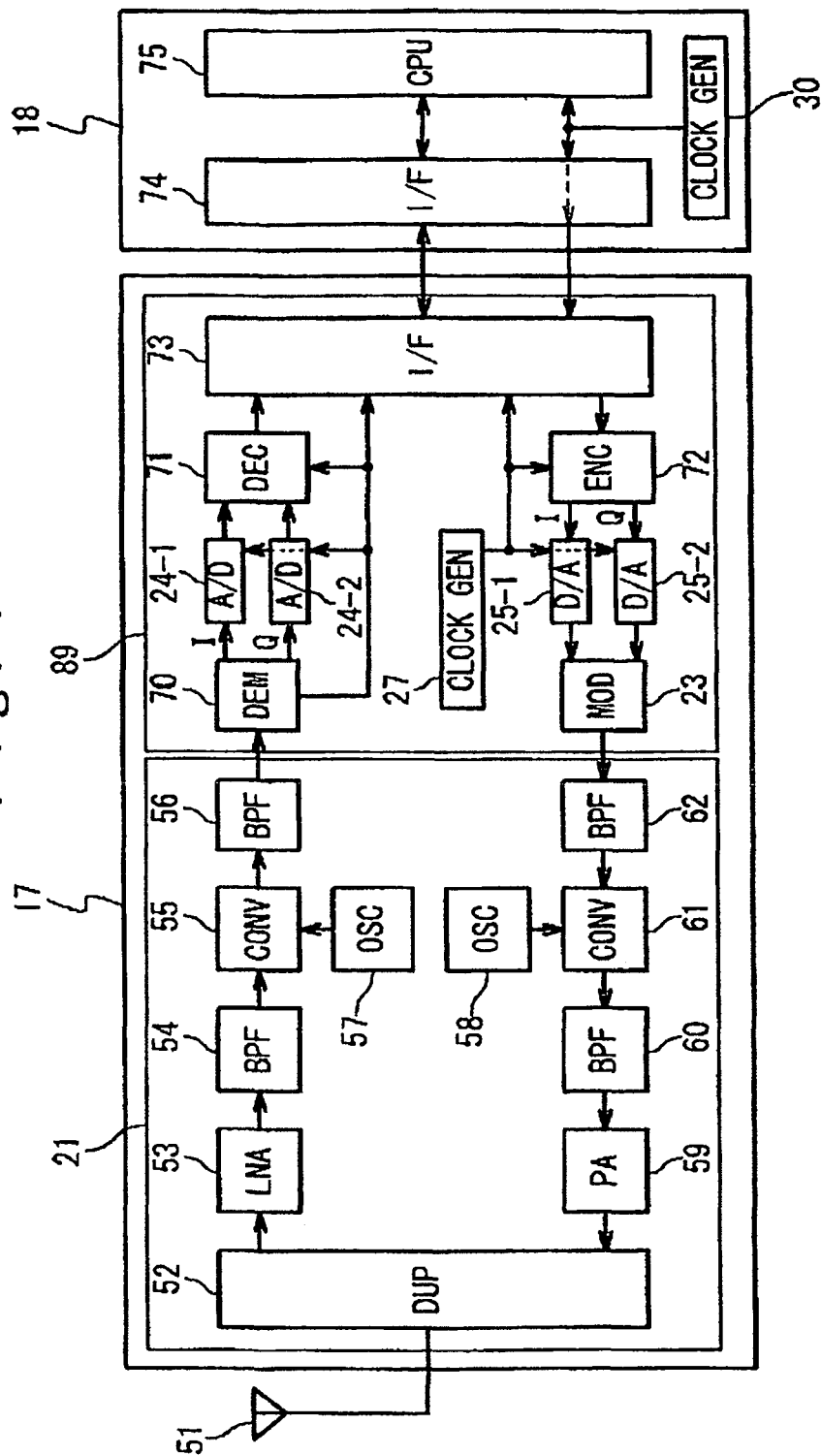
FIG. 1 shows a configuration of an information processing terminal system of a second conventional example.

The microwave transmitting and receiving unit 1 is provided with a high-frequency processing unit 21 and a modulation and demodulation processing unit 81. The high-frequency processing unit 21 is the same as the high-frequency processing unit 21 in the second conventional example (see FIG. 1).

The high-frequency processing unit 21, at the time of the reception, converts the reception RF signal received through the antenna 51 into a reception intermediate frequency signal (reception IF signal), and outputs the converted reception IF signal to the modulation and demodulation processing unit 81. The high-frequency processing unit 21, at the time of the transmission, converts the transmission IF signal from the modulation and demodulation processing unit 81 into the transmission RF signal, and outputs the converted transmission RF signal through the antenna 51.

The modulation and demodulation processing unit 81, at the time of the reception, converts the reception IF signal as a reception modulation wave signal from the high-frequency processing unit 21 into the reception digital BB signal, and outputs the converted reception digital BB signal to the microprocessor signal processing unit 2. The modulation and demodulation processing unit 81, at the time of the transmission, converts the transmission digital BB signal from the microprocessor signal processing unit 2 into the transmission IF signal as a transmission modulation wave signal, and outputs the converted transmission IF signal to the high-frequency processing unit 21.

The high-frequency processing unit 21 is provided with a duplexer (DUP) 52, a low noise amplifier (LNA) 53, band-pass filters (BPF) 54, 56, 60, and 62, frequency converters (CONV) 55 and 61, local oscillators (OSC) 57 and 58, and a power amplifier (PA) 59.

The duplexer (DUP) 52 is provided with a reception signal band-pass filter (not shown) and a transmission signal band-pass filter (not shown).

The modulation and demodulation processing unit 81 is provided with a demodulator (DEM) 22, a modulator (MOD) 23, and a baseband processing unit. The baseband processing unit is provided with analog/digital (A/D) converters 24-1 and 24-2, digital/analog (D/A) converters 25-1 and 25-2, a clock generator (CLOCK GEN) 27, and a microwave transmitting and receiving unit interface (I/F) 28.

The demodulator (DEM) 22 is provided with a carrier-wave recovering circuit (not shown) and a reception symbol clock recovering circuit (not shown).

The microwave transmitting and receiving unit interface (I/F) 28 is provided with a reception data buffer circuit (not shown), a transmission data buffer circuit (not shown), a converting circuit (not shown), and a timing adjusting circuit (not shown).

The microprocessor signal processing unit 2 is provided with a clock generator (CLOCK GEN) 30, a microprocessor signal processing unit interface (I/F) 29, and a microprocessor signal processing circuit 26 as a CPU (Central Processing Unit).

The clock generator 30 generates a reference clock, and outputs the generated reference clock to the microprocessor signal processing unit interface 29 and the microprocessor signal processing circuit (CPU) 26.

The microprocessor signal processing unit interface 29 generates a bus clock signal that is in synchronization with the reference clock, and outputs the generated bus clock signal to the microwave transmitting and receiving unit interface 28 in synchronization with the reference clock. The microprocessor signal processing unit interface 29 is provided with a reception data buffer circuit (not shown), a transmission data buffer circuit (not shown), a converting circuit (not shown), and a timing adjusting circuit (not shown).

The microprocessor signal processing circuit (CPU) 26 has a microprocessor (not shown), a memory (not shown), input and output units (not shown), and the like. A plurality of programs (not shown) are stored in the memory.

The data processing terminal system in the first embodiment has a configuration in which the microwave transmitting and receiving unit 1 can be attached to and detached from the microprocessor signal processing unit 2. Even when the microwave transmitting and receiving unit 1 and the microprocessor signal processing unit 2 are separated, the microprocessor signal processing circuit (CPU) 26 can carry out a general program (not shown) such as spreadsheet processing and word-processing, from among a plurality of programs stored in the memory in synchronization with the reference clock from the clock generator 30. Thus, the microprocessor signal processing circuit (CPU) 26 can carry out the general data processing (in which only a function of the data processing terminal is used) without using a microwave transmitting and receiving function. In other words, a user can use the data processing terminal system in the first embodiment as the data processing terminal only with the function of the microprocessor signal processing unit 2.

First, the high-frequency processing unit 21 will be described.

A frequency band of the reception RF signal is set in the reception signal band-pass filter of the duplexer (DUP) 52. The reception signal band-pass filter extracts only the reception RF signal received by the antenna 51, and outputs the extracted reception RF signal to the low noise amplifier (LNA) 53. In case of a quadrature amplitude modulation signal (QAM modulation signal), the reception RF signal is a signal with a carrier-wave frequency, generated by carrying out the quadrature modulation to the reception digital BB signal having a symbol frequency (reception symbol frequency) by using an in-phase carrier wave and a quadrature carrier wave that is shifted by 90 degrees in phase from the in-phase carrier wave.

The frequency band of the transmission RF signal is set in the transmission signal band-pass filter of the duplexer (DUP) 52. The transmission signal band-pass filter extracts only the transmission RF signal from the power amplifier (PA) 59, and transmits the extracted transmission RF signal to the network through the antenna 51.

The low noise amplifier (LNA) 53 amplifies the reception RF signal from the duplexer (DUP) 52 up to a level enough for the demodulator (DEM) 22 to carry out signal processing, and outputs the amplified reception RF signal to the frequency converter (CONV) 55 through the band-pass filter (BPF) 54. An undesired frequency component other than a carrier-wave frequency band set in the band-pass filter (BPF) 54 is removed from the reception RF signal supplied from the low noise amplifier (LNA) 53.

The local oscillator (OSC) 57 generates a local oscillation signal.

The frequency converter (CONV) 55 mixes the reception RF signal, in which the undesired frequency component is removed, with the local oscillation signal generated by the local oscillator (OSC) 57 to convert the mixed signal into the reception IF signal, and outputs the converted reception IF signal to the modulation and demodulation processing unit 81 through the band-pass filter (BPF) 56. The carrier-wave frequency band set in the band-pass filter (BPF) 56 is selected for the reception IF signal from the frequency converter (CONV) 55.

The transmission IF signal from the modulation and demodulation processing unit 81 is outputted to the frequency converter (CONV) 61 through a band-pass filter (BPF) 62. The carrier-wave frequency band set in the band-pass filter (BPF) 62 is selected for the outputted transmission IF signal.

The local oscillator (OSC) 58 generates a local oscillation signal.

The frequency converter (CONV) 61 mixes the transmission IF signal from the band-pass filter (BPF) 62 with the local oscillation signal generated by the local oscillator (OSC) 58 to convert the mixed signal into the transmission RF signal, and outputs the converted transmission RF signal to the power amplifier (PA) 59 through a band-pass filter (BPF) 60. An undesired frequency component other than the carrier-wave frequency band set in the band-pass filter (BPF) 60 is removed from the transmission RF signal from the frequency converter (CONV) 61.

The power amplifier (PA) 59 amplifies the transmission RF signal up to a power level necessary to transmit the transmission RF signal, and outputs the amplified transmission RF signal to the duplexer (DUP) 52.

Next, the modulation and demodulation processing unit 81 will be described.

The demodulator (DEM) 22 converts the reception IF signal supplied from the band-pass filter (BPF) 56 into a reception analog baseband signal. In the case of the QAM modulation signal, the modulator (DEM) 22 recovers the carrier wave of the reception IF signal, and carries out coherent detection.

That is, the carrier-wave recovering circuit of the demodulator (DEM) 22 recovers the in-phase carrier wave and the quadrature carrier wave from the reception IF signal. By using the generated (regenerated) in-phase carrier wave and quadrature carrier wave, the demodulator (DEM) 22 carries out the coherent detection to the QAM modulation wave (of the in-phase modulation wave and the quadrature modulation wave) to convert the QAM modulation wave subjected to the coherent detection into the reception analog BB signal, namely, an analog in-phase component signal (analog I signal) and an analog quadrature component signal (analog Q signal). The demodulator (DEM) 22 then outputs the converted reception analog BB signal to the A/D converters 24-1 and 24-2.

A reception symbol clock recovering circuit of the demodulator (DEM) 22 generates (recovers) a reception symbol clock having a frequency of n times (n is an integer number) of the frequency of the reception symbol superimposed on the reception analog BB signal, and outputs the generated (recovered) reception symbol clock to the A/D converters 24-1 and 24-2, and the microwave transmitting and receiving unit interface 28.

The A/D converters 24-1 and 24-2 carries out sampling of the analog I signal and the analog Q signal supplied from the demodulator (DEM) 22 with a sampling clock synchronous with the reception symbol clock. The A/D converters 24-1 and 24-2 then generate (convert), as a reception digital baseband signal (reception digital BB signal), a digital in-phase component signal (digital I signal) and a digital quadrature component signal (digital Q signal) corresponding to amplitudes of the carrier waves shown by the analog I signal and the analog Q signal at the time of the sampling, and outputs the generated (converted) digital I signal and digital Q signal to the microwave transmitting and receiving unit interface 28.

When the reception symbol frequency is 10 MHz and the reception symbol clock has the frequency of four times of the reception symbol frequency (n=4; four-times oversampling), the sampling frequency is 40 MHz. When the A/D converters 24-1 and 24-2 are 8 bits in full scale, a bandwidth of the reception digital BB signal (the digital I signal and the digital Q signal) is 80 M bytes per second, given that there are two channels of the digital I signal and the digital Q signal.

The clock generator 27 generates the transmission symbol clock having the transmission symbol frequency, and outputs the generated transmission symbol clock to the D/A converters 25-1 and 25-2, and the microwave transmitting and receiving unit interface 28.

The converting circuit of the microwave transmitting and receiving unit interface 28 carries out a signal level converting process and a parallel bit converting process to the reception digital BB signal (the digital I signal and the digital Q signal) and the transmission digital BB signal (the digital I signal and the digital Q signal). The signal level converting process is a process for converting physical quantities of currents, voltage, and the like of each input and output. The parallel bit converting process is a process for combining and separating data in consideration of transmission efficiency, when data bit widths of the input and output are different. For example, when the reception digital BB signal is supplied to the microwave transmitting and receiving unit interface 28 in units of twice of 8 bits, namely 16 bits, per reception symbol clock, just one transfer is required only by combining the reception digital BB signal for two reception symbol clocks, if the data bit width between the microwave transmitting and receiving unit interface 28 and the microprocessor signal processing unit interface 29 is 32 bits.

The converting circuit of the microwave transmitting and receiving unit interface 28, at the time of the reception, carries out the parallel bit converting process to the reception digital BB signal (the digital I signal and the digital Q signal) from the A/D converters 24-1 and 24-2 in synchronization with the reception symbol clock from the demodulator (DEM) 22 and stores the processed reception digital BB signal in a reception data buffer circuit in synchronization with the reception symbol clock. The converting circuit carries out the signal level converting process to the reception digital BB signal (the digital I signal and the digital Q signal) stored in the reception data buffer circuit. The input and output of the microwave transmitting and receiving unit interface 28 is asynchronous. For this reason, the timing adjusting circuit carries out a timing adjusting process to adjusting a timing when the reception digital BB signal (the digital I signal, the digital Q signal) stored in the reception data buffer circuit is outputted to the microprocessor signal processing unit 2. The microwave transmitting and receiving unit interface 28 synchronizes with the bus clock from the microprocessor signal processing unit 2, and outputs the reception digital BB signal (the digital I signal and the digital Q signal) to the microprocessor signal processing unit 2.

The reception digital BB signal is periodically supplied to the microwave transmitting and receiving unit interface 28 in synchronization with the reception symbol clock, and stored in the reception data buffer circuit in synchronization with the reception symbol clock. Since the data buffer circuit has a limited capacity, there is a problem of data loss when overflow occurs. In order to prevent this, as the timing adjusting process, the microprocessor signal processing circuit (CPU) 26 of the microprocessor signal processing unit 2 monitors an amount of data (data showing the reception digital BB signal) stored in the reception data buffer circuit of the microwave transmitting and receiving unit interface 28 at a predetermined timing. The microprocessor signal processing circuit (CPU) 26 of the microprocessor signal processing unit 2, before the occurrence of the overflow, instructs that the stored data (the data showing the reception digital BB signal) be outputted to the microprocessor signal processing circuit (CPU) 26 through the microprocessor signal processing unit interface 29.

Also, an overflow detecting circuit (not shown) and an interrupt circuit (not shown) may be incorporated in the reception data buffer circuit of the microwave transmitting and receiving unit interface 28. In this case, for the timing adjusting process, the overflow detecting circuit monitors the amount of the data (the reception digital BB signal) stored in the reception data buffer circuit. When the amount is likely to exceed a reference level so as to occur the overflow, the overflow detecting circuit outputs an interrupt signal from the interrupt circuit to the microprocessor signal processing circuit (CPU) 26 through the microprocessor signal processing unit interface 29, to prompt readout of the data (the data showing the reception digital BB signal) stored in the reception data buffer circuit.

The converting circuit of the microwave transmitting and receiving unit interface 28, at the time of the transmission, carries out the parallel bit converting process to the digital I signal and the digital Q signal as the transmission digital BB signal from the microprocessor signal processing unit 2 in synchronization with the bus clock from the microprocessor signal processing unit 2 and stores the processed digital I signal and digital Q signal in the transmission data buffer circuit in synchronization with the bus clock. The converting circuit carries out the signal level converting process to the transmission digital BB signal (the digital I signal and the digital Q signal) stored in the transmission data buffer circuit. The input and output of the microwave transmitting and receiving unit interface 28 are asynchronous. For this reason, the timing adjusting circuit carries out the timing adjusting process to adjust the timing when the transmission digital BB signal (the digital I signal and the digital Q signal) stored in the transmission data buffer circuit is outputted to the D/A converters 25-1 and 25-2. The microwave transmitting and receiving unit interface 28 outputs the transmission digital BB signal (the digital I signal and the digital Q signal) to the D/A converters 25-1 and 25-2 in synchronization with the transmission symbol clock from the clock generator 27.

The transmission digital BB signal is stored in the transmission data buffer circuit of the microwave transmitting and receiving unit interface 28, and is periodically outputted in synchronization with the transmission symbol clock. If the data (the data showing the transmission digital BB signal) stored in the transmission data buffer circuit becomes empty, data output cannot be carried out. In order to prevent this, for the timing adjusting process, the microprocessor signal processing circuit (CPU) 26 monitors the amount of data (the data showing the transmission digital BB signal) stored in the transmission data buffer circuit of the microwave transmitting and receiving unit interface 28 at a predetermined timing, and writes or outputs the data (the data showing the transmission digital BB signal) to the transmission data buffer circuit before the data stored in the transmission data buffer circuit becomes empty.

Also, a data absence detecting circuit (not shown) and an interrupt circuit (not shown) may be incorporated in the transmission data buffer circuit of the microwave transmitting and receiving unit interface 28. In this case, in the timing adjusting process, the data absence detecting circuit monitors the amount of data (the transmission digital BB signal) stored in the transmission data buffer circuit. When the amount is likely to reduce below the reference level so as to become empty, the data absence detecting circuit outputs an interrupt signal from the interrupt circuit to the microprocessor signal processing circuit (CPU) 26 through the microprocessor signal processing unit interface 29, to prompt writing of the data (output of the data to the transmission data buffer circuit).

The D/A converters 25-1 and 25-2 converts the digital I signal and the digital Q signal as a transmission analog baseband signal (transmission analog BB signal) into the analog I signal and the analog Q signal showing the amplitude of the carrier wave in synchronization with the transmission symbol clock from the clock generator 27, and outputs the converted analog I signal and analog Q signal to the modulator (MOD) 23.

When the D/A converters 25-1 and 25-2 are 8 bits in full scale and the transmission symbol clock is 10 MHz, the digital I signal and the digital Q signal are outputted from the microwave transmitting and receiving unit interface 28 to the D/A converters 25-1 and 25-2 in the signal band of 20 M bites per second, and are converted into the transmission analog BB signal.

The modulator (MOD) 23 carries out the quadrature modulation to the analog I signal and the analog Q signal, which are the transmission analog baseband signal (transmission analog BB signal), by using the in-phase carrier wave and the quadrature carrier wave to generate the transmission intermediate frequency signal (the transmission IF signal), and outputs the generated transmission IF signal to the frequency converter (CONV) 61 through the band-pass filter (BPF) 62.

Next, the microprocessor signal processing unit 2 will be described.

Functions of the reception data buffer circuit, the transmission data buffer circuit, the converting circuit, and the timing adjusting circuit in the microprocessor signal processing unit interface 29 are the same as those of the reception data buffer circuit, the transmission data buffer circuit, the converting circuit, and the timing adjusting circuit in the microwave transmitting and receiving unit interface 28.

The converting circuit of the microprocessor signal processing unit interface 29, at the time of the reception, carries out the parallel bit converting process to the reception digital BB signal (the digital I signal and the digital Q signal) from (the microwave transmitting and receiving unit interface 28 of) the microwave transmitting and receiving unit 1 in synchronization with the reference clock from the clock generator 30, and stores the processed reception digital BB signal in the reception data buffer circuit in synchronization with the reference clock. The converting circuit carries out the signal level converting process to the reception digital BB signal (the digital I signal and the digital Q signal) stored in the reception data buffer circuit. The timing adjusting circuit carries out the timing adjusting process to adjust the timing when the reception digital BB signal (the digital I signal and the digital Q signal) stored in the reception data buffer circuit is outputted to the microprocessor signal processing circuit (CPU) 26. The microprocessor signal processing unit interface 29 outputs the reception digital BB signal (the digital I signal and the digital Q signal) to the microprocessor signal processing circuit (CPU) 26 in synchronization with the reference clock from the clock generator 30.

The converting circuit of the microprocessor signal processing unit interface 29, at the time of the transmission, carries out the parallel bit converting process to the transmission digital BB signal (the digital I signal and the digital Q signal) from the microprocessor signal processing circuit (CPU) 26 in synchronization with the reference clock from the clock generator 30, and stores the processed transmission digital BB signal in the transmission data buffer circuit in synchronization with the reference clock. The converting circuit carries out the signal level converting process to the transmission digital BB signal (the digital I signal and the digital Q signal) stored in the transmission data buffer circuit. The timing adjusting circuit carries out the timing adjusting process to adjust the timing when the transmission digital BB signal (the digital I signal and the digital Q signal) stored in the transmission data buffer circuit is outputted to (the microwave transmitting and receiving unit interface 28 of) the microwave transmitting and receiving unit 1. The microprocessor signal processing unit interface 29 outputs the transmission digital BB signal (the digital I signal and the digital Q signal) to the microwave transmitting and receiving unit interface 28 in synchronization with the reference clock from the clock generator 30.

The microprocessor signal processing circuit (CPU) 26 carries out a communication processing program (not shown) among a plurality of programs stored in the memory. The communication processing program has a software algorithm for carrying out an error correction process; a process of adding redundant data for the error correction; a process of encoding and decoding; a process of adding signal identification data in a radio zone (identification data adding process); a process of removing the signal identification data in the radio zone (identification data removing process); Fourier transform; inverse Fourier transform; and a digital waveform shaping processing.

The microprocessor signal processing circuit (CPU) 26, at the time of the reception, carries out the error correction process, the decoding process, the identification data removing process, the Fourier transform, and the digital waveform shaping processing to the reception digital BB signal (the digital I signal and the digital Q signal) from the microprocessor signal processing unit interface 29 based on the communication processing program in synchronization with the reference clock from the clock generator 30, to generate the reception data. Also, the microprocessor signal processing circuit (CPU) 26 processes the reception data in accordance with an application program (for example, an e-mail processing program).

The microprocessor signal processing circuit (CPU) 26, at the time of the transmission, generates the transmission data based on the application program (for example, the e-mail processing program). The microprocessor signal processing circuit (CPU) 26, based on the communication processing program, carries out the redundant data adding process for the error correction, the encoding process, the identification data adding process, the inverse Fourier transform, and the digital waveform shaping processing to the transmission data in synchronization with the reference clock from the clock generator 30, to generate the transmission digital BB signal (the digital I signal and the digital Q signal) and outputs the generated transmission digital BB signal to the microprocessor signal processing unit interface 29 in synchronization with the reference clock.

The microprocessor in recent years incorporates a digital signal processor. By the digital signal processor, an operation can be carried out at higher speed than with the microprocessor in the second conventional example. The digital signal processor may be mounted in the microprocessor signal processing circuit (CPU) 26, aside from the microprocessor having the above-mentioned functions.

The functions of the microprocessor signal processing circuit (CPU) 26 to carry out the error correction process and the decoding process to the reception digital BB signal are equivalent to the functions of a decoder (DEC) 71 of the conventional data processing terminal system. This is referred to as a DEC function. By the DEC function, it is possible to acquire condition data in the radio zone by monitoring an error correction amount (through monitor data). Also, through the use of the data, it is possible to control transmission power of a destination side to an optimum value, and automatically select an optimal error correction method and an optimal encoding method among a plurality of the error correction methods and a plurality of the encoding methods.

In the conventional data processing terminal system, the DEC function {the decoder (DEC) 71} is provided to a microwave transmitting and receiving unit 1. Therefore, a mechanism (transfer mechanism) was needed for transmitting the above-mentioned monitor data from the microwave transmitting and receiving unit 1 to a microprocessor signal processing circuit (CPU) 75 in a microprocessor signal processing unit 18.

In the data processing terminal system in the first embodiment, the above-mentioned transfer mechanism is unnecessary because the microprocessor signal processing circuit (CPU) 26 has the DEC function in the microprocessor signal processing unit 2. Thus, by carrying out only the communication processing program (the software algorithm), the microprocessor signal processing circuit (CPU) 26 can acquire the condition data in the radio zone from the monitor data, and issues an instruction to shift to the optimal communication method. Therefore, in the data processing terminal system in the first embodiment, a feedback process from the DEC function can be carried out at the higher speed than the conventional data processing terminal system.

The functions of the microprocessor signal processing circuit (CPU) 26 to carry out the redundant data adding process for the error correction and the encoding process to the transmission data are equivalent to the functions of the encoder (ENC) 72 of the conventional data processing terminal system. This is referred to as an ENC function. It is necessary for the CPU to control the ENC function such that the optimal error correction method and the optimal encoding method selected based upon condition in the radio zone are carried out.

In the conventional data processing terminal system, the ENC function {the encoder (ENC) 72} is provided to the microwave transmitting and receiving unit 1. Therefore, the mechanism (transmission mechanism) was needed for transmitting the control data from the microprocessor signal processing circuit (CPU) 75 in the microprocessor signal processing unit 18 to the encoder (ENC) 72. The control data controls the ENC function such that the optimal error correction method and the optimal encoding method are carries out.

In the data processing terminal system in the first embodiment, the above-mentioned transfer mechanism is unnecessary because the microprocessor signal processing circuit (CPU) 26 has the ENC function in the microprocessor signal processing unit 2. Thus, by carrying out only the communication processing program (the software algorithm), the microprocessor signal processing circuit (CPU) 26 can carry out the redundant data adding process for the error correction and the encoding process to the transmission data, in accordance with the optimal error correction method and the optimal encoding method. With this, in the data processing terminal system in the first embodiment, the control of the ENC function can be carried out at the higher speed than the conventional data processing terminal system.

Next, an operation when the data processing terminal system in the first embodiment receives the signal will be described.

The reception RF signal received by the antenna 51 is outputted to the low noise amplifier (LNA) 53 by the duplexer (DUP) 52. The reception RF signal is amplified by the low noise amplifier (LNA) 53, and then an undesired frequency component other than the carrier-wave frequency band is removed by the band-pass filter (BPF) 54.

The reception RF signal with the undesired frequency component removed is mixed by the frequency converter (CONV) 55 with the local oscillation signal generated by the local oscillator (OSC) 57, and is converted into the reception IF signal. The carrier-wave frequency band is selected by the band-pass filter (BPF) 56 for the reception IF signal, which is in turn outputted to the demodulator (DEM) 22.

The reception IF signal from the band-pass filter (BPF) 56 is converted into the analog I signal and the analog Q signal as the reception analog BB signal by the demodulator (DEM) 22, and the converted analog I signal and analog Q signal are outputted to the A/D converters 24-1 and 24-2. The reception symbol clock with the reception symbol frequency and contained in the reception analog BB signal is recovered by the reception symbol clock recovering circuit of the demodulator (DEM) 22 and is outputted to the A/D converters 24-1 and 24-2 and the microwave transmitting and receiving unit interface 28.

By the A/D converters 24-1 and 24-2, the analog I signal and the analog Q signal from the demodulator (DEM) 22 are subjected to the sampling by use of the sampling clock synchronous with the reception symbol clock, and are converted into the digital I signal and the digital Q signal as the reception digital BB signal and are outputted to the microwave transmitting and receiving unit interface 28.

By the converting circuit of the microwave transmitting and receiving unit interface 28, the reception digital BB signal (the digital I signal and the digital Q signal) from the A/D converters 24-1 and 24-2 are subjected to the parallel bit converting process in synchronization with the reception symbol clock from the demodulator (DEM) 22, and then stored in the reception data buffer circuit of the microwave transmitting and receiving unit interface 28 in synchronization with the reception symbol clock. The reception digital BB signal (the digital I signal and the digital Q signal) stored in the reception data buffer circuit is subjected to the signal level converting process by the converting circuit of the microwave transmitting and receiving unit interface 28, is subjected to the timing adjusting process by the timing adjusting circuit of the microwave transmitting and receiving unit interface 28, and is outputted to the microprocessor signal processing unit interface 29 in synchronization with the bus clock from the microprocessor signal processing unit 2.

By the converting circuit of the microprocessor signal processing unit interface 29, the reception digital BB signal (the digital I signal and the digital Q signal) from the microwave transmitting and receiving unit interface 28 is subjected to the parallel bit converting process in synchronization with the reference clock from the clock generator 30, and then is stored in the reception data buffer circuit of the microprocessor signal processing unit interface 29 in synchronization with the reference clock. The reception digital BB signal (the digital I signal and the digital Q signal) stored in the reception data buffer circuit is subjected to the signal level converting process by the converting circuit of the microprocessor signal processing unit interface 29, is subjected to the timing adjusting process by the timing adjusting circuit of the microprocessor signal processing unit interface 29, and is outputted to the microprocessor signal processing circuit (CPU) 26 in synchronization with the reference clock from the clock generator 30.

Based on the communication processing program carried out by the microprocessor signal processing circuit (CPU) 26, the reception digital BB signal (the digital I signal and the digital Q signal) from the microprocessor signal processing unit interface 29 is subjected to the error correction process, the decoding process, the identification data removing process, the Fourier transform, and the digital waveform shaping processing, in synchronization with the reference clock from the clock generator 30, and then is converted into the reception data. The microprocessor signal processing circuit (CPU) 26 processes the generated reception data based on the application program (for example, the e-mail processing program).

Next, an operation when the data processing terminal system in the first embodiment transmits the signal will be described.

The microprocessor signal processing circuit (CPU) 26, after generating the transmission data with the application program (for example, the e-mail processing program), carries out the redundant data adding process for the error correction, the inverse Fourier transform, and the digital waveform shaping processing to the transmission data, in synchronization with the reference clock from the clock generator 30 based on the communication processing program, to convert into the transmission digital BB signal (the digital I signal and the digital Q signal); and outputs the converted transmission digital BB signal to the microprocessor signal processing unit interface 29 in synchronization with the reference clock.

By the converting circuit of the microprocessor signal processing unit interface 29, the transmission digital BB signal (the digital I signal and the digital Q signal) from the microprocessor signal processing circuit (CPU) 26 is subjected to the parallel bit converting process in synchronization with the reference clock from the clock generator 30, and then is stored in the transmission data buffer circuit of the microprocessor signal processing unit interface 29 in synchronization with the reference clock. The transmission digital BB signal (the digital I signal and the digital Q signal) stored in the transmission data buffer circuit is subjected to the signal level converting process by the converting circuit of the microprocessor signal processing unit interface 29, is subjected to the timing adjusting process by the timing adjusting circuit of the microprocessor signal processing unit interface 29, and then is outputted to the microwave transmitting and receiving unit interface 28 in synchronization with the reference clock from the clock generator 30.

By the converting circuit of the microwave transmitting and receiving unit interface 28, the transmission digital BB signal (the digital I signal and the digital Q signal) from the microprocessor signal processing unit interface 29 is subjected to the parallel bit converting process in synchronization with the bus clock from the microprocessor signal processing unit interface 29, and then is stored in the transmission data buffer circuit of the microwave transmitting and receiving unit interface 28 in synchronization with the bus clock. The transmission digital BB signal (the digital I signal and the digital Q signal) stored in the transmission data buffer circuit is subjected to the signal level converting process by the converting circuit of the microwave transmitting and receiving unit interface 28, is subjected to the timing adjusting process by the timing adjusting circuit of the microwave transmitting and receiving unit interface 28, and then is outputted to the D/A converters 25-1 and 25-2 in synchronization with the transmission symbol clock from the clock generator 27.

By the D/A converters 25-1 and 25-2, the transmission digital BB signal (the digital I signal and the digital Q signal) from the microwave transmitting and receiving unit interface 28 is converted into the transmission analog BB signal (the analog I signal and the analog Q signal) in synchronization with the transmission symbol clock from the clock generator 27, and then is outputted to the modulator (MOD) 23.

The transmission analog BB signal (the analog I signal and the analog Q signal) from the D/A converters 25-1 and 25-2 is converted into the transmission IF signal by the modulator (MOD) 23, to be outputted to the band-pass filter (BPF) 62. By the band-pass filter (BPF) 62, the transmission IF signal is limited to the carrier-wave frequency band, and is outputted to the frequency converter (CONV) 61.

By the frequency converter (CONV) 61, the transmission IF signal from the band-pass filter (BPF) 62 is mixed with the local oscillation signal generated by the local oscillator (OSC) 58, to be converted into the transmission RF signal. An undesired frequency component other than the carrier-wave frequency band is removed from the transmission RF signal by the band-pass filter (BPF) 60.

By the power amplifier (PA) 59, the transmission RF signal with the undesired frequency component removed is amplified, and is radiated from the duplexer (DUP) 52 to the network through the antenna 51.

In the data processing terminal system in the first embodiment, the microprocessor signal processing circuit (CPU) 26 of the microprocessor signal processing unit 2 carries out the error correction process, the redundant data adding process for the error correction, the encoding and decoding process, the identification data adding and removing process, and the like. All these processes are digital signal processes. In the microprocessor signal processing circuit (CPU) 26, for the purpose of carrying out these processes, the function of the identification data processing circuit is provided by the decoder (DEC) 71, the encoder (ENC) 72, and the microwave transmitting and receiving unit interface 73 in the microwave transmitting and receiving unit 17 of the data processing terminal system in the second conventional example. For this reason, the data processing terminal system in the first embodiment can be made smaller than the data processing terminal system in the second conventional example. Thus, the downsizing can be realized in the data processing terminal system in the first embodiment.

In the data processing terminal system in the first embodiment, as mentioned above, the function of the identification data processing circuit by the decoder (DEC) 71, the encoder (END) 72, and the microwave transmitting and receiving unit interface 73 is provided in the microprocessor signal processing circuit (CPU) 26. For this reason, the data processing terminal system in the first embodiment can reduce power consumption than the data processing terminal system in the second conventional example. Thus, low power consumption can be realized in the data processing terminal system in the first embodiment.

In the data processing terminal system in the first embodiment, it is not necessary to incorporate the identification data processing circuit by the decoder (DEC) 71, the encoder (ENC) 72, and the microwave transmitting and receiving unit interface 73 in the microwave transmitting and receiving unit 17 of the data processing terminal system in the second conventional example, into the microwave transmitting and receiving unit 1. Therefore, heat generated by the microwave transmitting and receiving unit 1 in accordance with the transmission and reception (the input and output) of the signal is smaller than the heat generated by the microwave transmitting and receiving unit 17 of the data processing terminal system in the second conventional example.

In the data processing terminal system in the first embodiment, as mentioned above, the function of the identification data processing circuit by the decoder (DEC) 71, the encoder (ENC) 72, and the microwave transmitting and receiving unit interface 73 is provided in the microprocessor signal processing circuit (CPU) 26. For this reason, in the data processing terminal system in the first embodiment, it is easy to process the heat generated from the microprocessor signal processing unit 2 by utilizing a heat-radiation mechanism of the microprocessor signal processing unit 2, which generates heat.

Thus, the heat-radiation process becomes easy in the data processing terminal system in the first embodiment.

If the microwave transmitting and receiving unit 1 has a shape similar to a card, a condition for radiating the heat generated from the microwave transmitting and receiving unit 1 is set stricter than usual. Usually, when the heat generated from the microwave transmitting and receiving unit 1 is radiated, an amount of manufacturing costs to manufacture the mechanism necessary for the radiation is required. In the data processing terminal system in the first embodiment, the above-mentioned manufacturing costs are not required since lower heat generation can be realized. Thus, in the data processing terminal system in the first embodiment, lowered costs can be realized.

The data processing terminal system in the first embodiment can be configured in such a manner that the microwave transmitting and receiving unit 1 can be attached and detached. When the data processing terminal system in the first embodiment is used as the data processing terminal for carrying out a general data processing, a function of the transmitting and receiving apparatus (the microwave transmitting and receiving unit 1) is not used. For this reason, the user can separate the microwave transmitting and receiving unit 1 and the microprocessor signal processing unit 2, and use the data processing terminal system as the data processing terminal with only the function of the microprocessor signal processing unit 2. Therefore, in the data processing terminal system in the first embodiment, portability in using as the data processing terminal is improved.

In the data processing terminal system in the first embodiment, a hardware and a software can be individually replaced, since separation into the hardware (the microwave transmitting and receiving unit 1) and the software (the microprocessor signal processing unit 2) is possible. In the data processing terminal system in the first embodiment, when the specification depended on the hardware (for example, a radio frequency) is changed, only the hardware (the microwave transmitting and receiving unit 1) needs to be replaced. Therefore, the data processing terminal system in the first embodiment excels in economical efficiency, since it is not necessary to separately prepare a set of apparatus when the specification is changed.

Thus, in the data processing terminal system in the first embodiment, usefulness (portability, economical efficiency) is improved.

Additionally, in the data processing terminal system in the first embodiment, the modulation and demodulation processing unit 81, converts the reception intermediate frequency signal (the reception IF signal) as the reception modulation wave signal from the high-frequency processing unit 21 into the reception digital BB signal to output to the microprocessor signal processing unit 2 at the time of the reception. The modulation and demodulation processing unit 81 converts the transmission digital BB signal from the microprocessor signal processing unit 2 into the transmission intermediate frequency signal (the transmission IF signal) as the transmission modulation wave signal, to output the converted transmission IF signal to the high-frequency processing unit 21 at the time of the transmission. However, the present invention is not limitation to the foregoing. That is, it is also possible that the modulation and demodulation processing unit 81 converts the reception RF signal as the reception modulation wave signal from the high-frequency processing unit 21 into the reception digital BB signal, to output the converted reception digital BB signal to the microprocessor signal processing unit 2 at the time of the reception, and converts the transmission digital BB signal from the microprocessor signal processing unit 2 into the transmission RF signal as the transmission modulation wave signal, to output the converted transmission RF signal to the high-frequency processing unit 21 at the time of the transmission.

Figure 10:
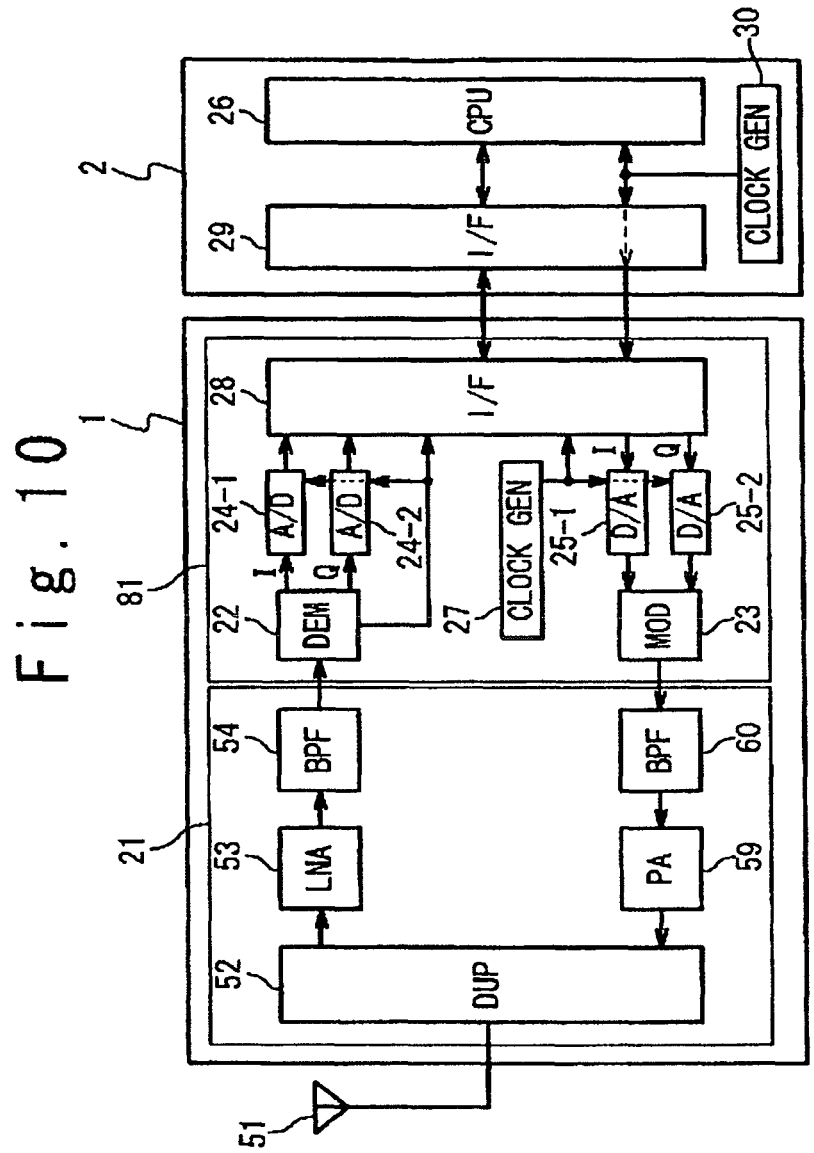
FIG. 10 shows a modification of the information processing terminal system according to the first embodiment of the present invention.

In this case, in a modification of the data processing terminal system in the present invention, as shown in FIG. 10, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 22 converts the reception RF signal from the band-pass filter (BPF) 54 into the reception analog BB signal (the analog I signal and the analog Q signal), and outputs the converted reception analog BB signal to the A/D converters 24-1 and 24-2.

The reception symbol clock regenerative clock of the demodulator (DEM) 22 generates (recovers) the reception symbol clock having a frequency of n times (n is an integer number) of the reception symbol frequency superimposed on the reception analog BB signal, and outputs the generated (recovered) reception symbol clock to the microwave transmitting and receiving unit interface 28.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

[Second Embodiment]

Figure 3:
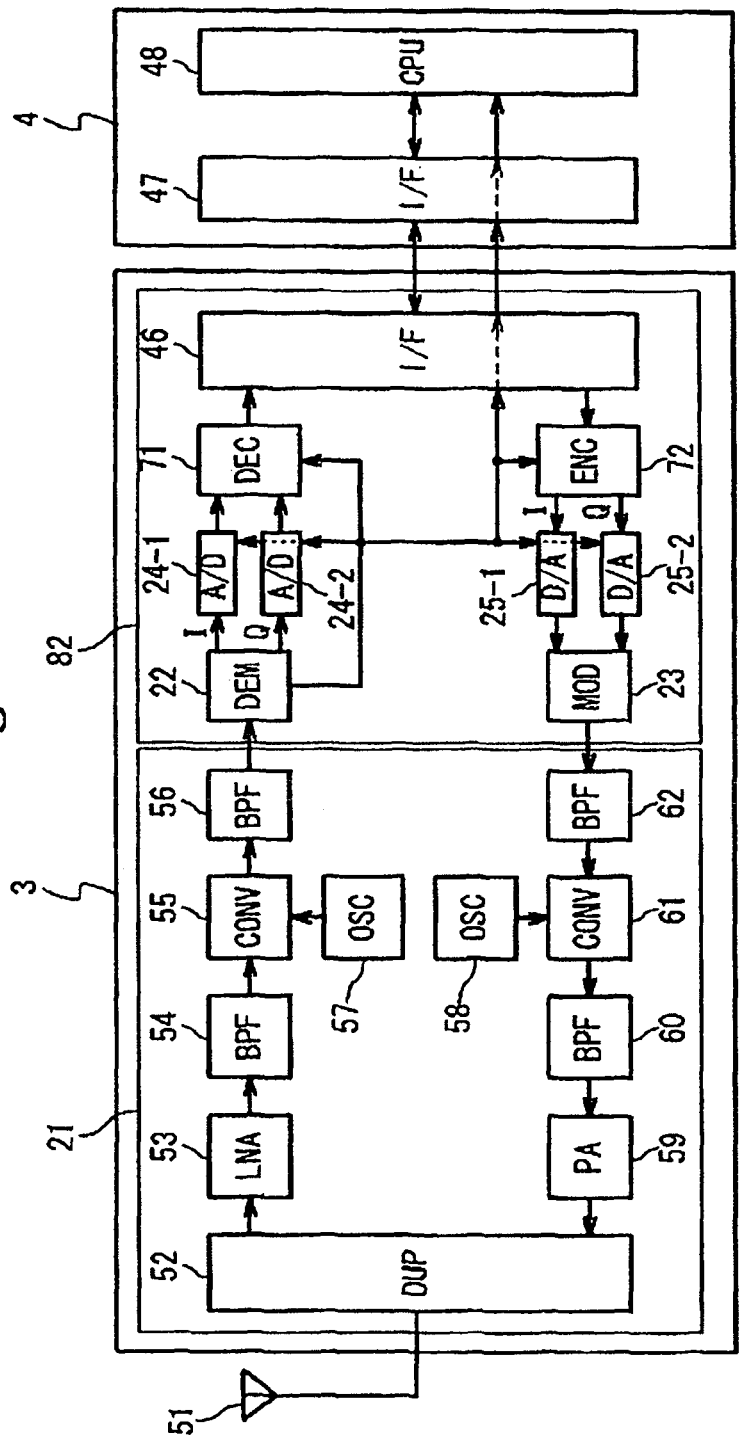
FIG. 3 shows a configuration of the information processing terminal system according to a second embodiment of the present invention.

FIG. 3 shows a configuration of a data processing terminal system using a microwave-band quadrature amplitude modulation wave, as a data processing terminal system according to the second embodiment of the present invention. In the data processing terminal system in the second embodiment, downsizing, lowered generated heat, and lowered costs are realized, reduction in throughput is prevented, and usefulness (portability, economical efficiency) is improved. In the second embodiment, description overlapped with the foregoing is omitted.

The data processing terminal system in the second embodiment has the antenna 51 connected to a network, a microwave transmitting and receiving unit 3, and a microprocessor signal processing unit 4. The antenna 51 and the microwave transmitting and receiving unit 3 are a transmitting and receiving apparatus (communication apparatus). The microprocessor signal processing unit 4 is a data processing terminal. That is, the data processing terminal system in the second embodiment has the microwave transmitting and receiving unit 3 and the microprocessor signal processing unit 4, instead of the microwave transmitting and receiving unit 1 and the microprocessor signal processing unit 2 of the data processing terminal system in the first embodiment.

The microwave transmitting and receiving unit 3, at the time of the reception, demodulates a reception high-frequency signal (reception RF signal) as a modulation wave received through the antenna 51 into reception data, and outputs the demodulated reception data to the microprocessor signal processing unit 4. The microwave transmitting and receiving unit 3, at the time of the transmission, converts transmission data from the microprocessor signal processing unit 4 into a transmission radio frequency signal (transmission RF signal) as a modulation wave, and transmits the converted transmission RF signal through the antenna 51.

The microwave transmitting and receiving unit 3 is provided with the high-frequency processing unit 21 and a modulation and demodulation processing unit 82. The high-frequency processing unit 21 is the same as that of the first embodiment (see FIG. 2).

The high-frequency processing unit 21, at the time of the reception, converts the reception RF signal received through the antenna 51 into a reception intermediate frequency signal (reception IF signal); and outputs the converted reception IF signal to the modulation and demodulation processing unit 82. The high-frequency processing unit 21, at the time of the transmission, converts the transmission IF signal from the modulation and demodulation processing unit 82 into the transmission RF signal, and transmits the converted transmission RF signal through the antenna 51.

The modulation and demodulation processing unit 82, at the time of the reception, converts the reception IF signal as a reception modulation wave signal from the high-frequency processing unit 21, into the reception data, and outputs the converted reception data to the microprocessor signal processing unit 4. The modulation and demodulation processing unit 82, at the time of the transmission, converts the transmission data from the microprocessor signal processing unit 4, into the transmission IF signal as a transmission modulation wave signal, and outputs the converted transmission IF signal to the high-frequency processing unit 21.

The modulation and demodulation processing unit 82 is provided with the demodulator (DEM) 22, a modulator (MOD) 23, and a baseband processing unit. The baseband processing unit is provided with the analog/digital (A/D) converters 24-1 and 24-2, the digital/analog (D/A) converters 25-1 and 25-2, the decoder (DEC) 71, the encoder (ENC) 72, and a microwave transmitting and receiving unit interface (I/F) 46. The demodulator (DEM) 22, the modulator (MOD) 23, the A/D converters 24-1 and 24-2, and the D/A converters 25-1 and 25-2 are the same as those in the first embodiment (see FIG. 2). That is, the modulation and demodulation processing unit 82 is provided with the decoder (DEC) 71, the encoder (ENC) 72, and the microwave transmitting and receiving unit interface 46, instead of the clock generator 27 and the microwave transmitting and receiving unit interface 28 of the modulation and demodulation processing unit 81 in the first embodiment.

The microprocessor signal processing unit 4 is provided with a microprocessor signal processing unit interface (I/F) 47 and a microprocessor signal processing circuit (CPU) 48.

The microprocessor signal processing circuit (CPU) 48 contains a microprocessor (not shown), a memory (not shown), an input and output unit (not shown), and the like. In the memory, a plurality of programs (not shown) are stored.

The microprocessor signal processing unit 4 is further provided with a clock generator (not shown).

The data processing terminal system in the second embodiment is configured in such a manner that the microwave transmitting and receiving unit 3 can be attached to and detached from the microprocessor signal processing unit 4. Even when the microwave transmitting and receiving unit 3 and the microprocessor signal processing unit 4 are separated, it is possible for the microprocessor signal processing circuit (CPU) 48 to carry out general programs (not shown) for spreadsheet processing and word-processing, which do not use a microwave transmitting and receiving function, and which are selected from among a plurality of programs stored in the memory, in synchronization with a clock from the clock generator of the microprocessor signal processing unit 4. Also, it is possible to carry out the general data processing (processing in which only the function of the data processing terminal is used). In other words, a user can use a part of the data processing terminal system in the second embodiment only with the function of the microprocessor signal processing unit 4 as the data processing terminal.

First, the modulation and demodulation processing unit 82 will be described.

The demodulator (DEM) 22 is provided with a carrier-wave recovering circuit (not shown) and a reception symbol clock recovering circuit (not shown). The carrier-wave recovering circuit of the demodulator (DEM) 22 is the same as that of the demodulator (DEM) 22 of the modulation and demodulation processing unit 81 in the first embodiment.

The reception symbol clock recovering circuit of the demodulator (DEM) 22 has output destinations of the reception symbol clock different from the reception symbol clock recovering circuit of the demodulator (DEM) 22 of the modulation and demodulation processing unit 81 in the first embodiment. The reception symbol clock recovering circuit generates (recovers) a reception symbol clock having a frequency n times (n is an integer number) larger than a reception symbol frequency superimposed on the reception analog BB signal, and outputs the generated (recovered) reception symbol clock to the A/D converters 24-1 and 24-2, the decoder (DEC) 71, the D/A converters 25-1 and 25-2, the encoder (ENC) 72, the microwave transmitting and receiving unit interface 46, the microprocessor signal processing unit interface 47, and the microprocessor signal processing circuit (CPU) 48.

The A/D converters 24-1 and 24-2 carry out sampling of an analog I signal and an analog Q signal from the demodulator (DEM) 22 with a sampling clock synchronous with the reception symbol clock, generate (conversion) a digital in-phase component signal (digital I signal) and a digital quadrature component signal (digital Q signal) respectively corresponding to the amplitudes of the analog I signal and the analog Q signal at the time of the sampling, as reception digital baseband signals (reception digital BB signal); and outputs the generated (converted) reception digital BB signal to the decoder (DEC) 71.

The decoder (DEC) 71 carries out processes of error correction and decoding to the digital I signal and the digital Q signal of the reception digital BB signal in synchronization with the reception symbol clock from the demodulator (DEM) 22, and outputs the reception data to the microwave transmitting and receiving unit interface 46 in synchronization with the reception symbol clock.

The microwave transmitting and receiving unit interface 46 is provided with a conversion and identification data processing circuit (not shown). The conversion and identification data processing circuit incorporates a converting circuit having the same function as a converting circuit of the microwave transmitting and receiving unit interface 28 of the modulation and demodulation processing unit 81 in the first embodiment. The converting circuit carries out the signal level converting process and the parallel bit converting process to the reception data and the transmission data.

The conversion and the identification data processing circuit of the microwave transmitting and receiving unit interface 46, at the time of the reception, carries out the signal level converting process, the parallel bit converting process, and a removal process of signal identification data in a radio zone (identification data removing process) to the reception data from the decoder (DEC) 71 in synchronization with the reception symbol clock from the demodulator (DEM) 22, and outputs the processed reception data to the microprocessor signal processing unit 4 (the microprocessor signal processing unit interface 47) in synchronization with the reception symbol clock from the demodulator (DEM) 22.

The conversion and identification data processing circuit of the microwave transmitting and receiving unit interface 46, at the time of the transmission, carries out the signal level converting process, the parallel bit converting process, and a signal identification data adding process in the radio zone (identification data adding process) to the transmission data from the microprocessor signal processing unit 4 (the microprocessor signal processing unit interface 47) in synchronization with the reception symbol clock from the demodulator (DEM) 22, and outputs the processed transmission data to the encoder (ENC) 72 in synchronization with the reception symbol clock from the demodulator (DEM) 22.

The encoder (ENC) 72 carries out a redundant data adding process for error correction and an encoding process to the transmission data from the microwave transmitting and receiving unit interface 46 in synchronization with the reception symbol clock from the demodulator (DEM) 22, to generate the digital I signal and the digital Q signal as a transmission digital baseband signal (transmission digital BB signal); and outputs the generated digital I signal and digital Q signal to the D/A converters 25-1 and 25-2 in synchronization with the reception symbol clock.

The D/A converters 25-1 and 25-2 convert the digital I signal and the digital Q signal into the analog I signal and the analog Q signal as a transmission analog baseband signal (transmission analog BB signal) in synchronization with the reception symbol clock from the demodulator (DEM) 22 to show the amplitudes of the carrier-waves and outputs the converted analog I signal and analog Q signal to the modulator (MOD) 23.

The modulator (MOD) 23 carries out quadrature modulation to the analog I signal and the analog Q signal of the transmission analog baseband signal (transmission analog BB signal) to generate a transmission intermediate frequency signal (transmission IF signal), and outputs the generated transmission IF signal to the frequency converter (CONV) 61 through the band-pass filter (BPF) 62.

Next, the microprocessor signal processing unit 4 will be described.

The microprocessor signal processing unit interface 47 switches a source of the clock outputted to the microprocessor signal processing circuit (CPU) 48, based upon whether or not the microwave transmitting and receiving unit 3 is attached to the microprocessor signal processing unit 4.

When the microwave transmitting and receiving unit 3 is attached to the microprocessor signal processing unit 4, the microprocessor signal processing unit interface 47 outputs the reception symbol clock from the demodulator (DEM) 22 to the microprocessor signal processing circuit (CPU) 48. At this time, the microprocessor signal processing unit interface 47 controls the clock generator such that the clock from a clock generator of the microprocessor signal processing unit 4 is not outputted to the microprocessor signal processing circuit (CPU) 48.

The microprocessor signal processing unit interface 47 is provided with a converting circuit (not shown). The converting circuit has the same function as a converting circuit of the microprocessor signal processing unit interface 29 of the microprocessor signal processing unit 2 in the first embodiment. The converting circuit carries out the signal level converting process and the parallel bit converting process to the reception data and the transmission data.

The converting circuit of the microprocessor signal processing unit interface 47, at the time of the reception, carries out the signal level converting process and the parallel bit converting process to the reception data from the microwave transmitting and receiving unit 3 (the microwave transmitting and receiving unit interface 46) in synchronization with the reception symbol clock from the demodulator (DEM) 22, and outputs the reception data to the microprocessor signal processing circuit (CPU) 48 in synchronization with the reception symbol clock from the demodulator (DEM) 22.

The converting circuit of the microprocessor signal processing unit interface 47, at the time of the transmission, carries out the signal level converting process and the parallel bit converting process to the transmission data from the microprocessor signal processing circuit (CPU) 48 in synchronization with the reception symbol clock from the demodulator (DEM) 22, and outputs the transmission data to the microwave transmitting and receiving unit interface 46 in synchronization with the reception symbol clock.

The microprocessor signal processing circuit (CPU) 48 executes an application program (for example, an e-mail processing program) (not shown) among the plurality of programs stored in the memory.

The microprocessor signal processing circuit (CPU) 48, at the time of the reception, processes the reception data from the microprocessor signal processing unit interface 47, based on the application program (for example, the e-mail processing program).

The microprocessor signal processing circuit (CPU) 48, at the time of the transmission, outputs the transmission data generated based on the application program (for example, the e-mail processing program) to the microprocessor signal processing unit interface 47, in synchronization with the reception symbol clock from the demodulator (DEM) 22.

Next, an operation when the data processing terminal system in the second embodiment receives a signal will be described. Description of the operation overlapped with the first embodiment is omitted.

In the demodulator (DEM) 22, the reception IF signal from the band-pass filter (BPF) 56 is converted into the analog I signal and the analog Q signal as the reception analog BB signal, and the converted analog I signal and analog Q signal are outputted to the A/D converters 24-1 and 24-2. The reception symbol clock with the frequency of a reception symbol contained in the reception analog BB signal is recovered by the reception symbol clock recovering circuit of the demodulator (DEM) 22, and the recovered reception symbol clock is outputted to the A/D converters 24-1 and 24-2, the decoder (DEC) 71, the D/A converters 25-1 and 25-2, the encoder (ENC) 72, the microwave transmitting and receiving unit interface 46, the microprocessor signal processing unit interface 47, and the microprocessor signal processing circuit (CPU) 48.

In the A/D converters 24-1 and 24-2, the analog I signal and the analog Q signal from the demodulator (DEM) 22 are sampled with a sampling clock synchronous with the reception symbol clock, and the sampled analog I signal and analog Q signal are converted into the digital I signal and the digital Q signal as the reception digital BB signal. The converted digital I signal and digital Q signal are then outputted to the decoder (DEC) 71 in synchronization with the reception symbol clock.

In the decoder (DEC) 71, the digital I signal and the digital Q signal from the A/D converters 24-1 and 24-2 are subjected to the processes of the error correction and the decoding, and are synchronized with the reception symbol clock from the demodulator (DEM) 22, and is then outputted to the microwave transmitting and receiving unit interface 46 in synchronization with the reception symbol clock.

In the microwave transmitting and receiving unit interface 46, the reception data from the decoder (DEC) 71 is converted into the reception data that has been subjected to the signal level converting process, the parallel bit converting process, and the identification data removing process, in synchronization with the reception symbol clock from the demodulator (DEM) 22, and then is outputted to the microprocessor signal processing unit interface 47 in synchronization with the reception symbol clock.

In the microprocessor signal processing unit interface 47, the reception data from the microwave transmitting and receiving unit interface 46 is subjected to the signal level converting process and the parallel bit converting process in synchronization with the reception symbol clock from the demodulator (DEM) 22, and then is outputted to the microprocessor signal processing circuit (CPU) 48 in synchronization with the reception symbol clock.

The microprocessor signal processing circuit (CPU) 48 processes the reception data from the microprocessor signal processing unit interface 47 in synchronization with the reception symbol clock, based on an application program (for example, the e-mail processing program) stored in the memory.

Next, an operation when the data processing terminal system in the second embodiment transmits a signal will be described. Description of the operation overlapped with the first embodiment is omitted.

The microprocessor signal processing circuit (CPU) 48, after generating transmission data based on an application program (for example, the e-mail processing program), outputs the transmission data to the microprocessor signal processing unit interface 47 in synchronization with the reception symbol clock from the demodulator (DEM) 22 based on the application program.

In the microprocessor signal processing unit interface 47, the transmission data from the microprocessor signal processing circuit (CPU) 48 is subjected to the signal level converting process and the parallel bit converting process in synchronization with the reception symbol clock from the demodulator (DEM) 22, and then is outputted to the microwave transmitting and receiving unit interface 46 in synchronization with the reception symbol clock.

In the microwave transmitting and receiving unit interface 46, the transmission data from the microprocessor signal processing unit interface 47 is subjected to the signal level converting process, the parallel bit converting process, and the identification data adding process, in synchronization with the reception symbol clock from the demodulator (DEM) 22, and then is outputted to the encoder (ENC) 72 in synchronization with the reception symbol clock.

In the encoder (ENC) 72, the transmission data from the microwave transmitting and receiving unit interface 46 is converted into the digital I signal and the digital Q signal, that have been subjected to the redundant data adding process for the error correction and the encoding process, as a transmission digital baseband signal (transmission digital BB signal), in synchronization with the reception symbol clock from the demodulator (DEM) 22, and is then outputted to the D/A converters 25-1 and 25-2 in synchronization with the reception symbol clock.

In the D/A converters 25-1 and 25-2, the digital I signal and the digital Q signal from the encoder (ENC) 72 are converted into the analog I signal and the analog Q signal as the transmission analog BB signal in synchronization with the reception symbol clock from the demodulator (DEM) 22, and is then outputted to the modulator (MOD) 23.

In the modulator (MOD) 23, the transmission analog BB signal (the analog I signal and the analog Q signal) from the D/A converters 25-1 and 25-2 is converted into the transmission IF signal, and is outputted to the band-pass filter (BPF) 62.

In the data processing terminal system in the second embodiment, the A/D converters 24-1 and 24-2, the decoder (DEC) 71, the D/A converters 25-1 and 25-2, the encoder (ENC) 72, the microwave transmitting and receiving unit interface 46, the microprocessor signal processing unit interface 47, and the microprocessor signal processing circuit (CPU) 48 operate at timing synchronous with the reception symbol clock from the demodulator (DEM) 22. For this reason, in the data processing terminal system in the second embodiment, a timing adjusting process is unnecessary that is carried out in the data processing terminal system in the second conventional example. Therefore, in the data processing terminal system in the second embodiment, the reception data buffer circuit, the transmission data buffer circuit, and a timing adjusting circuit associated with the timing adjusting process, are not necessary. For this reason, the microwave transmitting and receiving unit 3 and the microprocessor signal processing unit 4 (the microwave transmitting and receiving unit interface 46 and the microprocessor signal processing unit interface 47) of the data processing terminal system in the second embodiment can be made smaller than the microwave transmitting and receiving unit 17 and the microprocessor signal processing unit 18 (the microwave transmitting and receiving unit interface 73 and the microprocessor signal processing unit interface 74) of the data processing terminal system in the second conventional example. Thus, downsizing can be realized in the data processing terminal system in the second embodiment.

In the data processing terminal system in the second embodiment, the microwave transmitting and receiving unit interface 46 and the microprocessor signal processing unit interface 47 do not need to contain the reception data buffer circuit, the transmission data buffer circuit, and the timing adjusting circuit. For this reason, the data processing terminal system in the second embodiment can be lower in power consumption than the data processing terminal system in the second conventional example. Thus, low power consumption can be realized in the data processing terminal system in the second embodiment.

In the data processing terminal system in the second embodiment, the microwave transmitting and receiving unit 3 and the microprocessor signal processing unit 4 (the microwave transmitting and receiving unit interface 46 and the microprocessor signal processing unit interface 47) do not need to contain the reception data buffer circuit, the transmission data buffer circuit, and the timing adjusting circuit. For this reason, a heat generated by the microwave transmitting and receiving unit 3 and the microprocessor signal processing unit 4 (the microwave transmitting and receiving unit interface 46 and the microprocessor signal processing unit interface 47) in association with the transmission and reception (the input and output) of the signal can be made smaller than the heat generated by the microwave transmitting and receiving unit 17 and the microprocessor signal processing unit 18 (the microwave transmitting and receiving unit interface 73 and the microprocessor signal processing unit interface 74) in the data processing terminal system in the second conventional example. Thus, lowered heat generation can be realized in the data processing terminal system in the second embodiment.

In the data processing terminal system in the second embodiment, the microwave transmitting and receiving unit 3 and the microprocessor signal processing unit 4 (the microwave transmitting and receiving unit interface 46 and the microprocessor signal processing unit interface 47) do not need to contain the reception data buffer circuit, the transmission data buffer circuit, and the timing adjusting circuit. For this reason, in the data processing terminal system in the second embodiment, the manufacturing cost of the microwave transmitting and receiving unit 3 and the microprocessor signal processing unit 4 (the microwave transmitting and receiving unit interface 46 and the microprocessor signal processing unit interface 47) are lower than the manufacturing cost of the microwave transmitting and receiving unit 17 and the microprocessor signal processing unit 18 (the microwave transmitting and receiving unit interface 73 and the microprocessor signal processing unit interface 74) in the data processing terminal system in the second conventional example. Thus, the lowered cost can be realized in the data processing terminal system in the second embodiment.

In the data processing terminal system in the second conventional example, the timing adjusting process may cause a transmission delay and the reduction in throughput. In the data processing terminal system in the second embodiment, as mentioned above, the timing adjusting process carried out in the data processing terminal system in the second conventional example is unnecessary. Also, the A/D converters 24-1 and 24-2, the decoder (DEC) 71, the D/A converters 25-1 and 25-2, the encoder (ENC) 72, the microwave transmitting and receiving unit interface 46, the microprocessor signal processing unit interface 47, and the microprocessor signal processing circuit (CPU) 48 operate at the timing synchronous with the reception symbol clock from the demodulator (DEM) 22. For this reason, the reduction in throughput is prevented in the data processing terminal system in the second embodiment.

The data processing terminal system in the second embodiment can be configured in such a manner that the microwave transmitting and receiving unit 3 can be attached and detached. When the data processing terminal system in the second embodiment is used as a data processing terminal in order to carry out a general data processing, the function of the transmitting and receiving apparatus (the microwave transmitting and receiving unit 3) is not used. For this reason, the user can detach the microwave transmitting and receiving unit 3 from the microprocessor signal processing unit 4, and use the data processing terminal system in the second embodiment as the data processing terminal only with the function of the microprocessor signal processing unit 4. Therefore, in the data processing terminal system in the second embodiment, portability in using as the data processing terminal is improved.

In the data processing terminal system in the second embodiment, separation into a hardware section (the microwave transmitting and receiving unit 3) and a software section (the microprocessor signal processing unit 4) is possible. Therefore, the hardware and software sections can individually be replaced. In the data processing terminal system in the second embodiment, when a specification depending on the hardware element (for example, a radio frequency) is to be replaced, only the hardware section (the microwave transmitting and receiving unit 3) needs to be replaced. Therefore, the data processing terminal system in the second embodiment excels in economical efficiency, since it is not necessary to separately prepare a set of apparatuses when the specification is changed.

In this way, in the data processing terminal system in the second embodiment, usefulness (portability, economical efficiency) is improved.

Additionally, in the data processing terminal system in the second embodiment, the modulation and demodulation processing unit 82, at the time of the reception, converts a reception intermediate frequency signal (reception IF signal) as a reception modulation wave signal from the high-frequency processing unit 21, into the reception data, and outputs the converted reception data to the microprocessor signal processing unit 4. At the time of the transmission, the modulation and demodulation processing unit 82 converts the transmission data from the microprocessor signal processing unit 4 into a transmission intermediate frequency signal (transmission IF signal) as a transmission modulation wave signal, and outputs the converted transmission IF signal to the high-frequency processing unit 21. However, the present invention is not limited to the foregoing. That is, it is also possible that the modulation and demodulation processing unit 82, at the time of the reception, converts the reception RF signal as the reception modulation wave signal from the high-frequency processing unit 21, into the reception data, and outputs the converted reception data to the microprocessor signal processing unit 4; and at the time of the transmission, converts the transmission data from the microprocessor signal processing unit 4 into the transmission RF signal as the transmission modulation wave signal, and outputs the converted transmission RF signal to the high-frequency processing unit 21.

Figure 11:
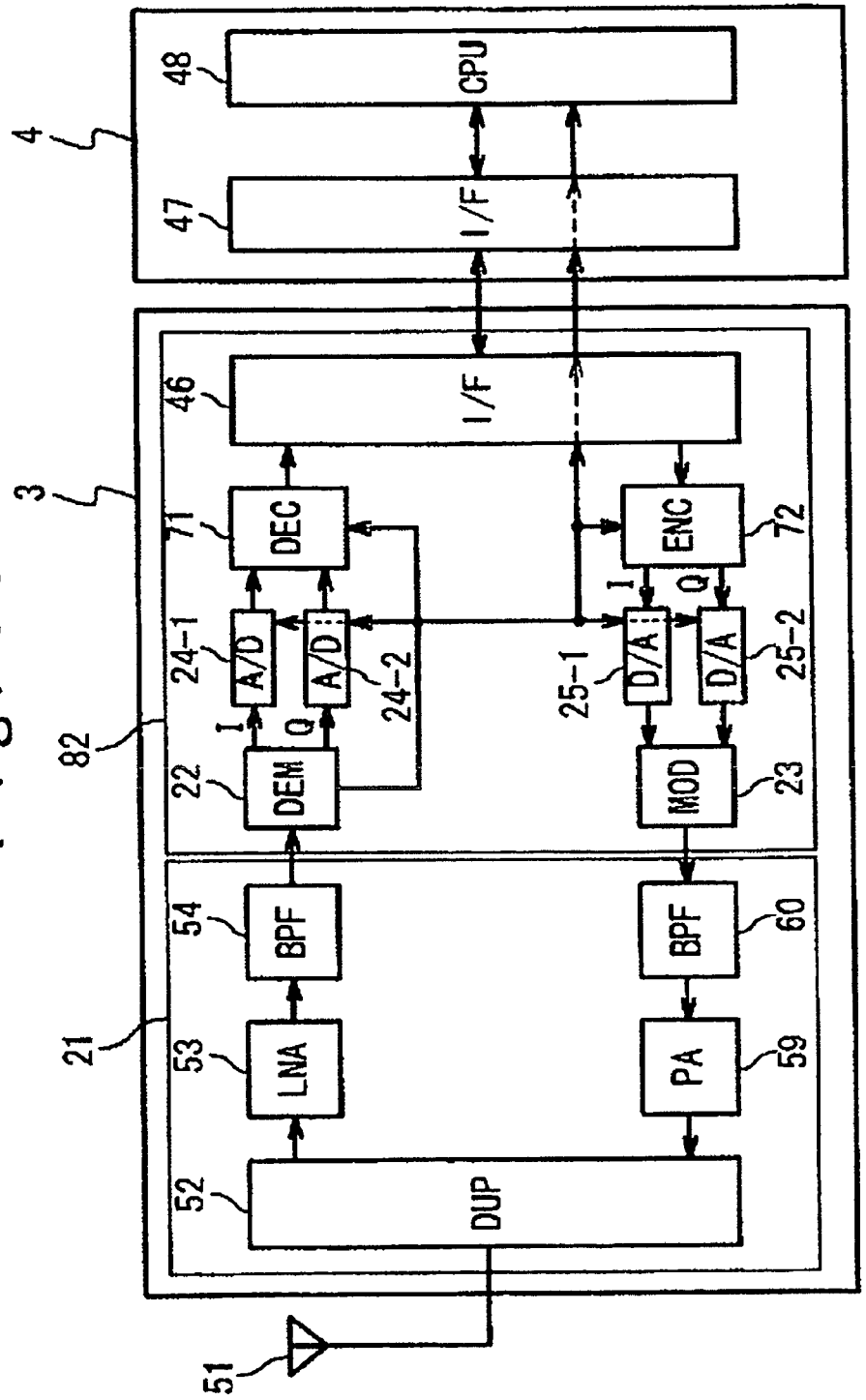
FIG. 11 shows a modification of the information processing terminal system according to the second embodiment of the present invention.

In this case, in a modification of the data processing terminal system in the second embodiment of the present invention, as shown in FIG. 11, the high-frequency processing unit 21 is provided with the duplexer (DUP) 52, the low noise amplifier (LNA) 53, band-pass filters (BPF) 54 and 60, and the power amplifier (PA) 59.

The demodulator (DEM) 22 converts the reception RF signal from the band-pass filter (BPF) 54 into the reception analog BB signal (the analog I signal and the analog Q signal), and outputs the converted reception analog BB signal to the A/D converters 24-1 and 24-2.

The reception symbol clock recovering circuit of the demodulator (DEM) 22 generates (recovers) a reception symbol clock having a frequency n times (n is an integer number) larger than the reception symbol frequency superimposed on the reception analog BB signal, and outputs the generated (recovered) reception symbol clock to the A/D converters 24-1 and 24-2, the decoder (DEC) 71, the D/A converters 25-1 and 25-2, the encoder (ENC) 72, the microwave transmitting and receiving unit interface 46, the microprocessor signal processing unit interface 47, and the microprocessor signal processing circuit (CPU) 48.

The modulator (MOD) 23 converts the transmission analog BB signal (the analog I signal and the analog Q signal) into the transmission RF signal, and outputs the converted transmission RF signal to the power amplifier (PA) 59 through the band-pass filter (BPF) 60.

[Third Embodiment]

Figure 4:
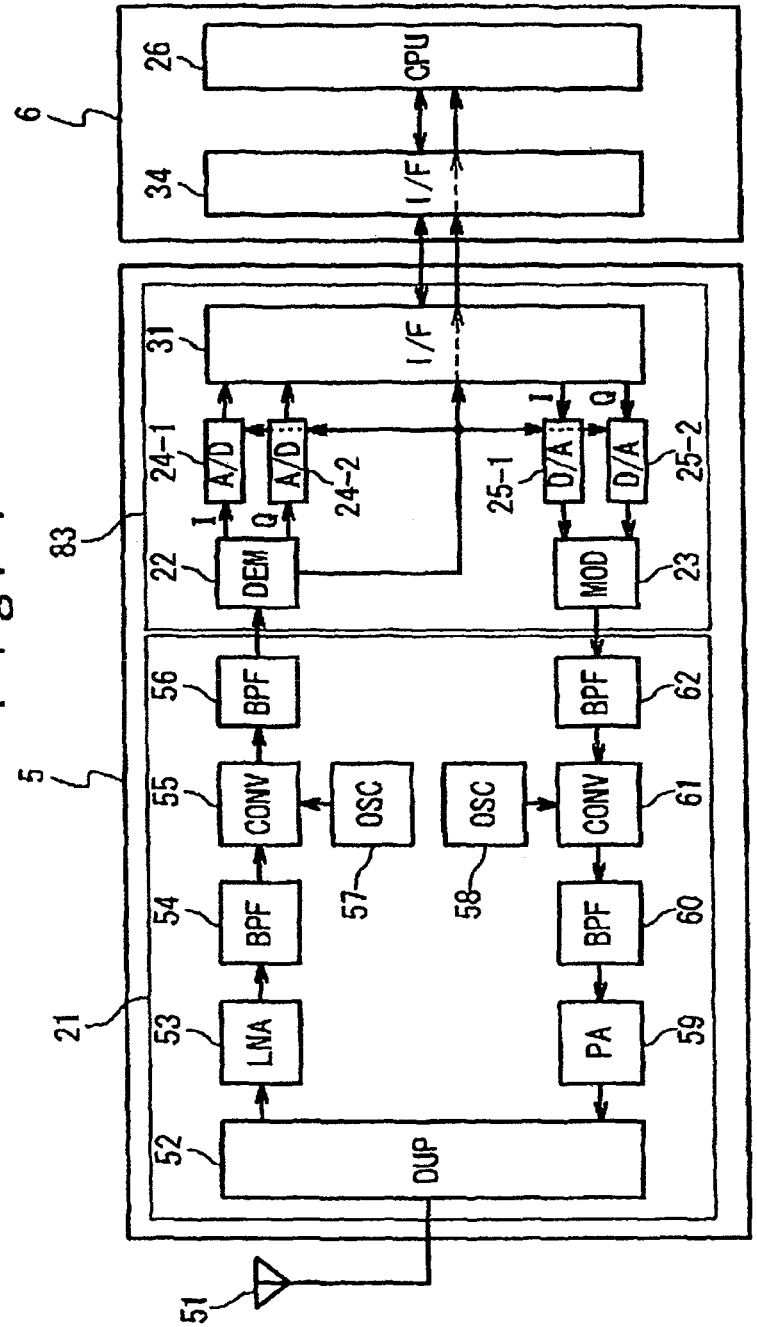
FIG. 4 shows a configuration of the information processing terminal system according to a third embodiment of the present invention.

FIG. 4 shows a configuration of a data processing terminal system using a microwave-band quadrature amplitude modulation wave, as a data processing terminal system in the third embodiment of the present invention. In the data processing terminal system in the third embodiment, effect of the second embodiment is realized, in addition to the effect of the first embodiment. In the third embodiment, description overlapped with the foregoing is omitted.

The data processing terminal system in the third embodiment has the antenna 51 connected to a network, a microwave transmitting and receiving unit 5, and a microprocessor signal processing unit 6. The antenna 51 and the microwave transmitting and receiving unit 5 are transmitting and receiving apparatus (communication apparatus). The microprocessor signal processing unit 6 is a data processing terminal. In other words, the data processing terminal system in the third embodiment has the microwave transmitting and receiving unit 5 and the microprocessor signal processing unit 6, instead of the microwave transmitting and receiving unit 1 and the microprocessor signal processing unit 2 of the data processing terminal system in the first embodiment.

The microwave transmitting and receiving unit 5 is provided with the high-frequency processing unit 21 and a modulation and demodulation processing unit 83. The high-frequency processing unit 21 is the same as that of the first embodiment (see FIG. 2).

The modulation and demodulation processing unit 83 is provided with the demodulator (DEM) 22, the modulator (MOD) 23, and a baseband processing unit. The baseband processing unit is provided with the analog/digital (A/D) converters 24-1 and 24-2, the digital/analog (D/A) converters 25-1 and 25-2, and a microwave transmitting and receiving unit interface (I/F) 31. The demodulator (DEM) 22, the modulator (MOD) 23, the A/D converters 24-1 and 24-2, and the D/A converters 25-1 and 25-2 are the same as those of the first embodiment (see FIG. 2). In other words, the modulation and demodulation processing unit 83 is provided with the microwave transmitting and receiving unit interface 31, instead of the clock generator 27 and the microwave transmitting and receiving unit interface 28 of the modulation and demodulation processing unit 81 in the first embodiment.

The microprocessor signal processing unit 6 is provided with a microprocessor signal processing unit interface (I/F) 34 and a microprocessor signal processing circuit (CPU) 26. The microprocessor signal processing circuit (CPU) 26 is the same as that of the first embodiment (see FIG. 2). That is, the microprocessor signal processing unit 6 is provided with the microprocessor signal processing unit interface 34, instead of the microprocessor signal processing unit interface 29 and the clock generator 30 of the microprocessor signal processing unit 2 in the first embodiment.

The microprocessor signal processing unit 6 is further provided with a clock generator (not shown).

The data processing terminal system in the third embodiment can be configured in such a manner that the microwave transmitting and receiving unit 5 can be attached to and detached from the microprocessor signal processing unit 6. Even when the microwave transmitting and receiving unit 5 and the microprocessor signal processing unit 6 are separated, it is possible that the microprocessor signal processing circuit (CPU) 26 carries out a general program (not shown) for spreadsheet processing and word-processing, which does not use a microwave transmitting and receiving function, from among a plurality of programs stored in the memory in synchronization with a clock from a clock generator of the microprocessor signal processing unit 6, to carry out the general data processing (processing in which only the function of the data processing terminal is used). In other words, the user can use the data processing terminal system in the third embodiment as the data processing terminal, only with the function of the microprocessor signal processing unit 6.

The demodulator (DEM) 22 of the modulation and demodulation processing unit 83 is provided with a carrier-wave recovering circuit (not shown) and a reception symbol clock recovering circuit (not shown). The carrier-wave recovering circuit of the demodulator (DEM) 22 of the modulation and demodulation processing unit 83 is the same as the carrier-wave recovering circuit of the demodulator (DEM) 22 of the modulation and demodulation processing unit 81 in the first embodiment.

The reception symbol clock recovering circuit of the demodulator (DEM) 22 has different output destinations of the reception symbol clock from the reception symbol clock recovering circuit of the demodulator (DEM) 22 of the modulation and demodulation processing unit 81 in the first embodiment. The reception symbol clock recovering circuit generates (recovers) the reception symbol clock having a frequency n times (n is an integer number) larger than the frequency of the reception symbol superimposed on the reception analog BB signal, and outputs the generated (recovered) reception symbol clock to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26.

The A/D converters 24-1 and 24-2 carry out sampling of the analog I signal and the analog Q signal from the demodulator (DEM) 22 with a sampling clock synchronous with the reception symbol clock, generate (convert them to) a digital in-phase component signal (digital I signal) and a digital quadrature component signal (digital Q signal) corresponding to the amplitudes of the carrier-waves which are shown by the analog I signal and the analog Q signal at the time of the sampling, as a reception digital baseband signal (reception digital BB signal), and output the generated (converted) reception digital BB signal to the microwave transmitting and receiving unit interface 31.

The microwave transmitting and receiving unit interface 31 is provided with a converting circuit (not shown). The function of the converting circuit of the microwave transmitting and receiving unit interface 31 is the same as the function of the converting circuit of the microwave transmitting and receiving unit interface 28 of the modulation and demodulation processing unit 81 in the first embodiment.

The microwave transmitting and receiving unit interface 31, at the time of the reception, carries out the signal level converting process and the parallel bit converting process to the reception digital BB signal (the digital I signal and the digital Q signal from the A/D converters 24-1 and 24-2) in synchronization with the reception symbol clock from the demodulator (DEM) 22 and outputs the processed reception digital BB signal (the digital I signal and the digital Q signal) to the microprocessor signal processing unit 6 in synchronization with the reception symbol clock.

The microwave transmitting and receiving unit interface 31, at the time of the transmission, carries out the signal level converting process and the parallel bit converting process to a digital I signal and a digital Q signal as a transmission digital baseband signal (transmission digital BB signal) form the microprocessor signal processing unit 6 (the microprocessor signal processing unit interface 34) in synchronization with the reception symbol clock from the demodulator (DEM) 22, and outputs the processed transmission digital BB signal (the digital I signal and the digital Q signal) to the D/A converters 25-1 and 25-2 in synchronization with the reception symbol clock.

The microprocessor signal processing unit interface 34 switches a source of a clock outputted to the microprocessor signal processing circuit (CPU) 26, based upon whether or not the microwave transmitting and receiving unit 5 is attached to the microprocessor signal processing unit 6.

The microprocessor signal processing unit interface 34, when the microwave transmitting and receiving unit 5 is attached to the microprocessor signal processing unit 6, outputs the reception symbol clock from the demodulator (DEM) 22 to the microprocessor signal processing circuit (CPU) 26. At this time, the microprocessor signal processing unit interface 34 controls the clock generator such that the clock from a clock generator of the microprocessor signal processing unit 6 is not outputted to the microprocessor signal processing circuit (CPU) 26.

The microprocessor signal processing unit interface 34 is provided with a converting circuit (not shown). The function of the converting circuit of the microprocessor signal processing unit interface 34 is the same as the function of the converting circuit of the microprocessor signal processing unit interface 29 of the microprocessor signal processing unit 2 in the first embodiment.

The converting circuit of the microprocessor signal processing unit interface 34, at the time of the reception, carries out the signal level converting process and the parallel bit converting process to the digital BB signal (the digital I signal and the digital Q signal) from the microwave transmitting and receiving unit 5 (the microwave transmitting and receiving unit interface 31) in synchronization with the reception symbol clock from the demodulator (DEM) 22, and outputs the processed reception digital BB signal (the digital I signal and the digital Q signal) to the microprocessor signal processing circuit (CPU) 26 in synchronization with the reception symbol clock.

The converting circuit of the microprocessor signal processing unit interface 34, at the time of the transmission, carries out the signal level converting process and the parallel bit converting process to the transmission digital BB signal (the digital I signal and the digital Q signal) from the microprocessor signal processing circuit (CPU) 26 in synchronization with the reception symbol clock from the demodulator (DEM) 22, and outputs the processed transmission digital BB signal (the digital I signal and the digital Q signal) to the microwave transmitting and receiving unit interface 31 in synchronization with the reception symbol clock.

Next, an operation when the data processing terminal system in the third embodiment receives a signal will be described. Description of the operation overlapped with the first embodiment is omitted.

In the demodulator (DEM) 22, the reception IF signal from the band-pass filter (BPF) 56 is converted into the analog I signal and the analog Q signal as the reception analog BB signal, to be then outputted to the A/D converters 24-1 and 24-2. The reception symbol clock with the frequency of a reception symbol contained in the reception analog BB signal is recovered by the reception symbol clock recovering circuit of the demodulator (DEM) 22, to be then outputted to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26.

In the A/D converters 24-1 and 24-2, the analog I signal and the analog Q signal from the demodulator (DEM) 22 are sampled with the sampling clock synchronous with the reception symbol clock, and are converted into the digital I signal and the digital Q signal as the reception digital BB signal, and is then outputted to the microwave transmitting and receiving unit interface 31 in synchronization with the reception symbol clock.

In the converting circuit of the microwave transmitting and receiving unit interface 31, the reception digital BB signal (the digital I signal and the digital Q signal) from the A/D converters 24-1 and 24-2 are subjected to the signal level converting process and the parallel bit converting process in synchronization with the reception symbol clock from the demodulator (DEM) 22, and are outputted to the microprocessor signal processing unit interface 34 in synchronization with the reception symbol clock.

In the converting circuit of the microprocessor signal processing unit interface 34, the reception digital BB signal (the digital I signal and the digital Q signal) from the microwave transmitting and receiving unit interface 31 is subjected to the signal level converting process and the parallel bit converting process in synchronization with the reception symbol clock from the demodulator (DEM) 22, and is outputted to the microprocessor signal processing circuit (CPU) 26 in synchronization with the reception symbol clock.

Based on a communication processing program executed by the microprocessor signal processing circuit (CPU) 26, the reception digital BB signal (the digital I signal and the digital Q signal) from the microprocessor signal processing unit interface 34 is subjected to an error correction process, a decoding process, an identification data removing process, Fourier transform, and a digital waveform shaping processing in synchronized with the reception symbol clock from the demodulator (DEM) 22, and is converted into the reception data. The microprocessor signal processing circuit (CPU) 26 processes the reception data based on an application program (for example, an e-mail processing program).

Next, an operation when the data processing terminal system in the third embodiment transmits a signal will be described. Description of the operation overlapped with the first embodiment is omitted.

After generating the transmission data based on the application program (for example, the e-mail processing program), the microprocessor signal processing circuit (CPU) 26, carries out a redundant data adding process for the error correction, an encoding process, an identification data adding process, inverse Fourier transform, and a digital waveform shaping processing to the transmission data based on the communication processing program, in synchronization with the reception symbol clock from the demodulator (DEM) 22, to be converted into the transmission digital BB signal (the digital I signal and the digital Q signal), and outputs the converted transmission digital BB signal to the microprocessor signal processing unit interface 34 in synchronization with the reception symbol clock.

In the converting circuit of the microprocessor signal processing unit interface 34, the transmission digital BB signal (the digital I signal and the digital Q signal) from the microprocessor signal processing circuit (CPU) 26 is subjected to the signal level converting process and the parallel bit converting process in synchronization with the reception symbol clock from the demodulator (DEM) 22, and is outputted to the microwave transmitting and receiving unit interface 31 in synchronization with the reception symbol clock.

In the converting circuit of the microwave transmitting and receiving unit interface 31, the transmission digital BB signal (the digital I signal and the digital Q signal) from the microprocessor signal processing unit interface 34 is subjected to the signal level converting process and the parallel bit converting process in synchronization with the reception symbol clock from the demodulator (DEM) 22, and is outputted to the D/A converters 25-1 and 25-2 in synchronization with the reception symbol clock.

In the D/A converters 25-1 and 25-2, the transmission digital BB signal (the digital I signal and the digital Q signal) from the microwave transmitting and receiving unit interface 31 is converted into the transmission analog BB signal (the analog I signal and the analog Q signal) in synchronization with the reception symbol clock from the demodulator (DEM) 22, and is outputted to the modulator (MOD) 23 in synchronization with the reception symbol clock.

In the modulator (MOD) 23, the transmission analog BB signal (the analog I signal and the analog Q signal from the D/A converters 25-1 and 25-2) is converted into the transmission IF signals and then is outputted to the band-pass filter (BPF) 62.

In the data processing terminal system in the third embodiment, the A/D converters 24-1 and 24-2, the decoder (DEC) 71, the D/A converters 25-1 and 25-2, the microwave transmitting and receiving unit interface 31, the microprocessor signal processing unit interface 34, and the microprocessor signal processing circuit (CPU) 26 operate at a timing synchronous with the reception symbol clock from the demodulator (DEM) 22. For this reason, in the data processing terminal system in the third embodiment, a timing adjusting process is unnecessary that is carried out in the data processing terminal system in the second conventional example and the first embodiment. Therefore, in the data processing terminal system in the third embodiment, a reception data buffer circuit, a transmission data buffer circuit, a timing adjusting circuit, a function of monitoring data (signal), and an interrupt circuit are not necessary that are associated with the timing adjusting process. Thus, the data processing terminal system in the third embodiment realizes the effect of the second embodiment in addition to the effect of the first embodiment.

Additionally, in the data processing terminal system in the third embodiment, the modulation and demodulation processing unit 83, at the time of the reception, converts a reception intermediate frequency signal (reception IF signal) as a reception modulation wave signal from the high-frequency processing unit 21, into the reception digital BB signal to be outputted to the microprocessor signal processing unit 6. At the time of the transmission, the modulation and demodulation processing unit 83 converts the transmission digital BB signal from the microprocessor signal processing unit 6 into a transmission intermediate frequency signal (transmission IF signal) as a transmission modulation wave signal, to be outputted to the high-frequency processing unit 21. However, the present invention is not limited to the foregoing. That is, it is also possible that the modulation and demodulation processing unit 83, at the time of the reception, converts the reception RF signal as the reception modulation wave signal from the high-frequency processing unit 21 into the reception digital BB signal, and outputs to the microprocessor signal processing unit 6; and at the time of the transmission, converts the transmission digital BB signal from the microprocessor signal processing unit 6 into the transmission RF signal as the transmission modulation wave signal, and outputs the converted transmission RF signal to the high-frequency processing unit 21.

Figure 12:
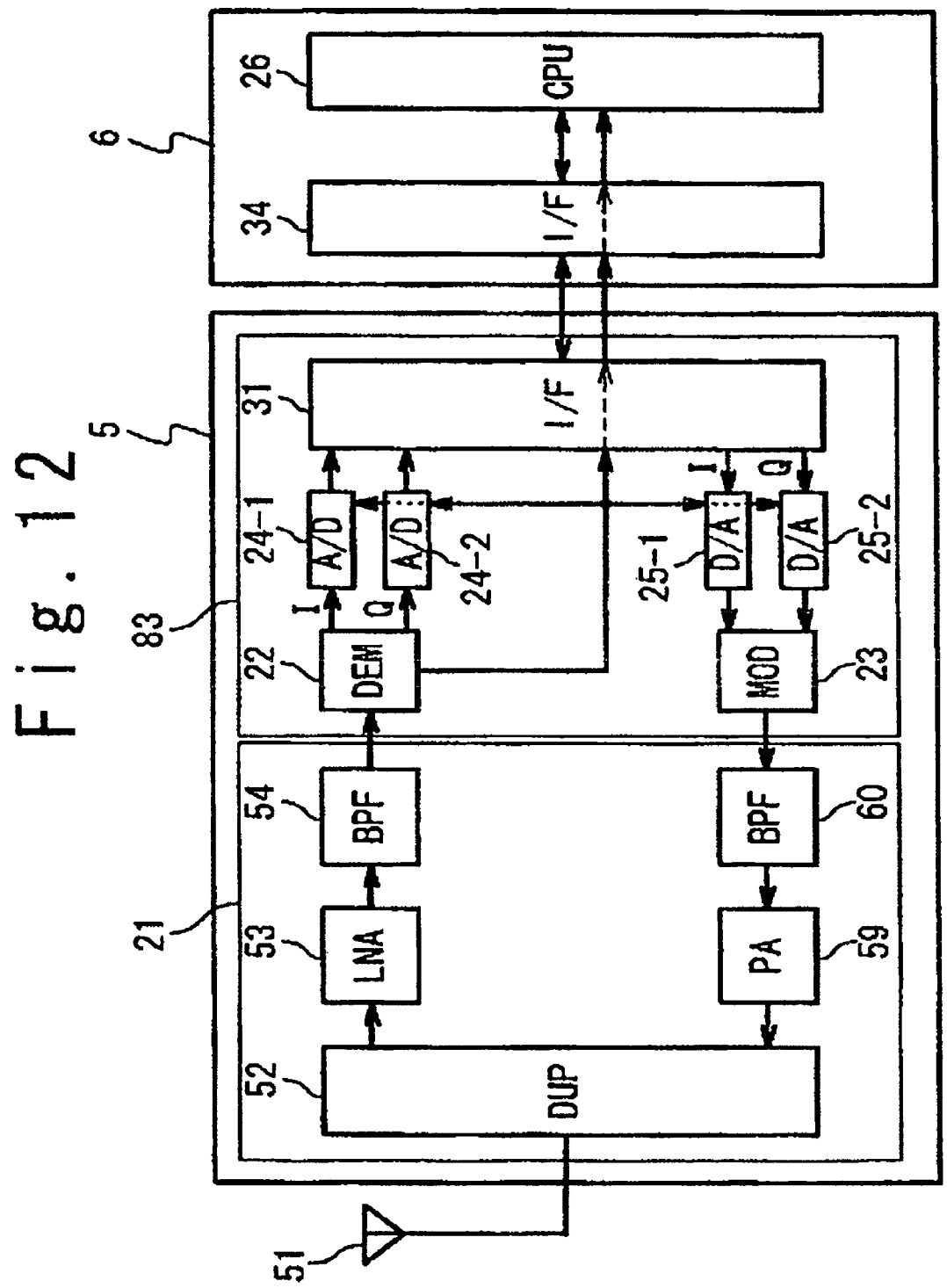
FIG. 12 shows a modification of the information processing terminal system according to the third embodiment of the present invention.

In this case, in a modification of the data processing terminal system in the third embodiment of the present invention, as shown in FIG. 12, the high-frequency processing unit 21 is provided with a duplexer (DUP) 52, the low noise amplifier (LNA) 53, the band-pass filters (BPF) 54 and 60, and the power amplifier (PA) 59.

The demodulator (DEM) converts the reception RF signal from the band-pass filter (BPF) 54 into the reception analog BB signal (the analog I signal and the analog Q signal), and outputs the converted reception analog BB signal to the A/D converters 24-1 and 24-2.

The reception symbol clock recovering circuit of the demodulator (DEM) 22 generates (recovers) a reception symbol clock having a frequency n times (n is an integer number) larger than the frequency of reception symbol superimposed on the reception analog BB signal, and outputs the generated (recovered) reception symbol clock to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

[Fourth Embodiment]

Figure 5:
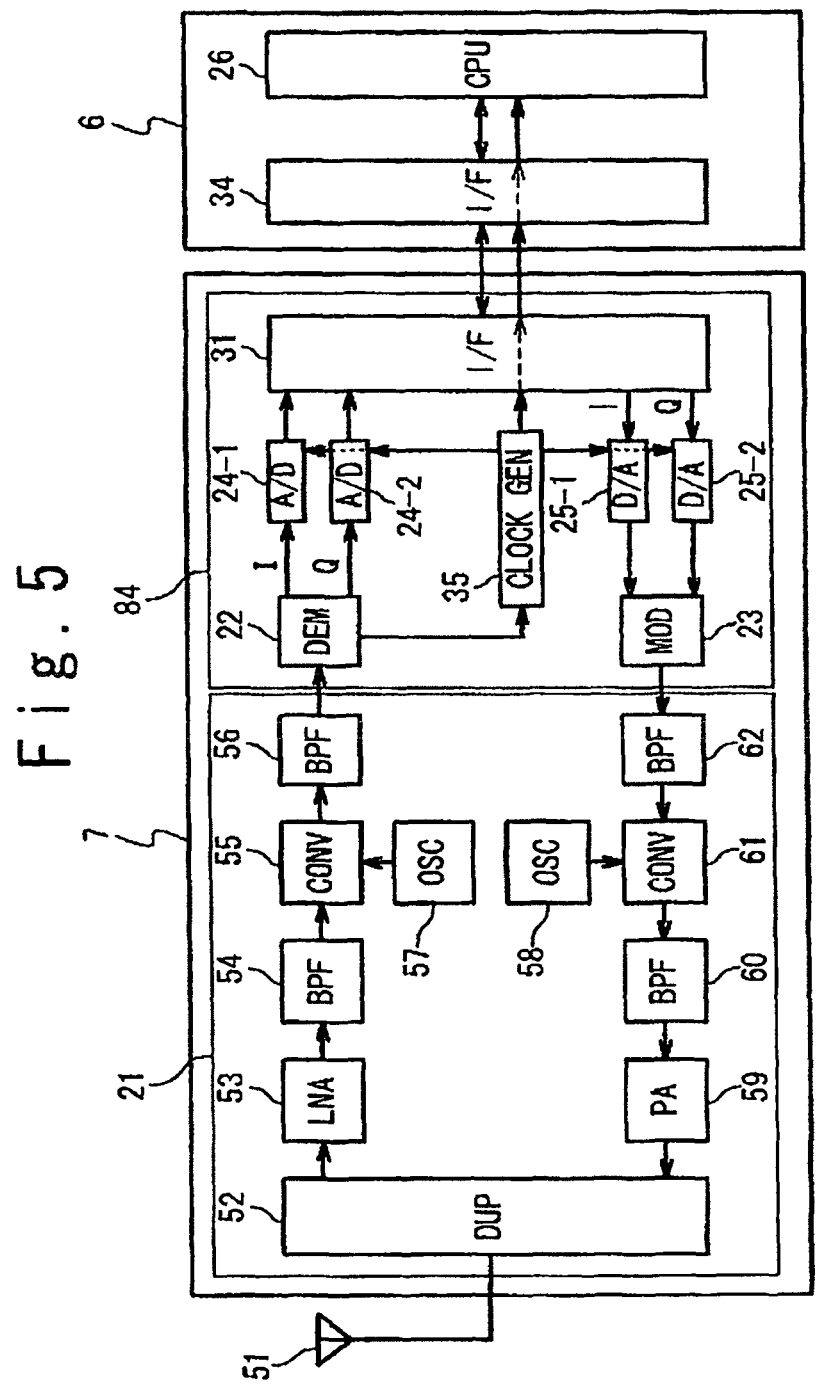
FIG. 5 shows a configuration of the information processing terminal system according to a fourth embodiment of the present invention.

FIG. 5 shows a configuration of a data processing terminal system using a microwave-band quadrature amplitude modulation wave, as a data processing terminal system in the fourth embodiment of the present invention. In the data processing terminal system in the fourth embodiment, in addition to the effect of the third embodiment, a symbol clock synchronous with a reception symbol clock can be generated in accordance with an application on a receiving side of the symbol clock. In the fourth embodiment, description overlapped with the foregoing is omitted.

The data processing terminal system in the fourth embodiment has the antenna 51 connected to a network, a microwave transmitting and receiving unit 7, and a microprocessor signal processing unit 6. The antenna 51 and the microwave transmitting and receiving unit 7 are transmitting and receiving apparatus (communication apparatus). The microprocessor signal processing unit 6 is a data processing terminal. That is, the data processing terminal system in the fourth embodiment has the microwave transmitting and receiving unit 7 instead of the microwave transmitting and receiving unit 5 of the data processing terminal system in the third embodiment.

The data processing terminal system in the fourth embodiment can be configured in such a manner that the microprocessor signal processing unit 6 can be attached to and detached from the microwave transmitting and receiving unit 7. When the microwave transmitting and receiving unit 7 and the microprocessor signal processing unit 6 are separated, the user can use the data processing terminal system in the fourth embodiment as the data processing terminal, only with the function of the microprocessor signal processing unit 6.

The microwave transmitting and receiving unit 7 is provided with the high-frequency processing unit 21 and a modulation and demodulation processing unit 84. The high-frequency processing unit 21 is the same as that of the first embodiment (see FIG. 2).

The modulation and demodulation processing unit 84 is provided with the demodulator (DEM) 22, the modulator (MOD) 23, a baseband processing unit. The baseband processing unit is provided with the analog/digital (A/D) converters 24-1 and 24-2, the digital/analog (D/A) converters 25-1 and 25-2, the microwave transmitting and receiving unit interface (I/F) 31, and a clock generator (CLOCK GEN) 35. The demodulator (DEM) 22, the modulator (MOD) 23, the A/D converters 24-1 and 24-2, the D/A converters 25-1 and 25-2, and the microwave transmitting and receiving unit interface 31 are the same as those of the third embodiment (see FIG. 4). That is, the modulation and demodulation processing unit 84 is further provided with the clock generator 35 in addition to the configuration of the modulation and demodulation processing unit 83 in the third embodiment.

The demodulator (DEM) 22 of the modulation and demodulation processing unit 84 is provided with a carrier-wave recovering circuit (not shown) and a reception symbol clock recovering circuit (not shown). The carrier-wave recovering circuit of the demodulator (DEM) 22 of the modulation and demodulation processing unit 84 is the same as the carrier-wave recovering circuit of the demodulator (DEM) 22 of the modulation and demodulation processing unit 81 in the first embodiment.

The reception symbol clock recovering circuit of the demodulator (DEM) 22 has a different output destination of a reception symbol clock from the reception symbol clock recovering circuit of the demodulator (DEM) 22 of the modulation and demodulation processing unit 83 in the third embodiment. The reception symbol clock recovering circuit generates (recovers) a reception symbol clock having a frequency n times (n is an integer number) larger than a reception symbol frequency superimposed on the reception analog BB signal, and outputs the generated (recovered) reception symbol clock to the clock generator 35.

As the clock generator 35, a frequency divider circuit and a PLL (Phase Locked Loop) circuit may be used. Based upon the reception symbol clock from the demodulator (DEM) 22, the clock generator 35 generates secondary reception symbol clocks, and outputs the generated secondary reception symbol clocks to the A/D converters 24-1 and 24-2, the D/A converters 25-1 and 25-2, the microwave transmitting and receiving unit interface 31, a microprocessor signal processing unit interface 34, and a microprocessor signal processing circuit (CPU) 26. Although the secondary reception symbol clocks are synchronous with the reception symbol clock, the secondary reception symbol clocks have frequencies different from a frequency of the reception symbol clock.

When the A/D converters 24-1 and 24-2 carries out 4-times oversampling (n=4) for conversion of the reception analog BB signal into the reception digital BB signal, the clock generator 35 generates the secondary reception symbol clock having a frequency 4 times larger than the reception symbol frequency, and outputs the generated secondary reception symbol clock to the A/D converters 24-1 and 24-2. When a transmission symbol frequency used when the D/A converters 25-1 and 25-2 convert the transmission digital BB signal into the transmission analog BB signal is one-tenth of a frequency of the reception symbol clock, the clock generator 35 generates the secondary reception symbol clock having a frequency that is one-tenth of the reception symbol frequency, and outputs the generated secondary reception symbol clock to the D/A converters 25-1 and 25-2. Thus, in the data processing terminal system in the fourth embodiment, the secondary reception symbol clock synchronous with the reception symbol clock can be generated in accordance with an application on the receiving side of the second reception symbol clock, in addition to the effect of the third embodiment.

Next, an operation when the data processing terminal system in the fourth embodiment receives a signal will be described. Description of the operation overlapped with the third embodiment is omitted.

In the demodulator (DEM) 22, the reception IF signal from the band-pass filter (BPF) 56 is converted into the analog I signal and the analog Q signal as the reception analog BB signal, to be outputted to the A/D converters 24-1 and 24-2. A primary reception symbol clock with the frequency of a reception symbol contained in the reception analog BB signal is recovered by the reception symbol clock recovering circuit of the demodulator (DEM) 22, to be then outputted to the clock generator 35. The clock generator 35 inputs the primary reception symbol clock, generates the secondary reception symbol clocks, and outputs the generated secondary reception symbol clocks to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26.

In the A/D converters 24-1 and 24-2, the analog I signal and the analog Q signal from the demodulator (DEM) 22 are sampled with a sampling clock synchronous with the secondary reception symbol clock from the clock generator 35, and are converted into the digital I signal and the digital Q signal as the reception digital BB signal, to be then outputted to the microwave transmitting and receiving unit interface 31.

In the converting circuit of the microwave transmitting and receiving unit interface 31, the reception digital BB signal (the digital I signal and the digital Q signal from the A/D converters 24-1 and 24-2) is subjected to the signal level converting process and the parallel bit converting process in synchronization with the secondary reception symbol clock from the clock generator 35, and then is outputted to the microprocessor signal processing unit interface 34 in synchronization with the secondary reception symbol clock.

In the converting circuit of the microprocessor signal processing unit interface 34, the reception digital BB signal (the digital I signal and the digital Q signal) from the microwave transmitting and receiving unit interface 31 is subjected to the signal level converting process and the parallel bit converting process in synchronization with the secondary reception symbol clock from the clock generator 35, and is then outputted to the microprocessor signal processing circuit (CPU) 26 in synchronization with the secondary reception symbol clock.

In the communication processing program executed by the microprocessor signal processing circuit (CPU) 26, the reception digital BB signal (the digital I signal and the digital Q signal) from the microprocessor signal processing unit interface 34 is subjected to an error correction process, a decoding process, an identification data removing process, Fourier transform, and a digital waveform shaping processing in synchronization with the secondary reception symbol clock from the clock generator 35, and then is converted into the reception data in synchronization with the secondary reception symbol clock. The microprocessor signal processing circuit (CPU) 26 processes the reception data based on an application program (for example, an e-mail processing program).

Next, an operation when the data processing terminal system in the fourth embodiment transmits a signal will be described. The description of the operation overlapped with the third embodiment is omitted.

After generating the transmission data based on the application program (for example, the e-mail processing program), the microprocessor signal processing circuit (CPU) 26, carries out a redundant data adding process for the error correction, an encoding process, an identification data adding process, inverse Fourier transform, and a digital waveform shaping processing, to the transmission data based on a communication processing program in synchronization with the secondary reception symbol clock from the clock generator 35, to convert the transmission data into the transmission digital BB signal (the digital I signal and the digital Q signal); and outputs the converted transmission digital BB signal to the microprocessor signal processing unit interface 34.

In the converting circuit of the microprocessor signal processing unit interface 34, the transmission digital BB signal (the digital I signal and the digital Q signal) from the microprocessor signal processing circuit (CPU) 26 is subjected to the signal level converting process and the parallel bit converting process in synchronization with the secondary reception symbol clock from the clock generator 35, and is then outputted to the microwave transmitting and receiving unit interface 31 in synchronization with the secondary reception symbol clock.

In the converting circuit of the microwave transmitting and receiving unit interface 31, the transmission digital BB signal (the digital I signal and the digital Q signal) from the microprocessor signal processing unit interface 34 is subjected to the signal level converting process and the parallel bit converting process in synchronization with the secondary reception symbol clock from the clock generator 35, and is then outputted to the D/A converters 25-1 and 25-2 in synchronization with the secondary reception symbol clock.

In the D/A converters 25-1 and 25-2, the transmission digital BB signal (the digital I signal and the digital Q signal) from the microwave transmitting and receiving unit interface 31 is converted into the transmission analog BB signal (the analog I signal and the analog Q signal) in synchronization with the secondary reception symbol clock from the clock generator 35, to be then outputted to the modulator (MOD) 23.

In the modulator (MOD) 23, the transmission analog BB signal (the analog I signal and the analog Q signal from the D/A converters 25-1 and 25-2) is converted into the transmission IF signals, to be then outputted to the band-pass filter (BPF) 62.

In the data processing terminal system in the fourth embodiment, in addition to the effect of the third embodiment, the secondary reception symbol clock synchronous with the reception symbol clock can be generated in accordance with an application on a receiving side of the secondary reception symbol clock.

Additionally, in the data processing terminal system in the fourth embodiment, the modulation and demodulation processing unit 84, at the time of the reception, converts a reception intermediate frequency signal (reception IF signal) as a reception modulation wave signal from the high-frequency processing unit 21, into the reception digital BB signal, and outputs the converted reception digital BB signal to the microprocessor signal processing unit 6; and at the time of the transmission, converts the transmission digital BB signal from the microprocessor signal processing unit 6 into a transmission intermediate frequency signal (transmission IF signal) as a transmission modulation wave signal, and outputs the converted transmission IF signal to the high-frequency processing unit 21. However, the present invention is not limited to the foregoing. That is, it is also possible that the modulation and demodulation processing unit 84, at the time of the reception, converts the reception RF signal as the reception modulation wave signal from the high-frequency processing unit 21, into the reception digital BB signal, and outputs the converted reception digital BB signal to the microprocessor signal processing unit 6; and at the time of the transmission, converts the transmission digital BB signal from the microprocessor signal processing unit 6 into the transmission RF signal, and outputs the converted transmission RF signal to the high-frequency processing unit 21.

Figure 13:
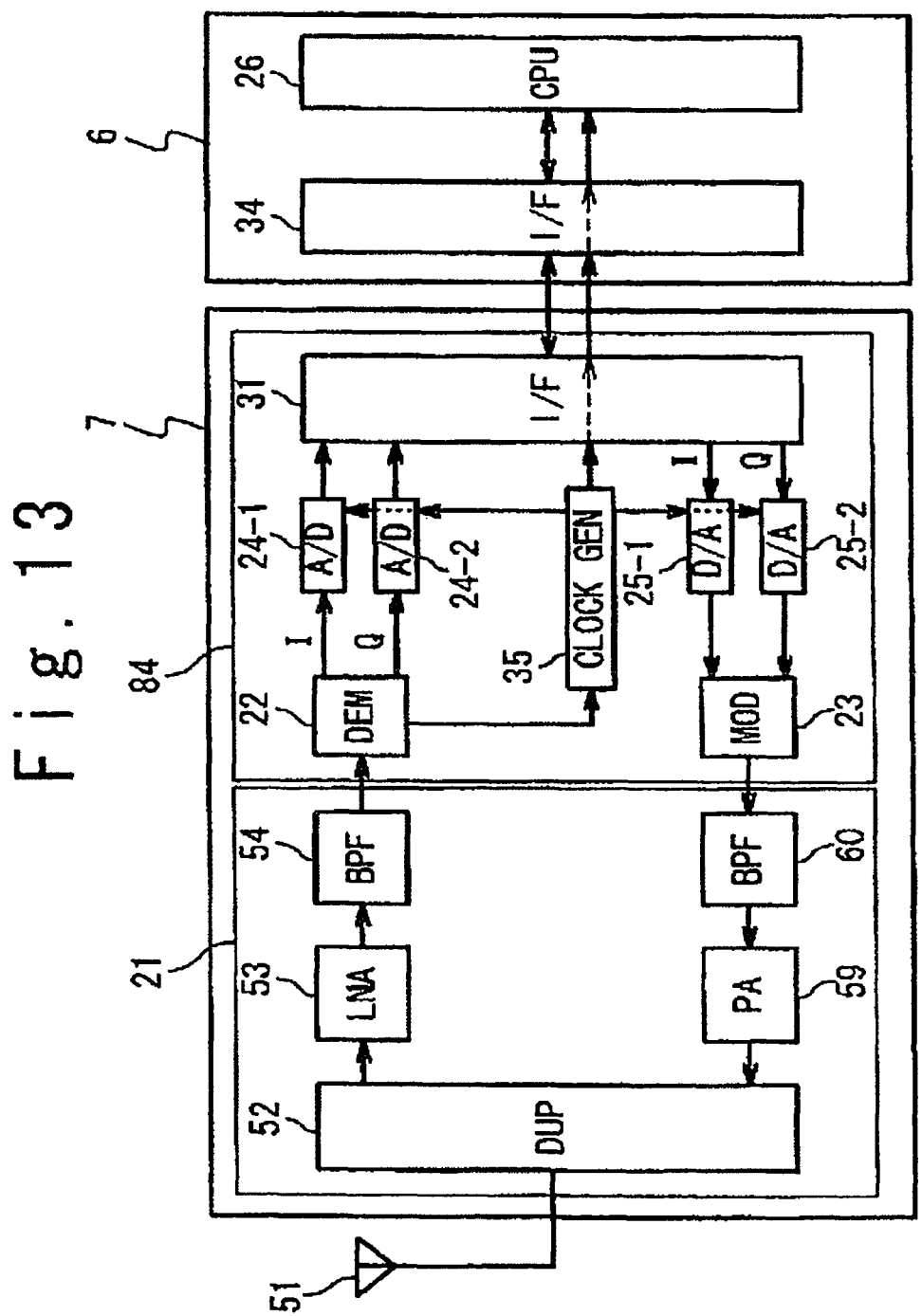
FIG. 13 shows a modification of the information processing terminal system according to the fourth embodiment of the present invention.

In this case, in a modification of the data processing terminal system in the fourth embodiment of the present invention, as shown in FIG. 13, the high-frequency processing unit 21 is provided with a duplexer (DUP) 52, the low noise amplifier (LNA) 53, the band-pass filters (BPF) 54 and 60, and the power amplifier (PA) 59.

The demodulator (DEM) 22 converts the reception RF signal from the band-pass filter (BPF) 54 into the reception analog BB signal (the analog I signal and the analog Q signal), and outputs the converted reception analog BB signal to the A/D converters 24-1 and 24-2.

A reception symbol clock recovering circuit of the demodulator (DEM) 22 generates (recovers) a reception symbol clock having a frequency larger n times (n is an integer number) than the frequency of a reception symbol superimposed on the reception analog BB signal, and outputs the generated (recovered) reception symbol clock to the clock generator 35. The A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26 operate in synchronization with the secondary reception symbol clock from the clock generator 35.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

Figure 18:
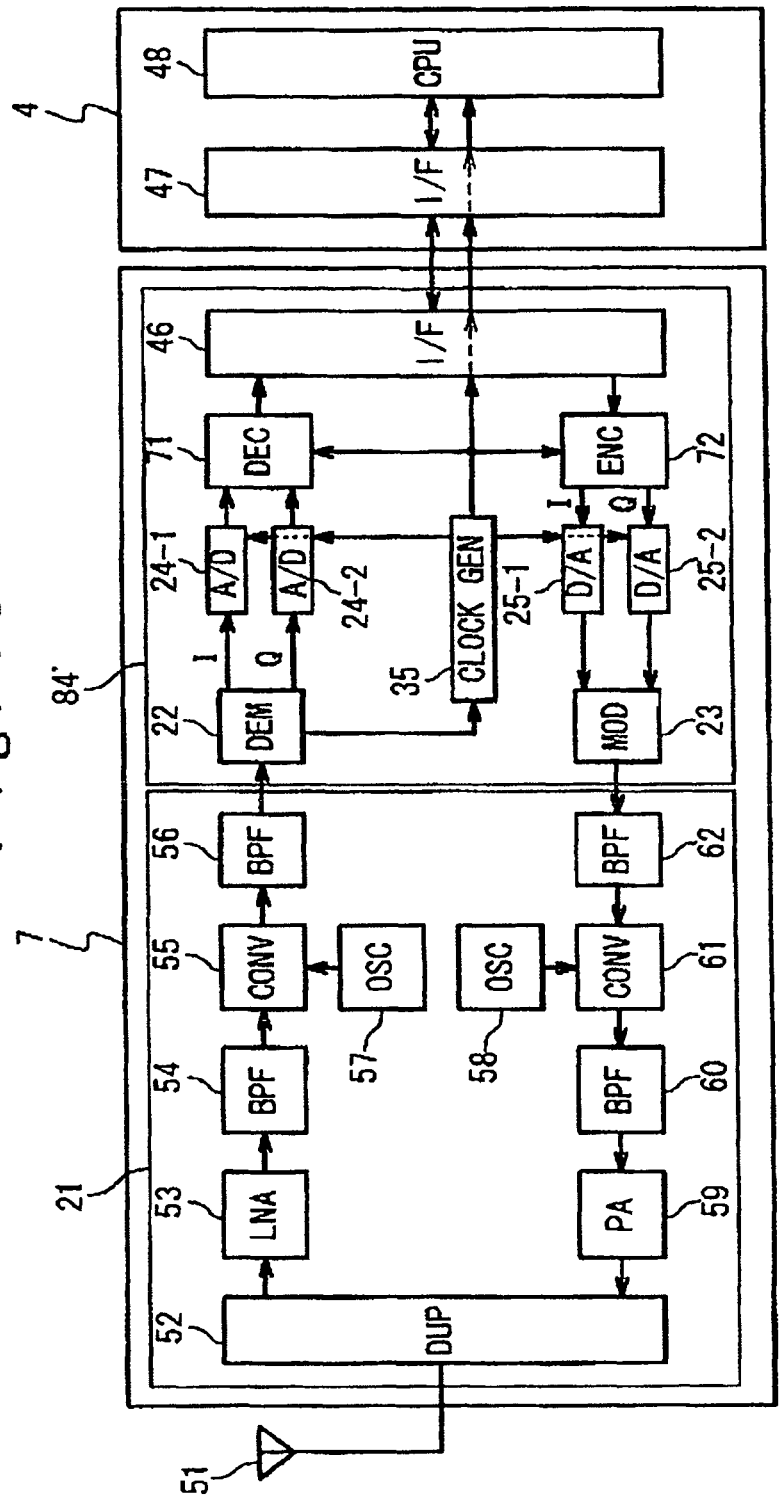
FIG. 18 shows a configuration of the information processing terminal system in which the information processing terminal system according to the fourth embodiment is applied to the information processing terminal system according to the second embodiment.

Additionally, in the data processing terminal system in the fourth embodiment of the present invention, as shown in FIG. 18, the data processing terminal system in the fourth embodiment can be applied to the data processing terminal system in the second embodiment.

The data processing terminal system in the fourth embodiment has a microprocessor signal processing unit 4 in the second embodiment, instead of the microprocessor signal processing unit 6. As mentioned above, the microprocessor signal processing unit 4 is provided with a microprocessor signal processing unit interface 47 and a microprocessor signal processing circuit (CPU) 48. In the data processing terminal system in the fourth embodiment, the microwave transmitting and receiving unit 7 is provided with a modulation and demodulation processing unit 84' instead of the modulation and demodulation processing unit 84. The modulation and demodulation processing unit 84' is provided with the demodulator (DEM) 22, the modulator (MOD) 23, and a baseband processing unit. The baseband processing unit is provided with the A/D converters 24-1 and 24-2, the D/A converters 25-1 and 25-2, the decoder (DEC) 71, the encoder (ENC) 72, a microwave transmitting and receiving unit interface 46, and the clock generator 35.

In this case, the clock generator 35 generates the secondary reception symbol clock based upon the primary reception symbol clock from the demodulator (DEM) 22, and outputs the generated secondary reception symbol clock to the A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48 that are the receiving sides of the secondary reception symbol clock. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48 operate in synchronization with the secondary reception symbol clock from the clock generator 35.

Also, in the data processing terminal system in the fourth embodiment, the modulation and demodulation processing unit 84', at the time of the reception, converts a reception intermediate frequency signal (reception IF signal) as a reception modulation wave signal from the high-frequency processing unit 21, into the reception data, and outputs the converted reception data to the microprocessor signal processing unit 4; and at the time of the transmission, converts the transmission data from the microprocessor signal processing unit 4 into a transmission intermediate frequency signal (transmission IF signal) as a transmission modulation wave signal, and outputs the converted transmission IF signal to the high-frequency processing unit 21. However, the present invention is not limited to the foregoing. That is, it is also possible that the modulation and demodulation processing unit 84', at the time of the reception, converts the reception RF signal as the reception modulation wave signal from the high-frequency processing unit 21, into the reception data, and outputs the converted reception data to the microprocessor signal processing unit 4; and at the time of the transmission, converts the transmission data from the microprocessor signal processing unit 4 into the transmission RF signal as the transmission modulation wave signal, and outputs the converted transmission RF signal to the high-frequency processing unit 21.

Figure 23:
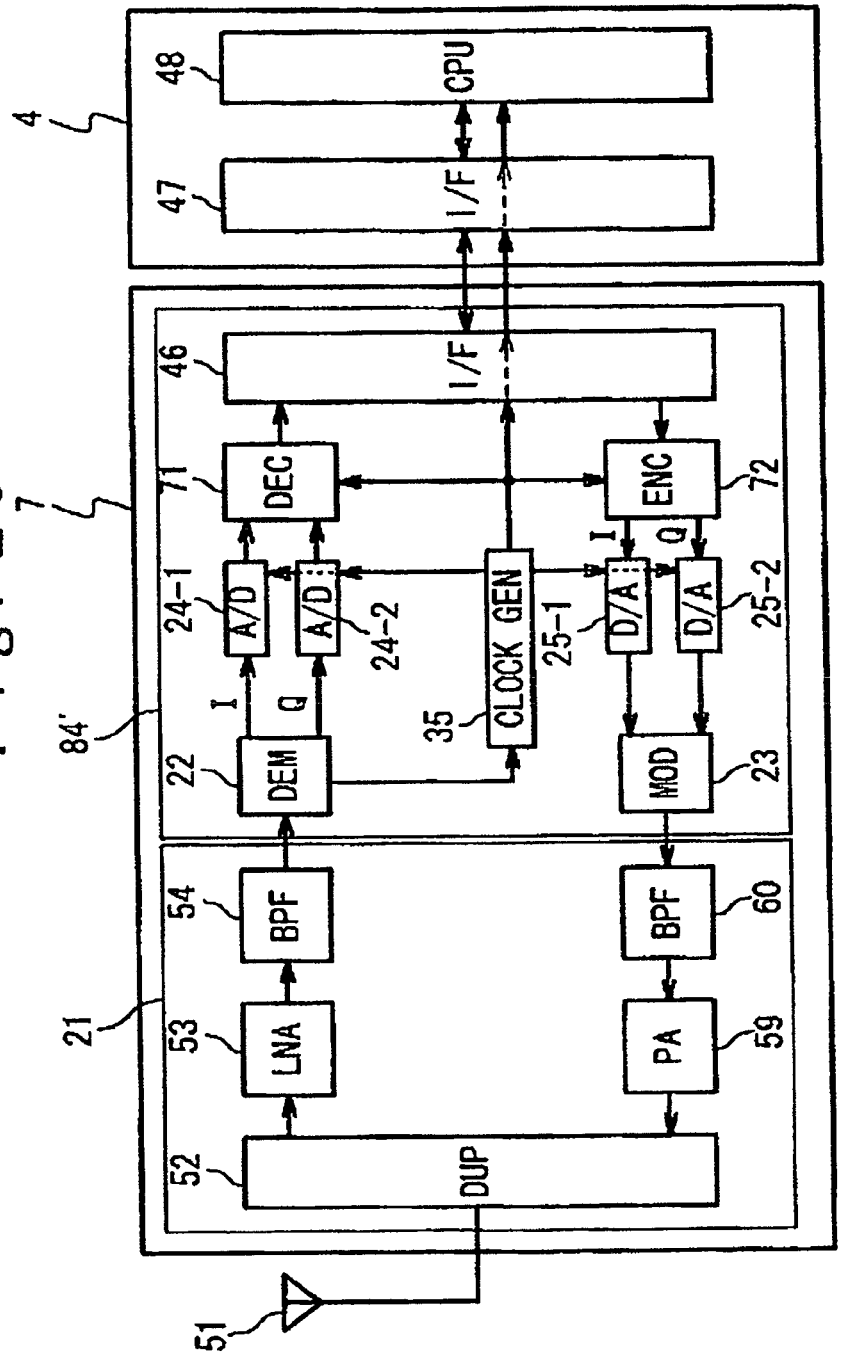
FIG. 23 shows a modification of the information processing terminal system according to the fourth embodiment of the present invention.

In this case, in a modification of the data processing terminal system in the fourth embodiment of the present invention, as shown in FIG. 23, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 22 converts the reception RF signal from the band-pass filter (BPF) 54 into the reception analog BB signal (the analog I signal and the analog Q signal), and outputs the converted reception analog BB signal to the A/D converters 24-1 and 24-2.

The reception symbol clock recovering circuit of the demodulator (DEM) 22 generates (recovers) a primary symbol clock having a frequency n times (n is an integer number) larger than the reception symbol frequency superimposed on the reception analog BB signal, and outputs the generated (recovered) primary symbol clock to the clock generator 35. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48 operate in synchronization with the secondary reception symbol clock from the clock generator 35.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

[Fifth Embodiment]

Figure 6:
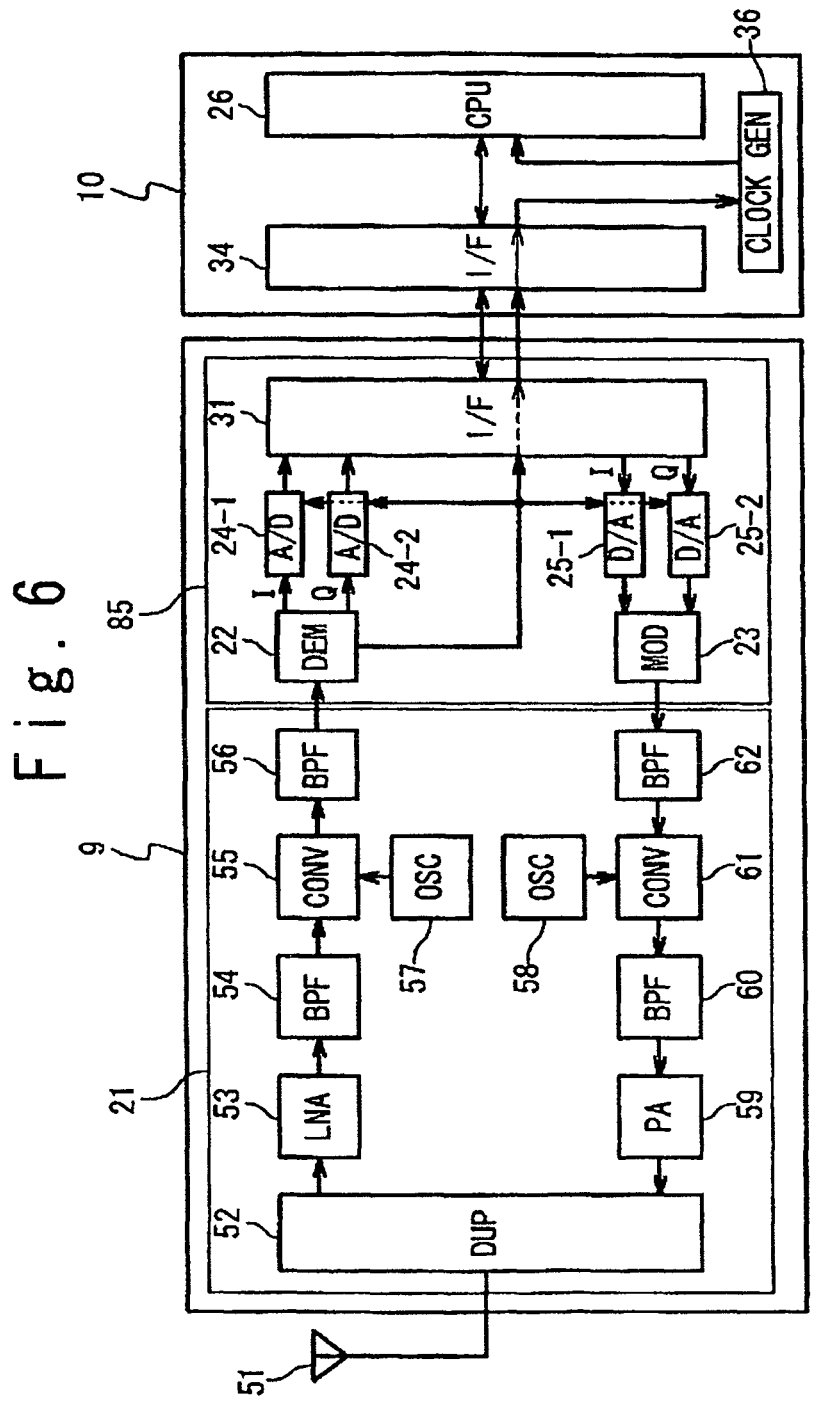
FIG. 6 shows a configuration of the information processing terminal system according to a fifth embodiment of the present invention.

FIG. 6 shows a configuration of the data processing terminal system using a microwave-band quadrature amplitude modulation wave, as a data processing terminal system in the fifth embodiment of the present invention. In the data processing terminal system in the fifth embodiment, in addition to the effect of the third embodiment, even if the reception symbol clock is not outputted from the microwave transmitting and receiving unit to the microprocessor signal processing unit, a microprocessor signal processing circuit (CPU) operate at all times without switching a source of a clock outputted to the microprocessor signal processing circuit (CPU) in the microprocessor signal processing unit. In the fifth embodiment, the description overlapped with the foregoing is omitted.

The data processing terminal system in the fifth embodiment has the antenna 51 connected to a network, a microwave transmitting and receiving unit 9, and a microprocessor signal processing unit 10. The antenna 51 and the microwave transmitting and receiving unit 9 are a transmitting and receiving apparatus (communication apparatus). The microprocessor signal processing unit 10 is a data processing terminal. That is, in the data processing terminal system in the fifth embodiment, the microwave transmitting and receiving unit 9 and the microprocessor signal processing unit 10 are provided instead of the microwave transmitting and receiving unit 5 and the microprocessor signal processing unit 6 of the data processing terminal system in the third embodiment.

The microwave transmitting and receiving unit 9 is provided with the high-frequency processing unit 21 and a modulation and demodulation processing unit 85. The high-frequency processing unit 21 is the same as that of the first embodiment (se FIG. 2).

The modulation and demodulation processing unit 85 is provided with the demodulator (DEM) 22, the modulator (MOD) 23, and a baseband processing unit. The baseband processing unit is provided with the analog/digital (A/D) converters 24-1 and 24-2, the digital/analog (D/A) converters 25-1 and 25-2, and the microwave transmitting and receiving unit interface (I/F) 31. The demodulator (DEM) 22, the modulator (MOD) 23, the A/D converters 24-1 and 24-2, the D/A converters 25-1 and 25-2, and the microwave transmitting and receiving unit interface 31 are the same as those of the third embodiment (see FIG. 4).

The microprocessor signal processing unit 10 is provided with the microprocessor signal processing unit interface (I/F) 34, a microprocessor signal processing circuit (CPU) 26, and a clock generator (CLOCK GEN) 36. The microprocessor signal processing unit interface 34 and the microprocessor signal processing circuit 26 are the same as those of the third embodiment (see FIG. 4).

The data processing terminal system in the fifth embodiment can be configured in such a manner that the microwave transmitting and receiving unit 9 can be attached to and detached from the microprocessor signal processing unit 10. Even when the microwave transmitting and receiving unit 9 and the microprocessor signal processing unit 10 are separated, it is possible that the microprocessor signal processing circuit (CPU) 26 executes a general program (not shown) for spreadsheet processing and word-processing, which does not use a microwave transmitting and receiving function, from among a plurality of programs stored in a memory in synchronization with a clock described later from the clock generator 36, and carries out the general data processing (processing in which only the function of the data processing terminal is used) in synchronization with the clock. In other words, the user can use the data processing terminal system in the fifth embodiment as the data processing terminal, only with the function of the microprocessor signal processing unit 10.

The demodulator (DEM) 22 of the modulation and demodulation processing unit 85 is provided with a carrier-wave recovering circuit (not shown) and a reception symbol clock recovering circuit (not shown). The carrier-wave recovering circuit of the demodulator (DEM) 22 of the modulation and demodulation processing unit 85 is the same as the carrier-wave recovering circuit of the demodulator (DEM) 22 of the modulation and demodulation processing unit 81 in the first embodiment.

The reception symbol clock recovering circuit of the demodulator (DEM) 22 has a different output destination of a reception symbol clock from the demodulator (DEM) 22 of the modulation and demodulation processing unit 83 in the third embodiment. The reception symbol clock recovering circuit generates (recovers) a reception symbol clock having a frequency n times (n is an integer number) larger than the frequency of a reception symbol superimposed on the reception analog BB signal, and outputs the generated (recovered) reception symbol clock to the A/D converters 24-1 and 24-2, the D/A converters 25-1 and 25-2, the microwave transmitting and receiving unit interface 31, the microprocessor signal processing unit interface 34, and the clock generator 36.

As the clock generator 36, a frequency divider circuit and a PLL (Phase Locked Loop) circuit may be used. The clock generator 36 inputs the reception symbol clock from the demodulator (DEM) 22 as a primary clock, and the PLL circuit generates a secondary clock synchronous with the primary clock, and outputs the generated secondary clock to the microprocessor signal processing circuit (CPU) 26. When there is no primary clock, the clock generator 36 self-oscillates, and outputs the secondary clock to the microprocessor signal processing circuit (CPU) 26.

Next, an operation when the data processing terminal system in the fifth embodiment receives a signal will be described. The description of the operation overlapped with the third embodiment is omitted.

In the demodulator (DEM) 22, the reception IF signal from the band-pass filter (BPF) 56 is converted into the analog I signal and the analog Q signal as the reception analog BB signal, to be then outputted to the A/D converters 24-1 and 24-2. The reception symbol clock synchronous with the cycle of a reception symbol contained in the reception analog BB signal is recovered by the reception symbol clock recovering circuit of the demodulator (DEM) 22, and the recovered reception symbol clock is outputted to the A/D converters 24-1 and 24-2, the D/A converters 25-1 and 25-2, the microwave transmitting and receiving unit interface 31, the microprocessor signal processing unit interface 34, and the clock generator 36. The clock generator 36 generates the secondary clock synchronous with the reception symbol clock (primary clock) from the demodulator (DEM) 22, and outputs the generated secondary clock to the microprocessor signal processing circuit (CPU) 26.

Based on a communication processing program executed by the microprocessor signal processing circuit (CPU) 26, the reception digital BB signal (the digital I signal and the digital Q signal) from the microprocessor signal processing unit interface 34 is subjected to an error correction process, a decoding process, an identification data removing process, Fourier transform, and a digital waveform shaping processing in synchronization with the secondary clock from the clock generator 36, to then be converted into the reception data. The microprocessor signal processing circuit (CPU) 26 processes the reception data based on an application program (for example, an e-mail processing program).

Next, an operation when the data processing terminal system in the fifth embodiment transmits a signal will be described. The description of the operation overlapped with the third embodiment is omitted.

After generating the transmission data based on the application program (for example, the e-mail processing program), the microprocessor signal processing circuit (CPU) 26, carries out a redundant data adding process for the error correction, an encoding process, an identification data adding process, inverse Fourier transform, and a digital waveform shaping processing to the transmission data based on the communication processing program, in synchronization with the secondary clock from the clock generator 36, to then be converted into the transmission digital BB signal (the digital I signal and the digital Q signal); and outputs the converted transmission digital BB signal to the microprocessor signal processing unit interface 34 in synchronization with the secondary clock.

In the data processing terminal system in the fifth embodiment, in case of a reception stop or if the microwave transmitting and receiving unit 9 and the microprocessor signal processing unit 10 are separated for a some reason, the microprocessor signal processing unit 10 cannot input the reception symbol clock (primary clock). Even in this case, through the self-oscillation of the PLL circuit of the clock generator 36, the secondary clock is outputted to the microprocessor signal processing circuit (CPU) 26. For this reason, even when the microwave transmitting and receiving unit 9 is attached to the microprocessor signal processing unit 10, or when the microwave transmitting and receiving unit 9 and the microprocessor signal processing unit 10 are separated, the microprocessor signal processing circuit (CPU) 26 operates at a timing synchronous with the secondary clock from the clock generator 36. Thus, in addition to the effect of the third embodiment, even when the reception symbol clock is not outputted from the microwave transmitting and receiving unit 9 to the microprocessor signal processing unit 10 in the data processing terminal system in the fifth embodiment, the source of the clock outputted to the microprocessor signal processing circuit (CPU) 26 in the microprocessor signal processing unit 10 does not need to be switched, and the microprocessor signal processing circuit (CPU) 26 operates at all times.

In this embodiment, the clock generator 36 supplies the secondary clock synchronous with the reception symbol clock as the primary clock, to the microprocessor signal processing circuit (CPU) 26. However, the clock generator 36 can supply the secondary clock having a frequency different from the frequency of the reception symbol clock, to the microprocessor signal processing circuit (CPU) 26. Consequently, in the data processing terminal system in the fifth embodiment, it is easy to change an operating frequency, by lowering the operating frequency of the microprocessor signal processing circuit (CPU) 26 at the time of a low-power mode, for example.

Additionally, in the data processing terminal system in the fifth embodiment, the modulation and demodulation processing unit 85, at the time of the reception, converts a reception intermediate frequency signal (reception IF signal) as a reception modulation wave signal from the high-frequency processing unit 21, into the reception digital BB signal, and outputs the converted reception digital BB signal to the microprocessor signal processing unit 10; and at the time of the transmission, converts the transmission digital BB signal from the microprocessor signal processing unit 10 into a transmission intermediate frequency signal (transmission IF signal) as a transmission modulation wave signal, and outputs the converted transmission IF signal to the high-frequency processing unit 21. However, the present invention is not limited to the foregoing. That is, it is also possible that the modulation and demodulation processing unit 85, at the time of the reception, converts the reception RF signal as the reception modulation wave signal from the high-frequency processing unit 21 into the reception digital BB signal, and outputs the converted reception digital BB signal to the microprocessor signal processing unit 10; and at the time of the transmission, converts the transmission digital BB signal from the microprocessor signal processing unit 10 into the transmission RF signal as the transmission modulation wave signal, and outputs the converted transmission RF signal to the high-frequency processing unit 21.

Figure 14:
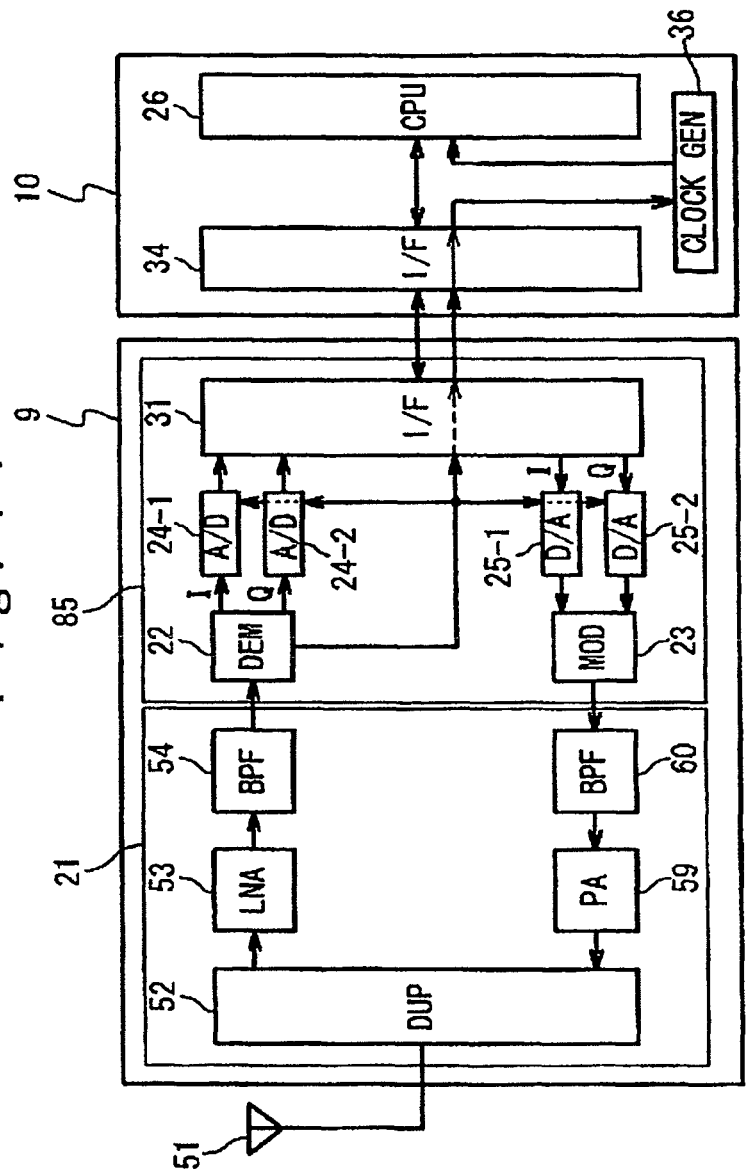
FIG. 14 shows a modification of the information processing terminal system according to the fifth embodiment of the present invention.

In this case, in a modification of the data processing terminal system in the fifth embodiment of the present invention, as shown in FIG. 14, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 22 converts the reception RF signal from the band-pass filter (BPF) 54 into the reception analog BB signal (the analog I signal and the analog Q signal), and outputs the converted reception analog BB signal to the A/D converters 24-1 and 24-2.

The reception symbol clock recovering circuit of the demodulator (DEM) 22 generates (recovers) a reception symbol clock having a frequency n times (n is an integer number) larger than the frequency of a reception symbol superimposed on the reception analog BB signal, and outputs the generated (recovered) reception symbol clock to the A/D converters 24-1 and 24-2, the D/A converters 25-1 and 25-2, the microwave transmitting and receiving unit interface 31, the microprocessor signal processing unit interface 34, and the clock generator 36. The A/D converters 24-1 and 24-2, the D/A converters 25-1 and 25-2, the microwave transmitting and receiving unit interface 31, the microprocessor signal processing unit interface 34, and the clock generator 36 operate in synchronization with the reception symbol clock from the demodulator (DEM) 22. The microprocessor signal processing circuit (CPU) 48 operates in synchronization with the secondary reception symbol clock from the clock generator 36.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

Figure 19:
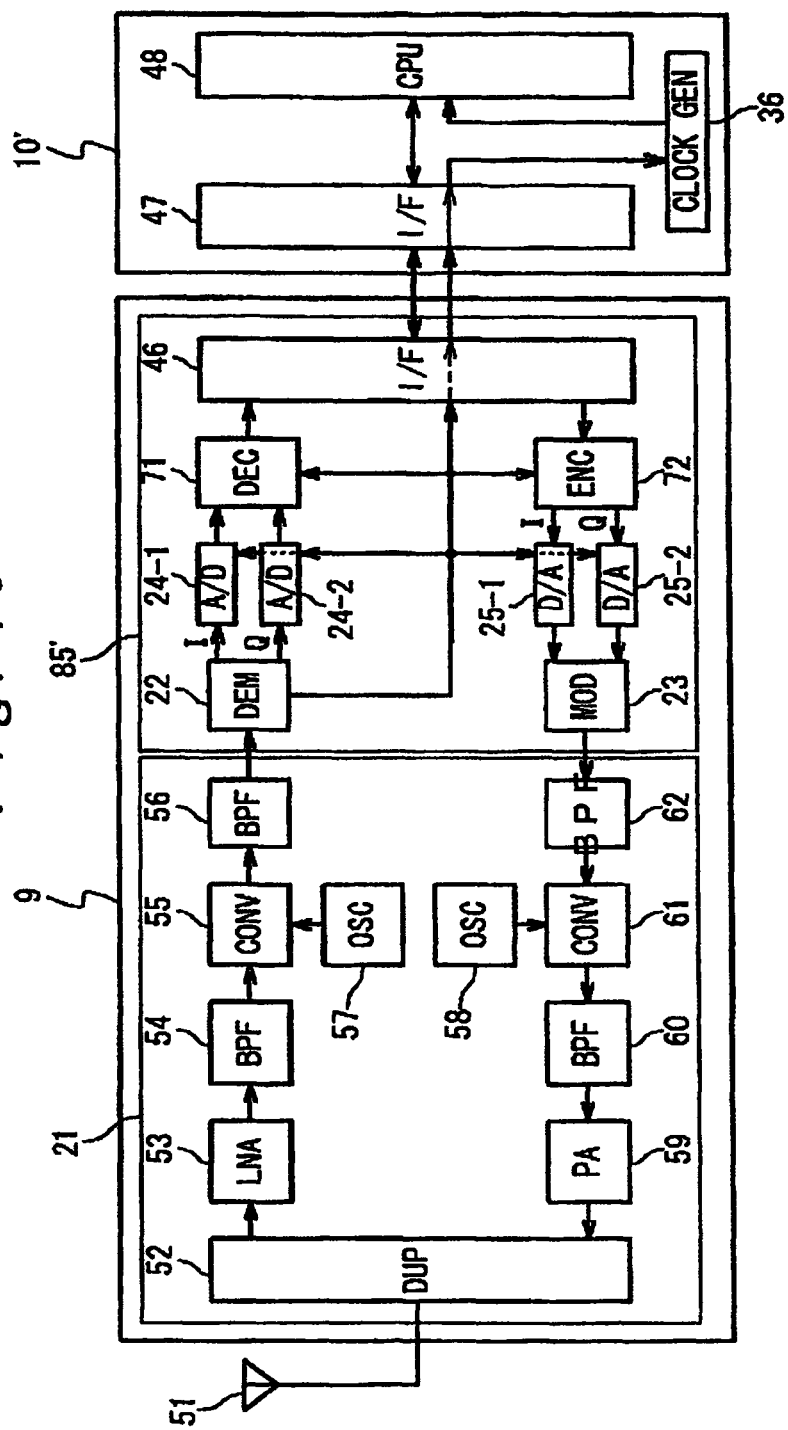
FIG. 19 shows a configuration of the information processing terminal system in which the information processing terminal system according to the fifth embodiment is applied to the information processing terminal system according to the second embodiment.

Also, in the data processing terminal system in the fifth embodiment of the present invention, as shown in FIG. 19, the data processing terminal system in the fifth embodiment can be applied to the data processing terminal system in the second embodiment.

The data processing terminal system in the fifth embodiment has a microprocessor signal processing unit 10' instead of the microprocessor signal processing unit 10. The microprocessor signal processing unit 10' is provided with the microprocessor signal processing unit interface 47 and a microprocessor signal processing circuit (CPU) 48 of the microprocessor signal processing unit 4 in the second embodiment, and the clock generator 36 mentioned above. In the data processing terminal system in the fifth embodiment, the microwave transmitting and receiving unit 9 is provided with a modulation and demodulation processing unit 85' instead of the modulation and demodulation processing unit 85. The modulation and demodulation processing unit 85' is provided with the demodulator (DEM) 22, the modulator (MOD) 23, and the baseband processing unit. The baseband processing unit is provided with the A/D converters 24-1 and 24-2, the D/A converters 25-1 and 25-2, the decoder (DEC) 71, the encoder (ENC) 72, and the microwave transmitting and receiving unit interface 46.

In this case, the reception symbol clock recovering circuit of the demodulator (DEM) 22 generates (recovers) a reception symbol clock having a frequency n times (n is an integer number) larger than the frequency of the reception symbol superimposed on the reception analog BB signal generated in the demodulator (DEM) 22, and outputs the generated (recovered) reception symbol clock to the A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the clock generator 36. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the clock generator 36 operate in synchronization with the reception symbol clock from the demodulator (DEM) 22. The microprocessor signal processing circuit (CPU) 48 operates in synchronization with the secondary reception symbol clock from the clock generator 36.

Also, in the data processing terminal system in the fifth embodiment, the modulation and demodulation processing unit 85', at the time of the reception, converts a reception intermediate frequency signal (reception IF signal) as a reception modulation wave signal from the high-frequency processing unit 21, into the reception data, and outputs the converted reception data to the microprocessor signal processing unit 10'; and at the time of the transmission, converts the transmission data from the microprocessor signal processing unit 10' into a transmission intermediate frequency signal (transmission IF signal) as a transmission modulation wave signal, and outputs the converted transmission IF signal to the high-frequency processing unit 21. However, the present invention is not limited to the foregoing. That is, it is also possible that the modulation and demodulation processing unit 85', at the time of the reception, converts the reception RF signal as the reception modulation wave signal from the high-frequency processing unit 21 into the reception data, and outputs the converted reception data to the microprocessor signal processing unit 10'; and at the time of the transmission, converts the transmission data from the microprocessor signal processing unit 10' into the transmission RF signal as the transmission modulation wave signal, and outputs the converted transmission RF signal to the high-frequency processing unit 21.

Figure 24:
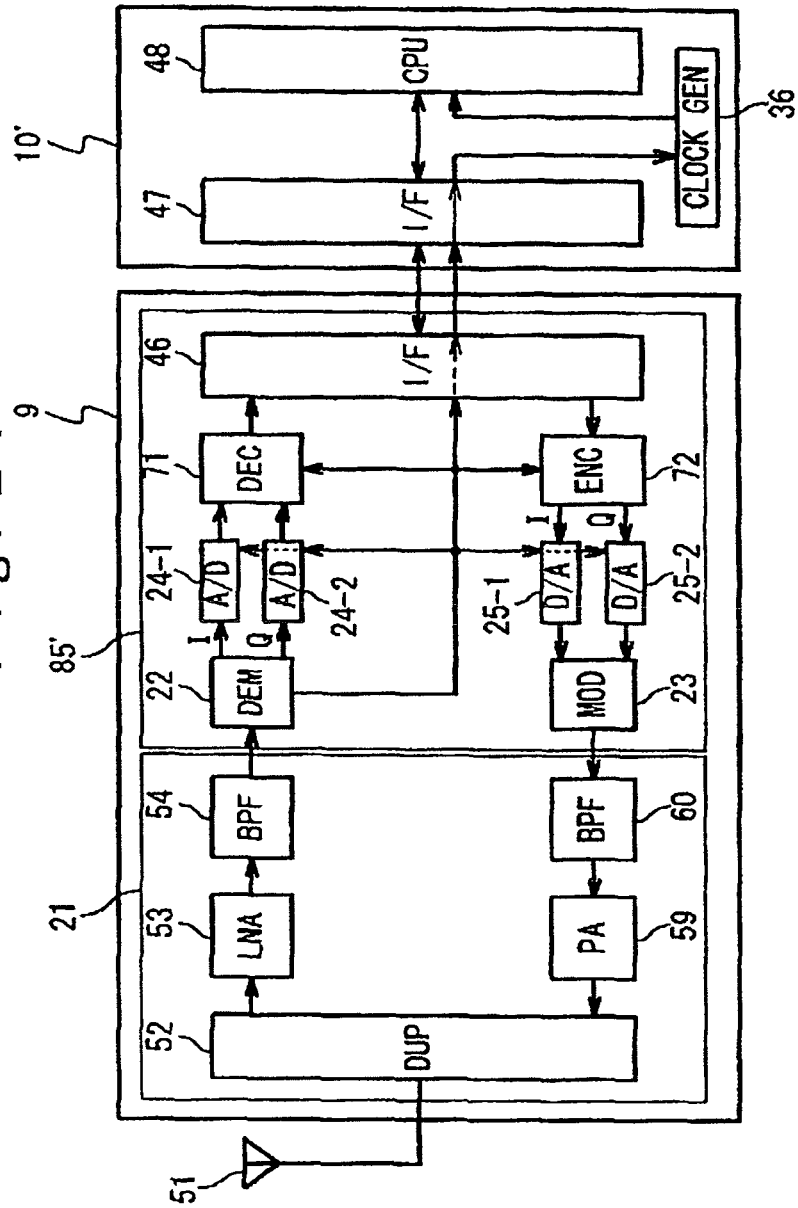
FIG. 24 shows a modification of the information processing terminal system according to the fifth embodiment of the present invention.

In this case, in a modification of the data processing terminal system in the fifth embodiment of the present invention, as shown in FIG. 24, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 22 converts the reception RF signal from the band-pass filter (BPF) 54 into the reception analog BB signal (the analog I signal and the analog Q signal), and outputs the converted reception analog BB signal to the A/D converters 24-1 and 24-2.

The reception symbol clock recovering circuit of the demodulator (DEM) 22 generates (recovers) a reception symbol clock having a frequency n times (n is an integer number) larger than the frequency of the reception symbol superimposed on the reception analog BB signal, and outputs the generated (recovered) reception symbol clock to the A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the clock generator 36. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the clock generator 36 operate in synchronization with the reception symbol clock from the demodulator (DEM) 22. The microprocessor signal processing circuit (CPU) 48 operates in synchronization with the secondary reception symbol clock from the clock generator 36.

The modulator (MOD) 23 converts the transmission analog BB signal (the analog I signal and the analog Q signal) into the transmission RF signals; and outputs the converted transmission RF signals to the power amplifier (PA) 59 through the band-pass filter (BPF) 60.

[Sixth Embodiment]

Figure 7:
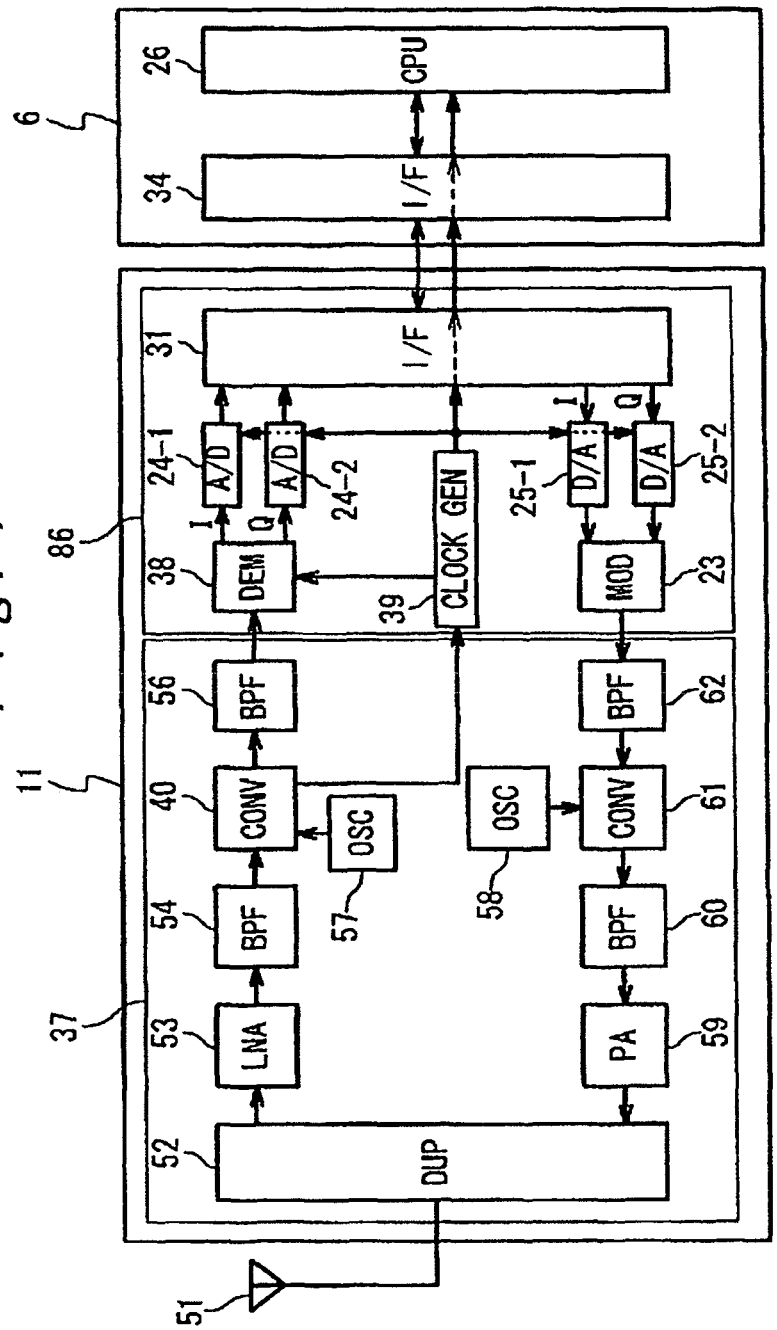
FIG. 7 shows a configuration of the information processing terminal system according to a sixth embodiment of the present invention.

FIG. 7 shows a configuration of a data processing terminal system using a microwave-band quadrature amplitude modulation wave, as a data processing terminal system in the sixth embodiment of the present invention. In the data processing terminal system in the sixth embodiment, in addition to the effect of the fourth embodiment, it is possible to simplify the carrier-wave recovering circuit for regenerating the carrier wave and the reception symbol clock recovering circuit for regenerating the reception symbol clock, and to improve phase noise of the recovered carrier wave and the reception symbol clock. In the sixth embodiment, the description overlapped with the foregoing is omitted.

The data processing terminal system in the sixth embodiment is provided with the antenna 51 connected to a network, a microwave transmitting and receiving unit 11, and a microprocessor signal processing unit 6. The antenna 51 and the microwave transmitting and receiving unit 11 are a transmitting and receiving apparatus (communication apparatus). The microprocessor signal processing unit 6 is a data processing terminal. That is, the data processing terminal system in the sixth embodiment has the microwave transmitting and receiving unit 11 instead of the microwave transmitting and receiving unit 7 of the data processing terminal system in the fourth embodiment. The data processing terminal system in the sixth embodiment can be configured in such a manner that the microwave transmitting and receiving unit 11 can be attached to and detached from the microprocessor signal processing unit 6. When the microwave transmitting and receiving unit 11 and the microprocessor signal processing unit 6 are separated, the user can use the data processing terminal system in the sixth embodiment as the data processing terminal, only with the function of the microprocessor signal processing unit 6.

The microwave transmitting and receiving unit 11 is provided with a high-frequency processing unit 37 and a modulation and demodulation processing unit 86.

The high-frequency processing unit 37, at the time of the reception, converts the reception RF signal received by the antenna 51 into a reception intermediate frequency signal (reception IF signal); and outputs the converted reception IF signal to the modulation and demodulation processing unit 86. The high-frequency processing unit 37, at the time of the transmission, converts the transmission IF signal from the modulation and demodulation processing unit 86 into the transmission RF signal, and transmits the converted transmission RF signal through the antenna 51.

The modulation and demodulation processing unit 86, at the time of the reception, converts the reception IF signal from the high-frequency processing unit 37 into a reception digital baseband signal (reception digital BB signal), and outputs the converted reception digital BB signal to the microprocessor signal processing unit 6. The modulation and demodulation processing unit 86, at the time of the transmission, converts a transmission digital baseband signal (transmission digital BB signal) into the transmission IF signal, and outputs the converted transmission IF signal to the high-frequency processing unit 37.

The high-frequency processing unit 37 is provided with the duplexer (DUP) 52, the low noise amplifier (LNA) 53, the band-pass filters (BPF) 54, 56, 60, and 62, frequency converters (CONV) 40 and 61, the local oscillators (OSC) 57 and 58, and the power amplifier (PA) 59. The duplexer (DUP) 52, the low noise amplifier (LNA) 53, the band-pass filters (BPF) 54, 56, 60, and 62, the frequency converter (CONV) 61, the local oscillators (OSC) 57 and 58, and the power amplifier (PA) 59 are the same as those in the first embodiment (see FIG. 2). That is, the high-frequency processing unit 37 is provided with the frequency converter (CONV) 40 instead of the frequency converter (CONV) 55 of a microwave transmitting and receiving unit 1 in the first embodiment.

The modulation and demodulation processing unit 86 is provided with a demodulator (DEM) 38, the modulator (MOD) 23, and a baseband processing unit. The baseband processing unit is provided with the analog/digital (A/D) converters 24-1 and 24-2, the digital/analog (D/A) converters 25-1 and 25-2, the microwave transmitting and receiving unit interface (I/F) 31, and a clock generator (CLOCK GEN) 39. The modulator (MOD) 23, the A/D converters 24-1 and 24-2, the D/A converters 25-1 and 25-2, and the microwave transmitting and receiving unit interface 31 are the same as those of the fourth embodiment (see FIG. 5). That is, the modulation and demodulation processing unit 86 is provided with the demodulator (DEM) 38 and the clock generator 39 instead of the demodulator (DEM) 22 and the clock generator 35 of the modulation and demodulation processing unit 84 in the fourth embodiment.

The frequency converter (CONV) 40 mixes a reception RF signal from which an undesired frequency component is removed by the band-pass filter (BPF) 54 with a local oscillation signal generated by the local oscillator (OSC) 57; converts the mixed reception RF signal into a reception intermediate frequency signal (reception IF signal); and outputs the converted reception IF signal to the demodulator (DEM) 38 of the modulation and demodulation processing unit 86 through the band-pass filter (BPF) 56.

The frequency converter (CONV) 40 generates (extracts) a reference phase signal superimposed on the reception RF signal from the band-pass filter (BPF) 54, and outputs the generated (extracted) reference phase signal to the clock generator 39.

The clock generator 39 is provided with a reception symbol clock recovering circuit (not shown).

Based upon the reference phase signal from the frequency converter (CONV) 40, the clock generator 39 generates (recovers) a reception symbol clock having a frequency n times (n is an integer number) larger than a reception symbol frequency, and outputs the generated (recovered) reception symbol clock to the A/D converters 24-1 and 24-2, the D/A converters 25-1 and 25-2, the microwave transmitting and receiving unit interface 31, a microprocessor signal processing unit interface 34, and a microprocessor signal processing circuit (CPU) 26. The reception symbol clock is synchronous with the reference phase signal, and has a frequency different from the frequency of the reference phase signal.

Also, the clock generator is provided with a carrier-wave recovering circuit (not shown).

Based upon the reference phase signal from the frequency converter (CONV) 40, the clock generator 39 generates (recovers) a carrier wave, and outputs the generated (recovered) carrier wave to the demodulator (DEM) 38. The carrier wave is synchronous with the reference phase signal, and has a frequency different from the frequency of the reference phase signal.

The demodulator (DEM) 38 of the modulation and demodulation processing unit 86 carries out coherent detection by use of the carrier wave supplied from the clock generator 39, and converts the reception IF signal from the band-pass filter (BPF) 56 into the reception analog BB signal. In case of the QAM modulation signal, the demodulator (DEM) 38 generates (recovers) an in-phase carrier wave and a quadrature carrier wave from the carrier wave supplied from the clock generator 39. Through the use of the generated (recovered) in-phase carrier wave and quadrature carrier wave, the demodulator (DEM) 38 carries out the coherent detection to QAM modulation waves (an in-phase modulation wave and a quadrature modulation wave) to convert the QAM modulation waves into the reception analog BB signal, namely, an analog in-phase component signal (analog I signal) and an analog quadrature component signal (analog Q signal), and outputs the converted reception analog BB signal to the A/D converters 24-1 and 24-2.

The A/D converters 24-1 and 24-2 carries out sampling to the analog I signal and the analog Q signal from the demodulator (DEM) 22 by use of a sampling clock synchronous with the reception symbol clock from the clock generator 39; generates (converts) a digital in-phase component signal (digital I signal) and a digital quadrature component signal (digital Q signal) corresponding to the amplitudes of the carrier waves shown by the analog I signal and the analog Q signal at the time of the sampling, as a reception digital baseband signal (reception digital BB signal); and outputs the generated (converted) reception digital baseband signal to the microwave transmitting and receiving unit interface 31.

Next, an operation when the data processing terminal system in the sixth embodiment receives a signal will be described. The description of the operation overlapped with the fourth embodiment is omitted.

The reception RF signal received by the antenna 51 is outputted to the low noise amplifier (LNA) 53 by the duplexer (DUP) 52. The reception RF signal is amplified by the low noise amplifier (LNA) 53, and an undesired frequency component other than a carrier-wave frequency band is removed from reception RF signal by the band-pass filter (BPF) 54.

In the frequency converter (CONV) 40, the reception RF signal with the undesired frequency component removed is mixed with the local oscillation signal generated by the local oscillator (OSC) 57, to then be converted into the reception IF signal. For the reception IF signal, the carrier-wave frequency band is selected by the band-pass filter (BPF) 56, to be then outputted to the demodulator (DEM) 38.

At the same time as the conversion of the reception RF signal into the reception IF signal by the frequency converter (CONV) 40, the reference phase signal superimposed on the reception RF signal is separated by a demultiplexer circuit (not shown) in the frequency converter (CONV) 40, to be then outputted to the clock generator 39. On the reference phase signal, a clock synchronous with the reference phase signal is outputted from the clock generator 39 to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26. Also, the carrier wave recovered from the reference phase signal is outputted from the clock generator 39 to the demodulator (DEM) 38.

In the demodulator (DEM) 38, the reception IF signal from the band-pass filter (BPF) 56 is converted into the analog I signal and the analog Q signal as the reception analog BB signal, to be then outputted to the A/D converters 24-1 and 24-2.

In the A/D converters 24-1 and 24-2, the analog I signal and the analog Q signal from the demodulator (DEM) 38 are sampled with the sampling clock synchronous with the reception symbol clock from the clock generator 39, and are converted into the digital I signal and the digital Q signal as the reception digital BB signal, to be then outputted to the microwave transmitting and receiving unit interface 31 in synchronization with the reception symbol clock.

In the converting circuit of the microwave transmitting and receiving unit interface 31, the reception digital BB signal (the digital I signal and the digital Q signal from the A/D converters 24-1 and 24-2) are subjected to the signal level converting process and the parallel bit converting process in synchronization with the reception symbol clock from the clock generator 39, and are outputted to the microprocessor signal processing unit interface 34 in synchronization with the reception symbol clock.

In the converting circuit of the microprocessor signal processing unit interface 34, the reception digital BB signal (the digital I signal and the digital Q signal) from the microwave transmitting and receiving unit interface 31 is subjected to the signal level converting process and the parallel bit converting process in synchronization with the reception symbol clock from the clock generator 39, and then is outputted to the microprocessor signal processing circuit (CPU) 26 in synchronization with the reception symbol clock.

Based on the communication processing program executed by the microprocessor signal processing circuit (CPU) 26, the reception digital BB signal (the digital I signal and the digital Q signal) from the microprocessor signal processing unit interface 34 is subjected to an error correction process, a decoding processing, an identification data removing process, Fourier transform, and a digital waveform shaping processing, in synchronization with the reception symbol clock from the clock generator 39, and then is converted into the reception data. The microprocessor signal processing circuit (CPU) 26 processes the reception data with an application program (for example, an e-mail processing program).

Next, an operation when the data processing terminal system in the sixth embodiment transmits a signal will be described. The description of the operation overlapped with the fourth embodiment, is omitted.

After generating the transmission data based on the application program (for example, the e-mail processing program), the microprocessor signal processing circuit (CPU) 26 carries out a redundant data adding process for the error correction, an encoding process, an identification data adding process, inverse Fourier transform, and the digital waveform shaping processing, to the transmission data based on the communication processing program, in synchronization with the reception symbol clock from the clock generator 39; to convert the processed transmission data into the transmission digital BB signal (the digital I signal and the digital Q signal); and outputs the converted transmission digital BB signal to the microprocessor signal processing unit interface 34 in synchronization with the reception symbol clock.

In the converting circuit of the microprocessor signal processing unit interface 34, the transmission digital BB signal (the digital I signal and the digital Q signal) from the microprocessor signal processing circuit (CPU) 26 is subjected to the signal level converting process and the parallel bit converting process in synchronization with the reception symbol clock from the clock generator 39, and then is outputted to the microwave transmitting and receiving unit interface 31 in synchronization with the reception symbol clock.

In the converting circuit of the microwave transmitting and receiving unit interface 31, the transmission digital BB signal (the digital I signal and the digital Q signal) from the microprocessor signal processing unit interface 34 is subjected to the signal level converting process and the parallel bit converting process, in synchronization with the reception symbol clock from the clock generator 39, and then is outputted to the D/A converters 25-1 and 25-2 in synchronization with the reception symbol clock.

In the D/A converters 25-1 and 25-2, the transmission digital BB signal (the digital I signal and the digital Q signal) from the microwave transmitting and receiving unit interface 31 is converted into the transmission analog BB signal (the analog I signal and the analog Q signal) in synchronization with the reception symbol clock from the clock generator 39, and then is outputted to the modulator (MOD) 23.

In the modulator (MOD) 23, the transmission analog BB signal (the analog I signal and the analog Q signal) from the D/A converters 25-1 and 25-2 is converted into the transmission IF signals, to be then outputted to the band-pass filer (BPF) 62.

In the data processing terminal system in the sixth embodiment, the demodulator (DEM) 22 in the fourth embodiment does not recover the carrier wave by using a modulation wave to recover the reception symbol clock, but the clock generator 39 recovers the reception symbol clock and the carrier wave by using the reference phase signal from the frequency converter (CONV) 40. For this reason, in the data processing terminal system in the sixth embodiment, configurations of the carrier-wave recovering circuit and the reception symbol clock recovering circuit can be simplified, since the carrier wave and the reception symbol clock are recovered from the reference phase signal whose phase data is clearer than the modulation wave.

In the data processing terminal system in the sixth embodiment, the carrier wave and the reception symbol clock are recovered by use of the reference phase signal. For this reason, in the data processing terminal system in the sixth embodiment, phase noise of the recovered carrier wave and reception symbol clock can be improved.

In this way, in the data processing terminal system in the sixth embodiment, it is possible to simplify the carrier-wave recovering circuit for recovering the carrier wave and the reception symbol clock recovering circuit for recovering the reception symbol clock, and to improve the phase noise of the recovered carrier wave and reception symbol clock, in addition to the effect of the fourth embodiment.

It should be noted that, in this embodiment, the clock generator 39 is provided with the carrier-wave recovering circuit. However, the demodulator (DEM) 38, instead of the clock generator 39, may be provided with the carrier-wave recovering circuit. In this case, the clock generator 39 outputs the signal synchronous with the reference phase signal, (which may be the reception symbol clock or the reference phase signal itself, for example), to the demodulator (DEM) 38. Based upon the foregoing, the demodulator (DEM) 38 generates (recovers) the in-phase carrier wave and the quadrature carrier wave, and carries out the coherent detection to the QAM modulation waves (the in-phase modulation wave and the quadrature modulation wave), to carry out conversion into the reception analog BB signal, namely, the analog in-phase component signal (the analog I signal) and the analog quadrature component signal (the analog Q signal) as then be outputted to the A/D converters 24-1 and 24-2.

Also, in the data processing terminal system in the sixth embodiment, the modulation and demodulation processing unit 86, at the time of the reception, converts a reception intermediate frequency signal (reception IF signal) as a reception modulation wave signal from the high-frequency processing unit 21, into the reception digital BB signal, and outputs the converted reception digital BB signal to the microprocessor signal processing unit 6; and at the time of the transmission, converts the transmission digital BB signal from the microprocessor signal processing unit 6 into a transmission intermediate frequency signal (transmission IF signal) as a transmission modulation wave signal, and outputs the converted transmission IF signal to the high-frequency processing unit 21. However, the present invention is not limited to the foregoing. That is, it is also possible that the modulation and demodulation processing unit 86, at the time of the reception, converts the reception RF signal as the reception modulation wave signal from the high-frequency processing unit 21 into the reception digital BB signal, and outputs the converted reception digital BB signal to the microprocessor signal processing unit 6; and at the time of the transmission, converts the transmission digital BB signal from the microprocessor signal processing unit 6 into the transmission RF signal as the transmission modulation wave signal, and outputs the converted transmission RF signal to the high-frequency processing unit 21.

Figure 15:
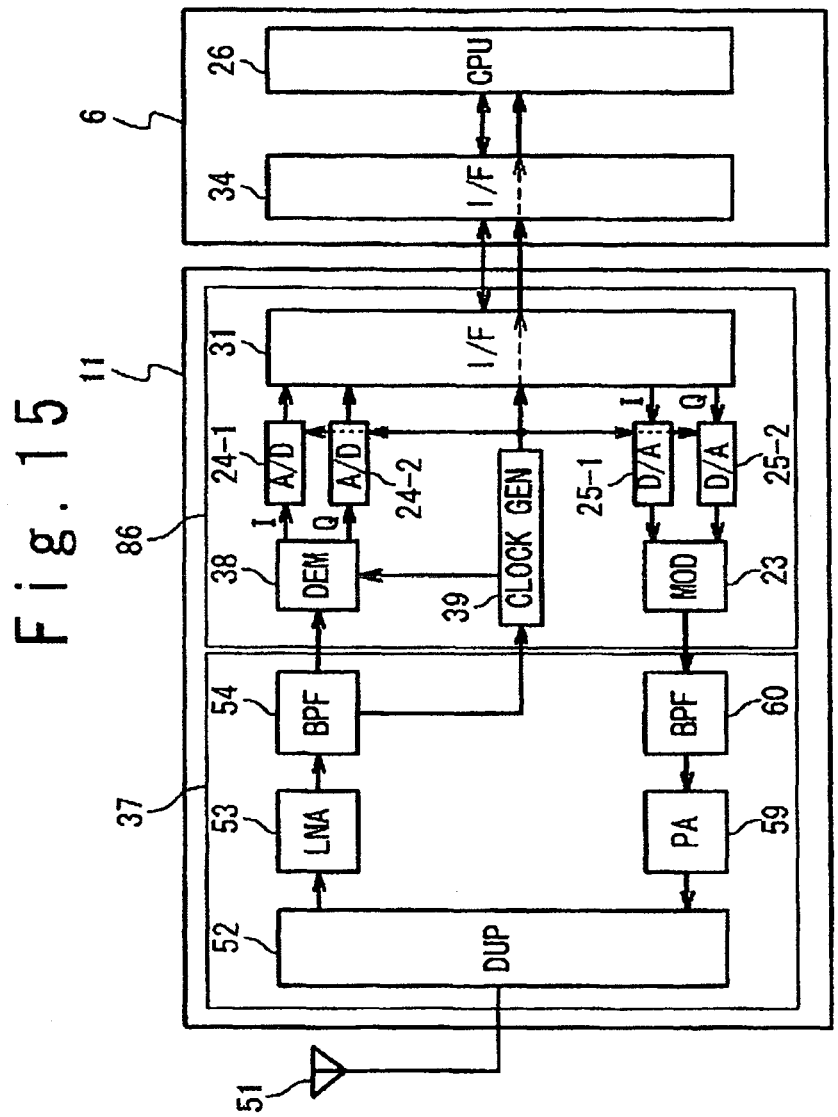
FIG. 15 shows a modification of the information processing terminal system according to the sixth embodiment of the present invention.

In this case, in a modification of the data processing terminal system in the sixth embodiment of the present invention, as shown in FIG. 15, the high-frequency processing unit 21 is provided with the duplexer (DUP) 52, the low noise amplifier (LNA) 53, the band-pass filters (BPF) 54 and 60, and the power amplifier (PA) 59. The band-pass filter (BPF) 54 is provided with a reception signal band-pass filter (not shown) and a reference signal band-pass filter (not shown).

In the reception signal band-pass filter of the band-pass filter (BPF) 54, a frequency band of the reception RF signal is set. The reception signal band-pass filter extracts only the reception RF signal supplied from the low noise amplifier (LNA) 53, and outputs the extracted reception RF signal to the demodulator (DEM) 38. In the reference phase signal band-pass filter of the band-pass filter (BPF) 54, the frequency band of the reference phase signal is set. The reference phase signal band-pass filter extracts only the reference phase signal superimposed on the reception RF signal supplied from the low noise amplifier (LNA) 53, and outputs the extracted reference phase signal to the clock generator 39.

Based upon the reference phase signal from the band-pass filter (BPF) 54, the clock generator 39 generates (recovers) the reception symbol clock, and outputs the generated (recovered) reception symbol clock to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26. The A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26 operate in synchronization with the reception symbol clock from the clock generator 39. Also, the clock generator 39 generates (recovers) the carrier wave to be outputted to the demodulator (DEM) 38, based upon the reference phase signal from the band-pass filter (BPF) 54.

The demodulator (DEM) 38 converts the reception RF signal from the band-pass filter (BPF) 54 into the reception analog BB signal (the analog I signal and the analog Q signal), and outputs the converted reception analog BB signal to the A/D converters 24-1 and 24-2.

The modulator (MOD) 23 converts the transmission analog BB signal (the analog I signal and the analog Q signal) into the transmission RF signals; and outputs the converted transmission RF signals to the power amplifier (PA) 59 through the band-pass filter (BPF) 60.

Figure 20:
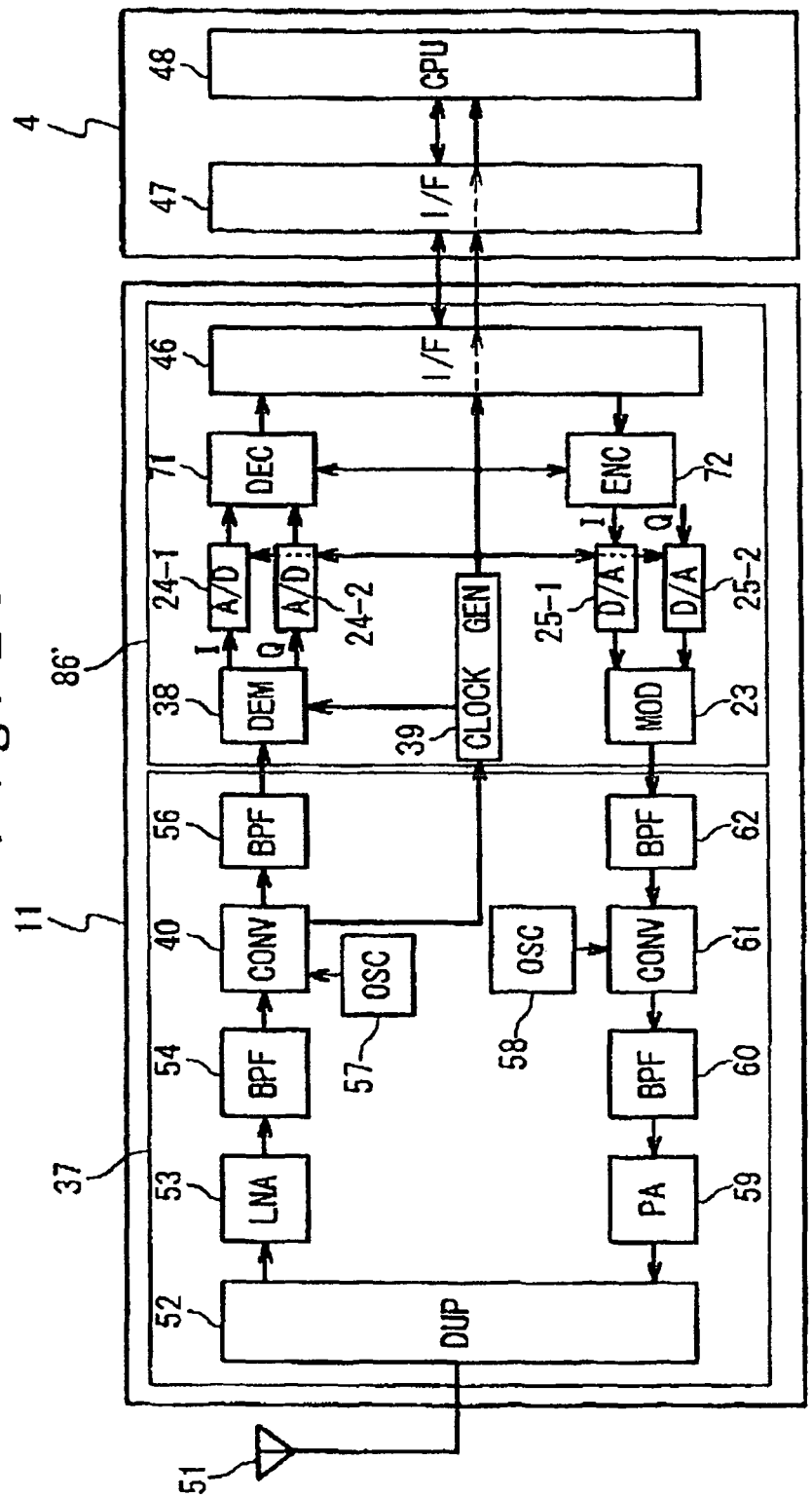
FIG. 20 shows a configuration of the information processing terminal system in which the information processing terminal system according to the sixth embodiment to the information processing terminal system according to the second embodiment.

Additionally, in the present invention, as a modification of the data processing terminal system in the sixth embodiment as shown in FIG. 20, the data processing terminal system in the sixth embodiment can be applied to the data processing terminal system in the second embodiment.

The data processing terminal system in the sixth embodiment has a microprocessor signal processing unit 4 in the second embodiment, instead of the microprocessor signal processing unit 6. The microprocessor signal processing unit 4 is provided with the microprocessor signal processing unit interface 47 and the microprocessor signal processing circuit (CPU) 48, as mentioned above. In the data processing terminal system in the sixth embodiment, the microwave transmitting and receiving unit 11 is provided with a modulation and demodulation processing unit 86', instead of the modulation and demodulation processing unit 86. The modulation and demodulation processing unit 86' is provided with the demodulator (DEM) 38, the modulator (MOD) 23, and the baseband processing unit. The baseband processing unit is provided with the A/D converters 24-1 and 24-2, the D/A converters 25-1 and 25-2, the decoder (DEC) 71, the encoder (ENC) 72, the microwave transmitting and receiving unit interface 46, and the clock generator 39.

In this case, based upon the reference phase signal from the frequency converter (CONV) 40, the clock generator 39 generates (recovers) the reception symbol clock, and outputs the generated (recovered) reception symbol clock to the A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48 operate in synchronization with the reception symbol clock from the clock generator 39. Also, based upon the reference phase signal from the frequency converter (CONV) 40, the clock generator 39 generates (recovers) the carrier wave, and outputs the generated (recovered) carrier wave to the demodulator (DEM) 38.

Additionally, in the data processing terminal system in the sixth embodiment, the modulation and demodulation processing unit 86', at the time of the reception, converts the reception intermediate frequency signal (reception IF signal) as the reception modulation wave signal from the high-frequency processing unit 21, into the reception data, and outputs the converted reception data to the microprocessor signal processing unit 4; and at the time of the transmission, converts the transmission data from the microprocessor signal processing unit 4 into the transmission intermediate frequency signal (transmission IF signal) as the transmission modulation wave signal, and outputs the converted transmission IF signal to the high-frequency processing unit 21. However, the present invention is not limited to the foregoing. That is, it is also possible that the modulation and demodulation processing unit 86', at the time of the reception, converts the reception RF signal as the reception modulation wave signal from the high-frequency processing unit 21 into the reception data, and outputs the converted reception data to the microprocessor signal processing unit 4; and at the time of the transmission, converts the transmission data from the microprocessor signal processing unit 4 into the transmission RF signal as the transmission modulation wave signal, and outputs the converted transmission RF signal to the high-frequency processing unit 21.

Figure 25:
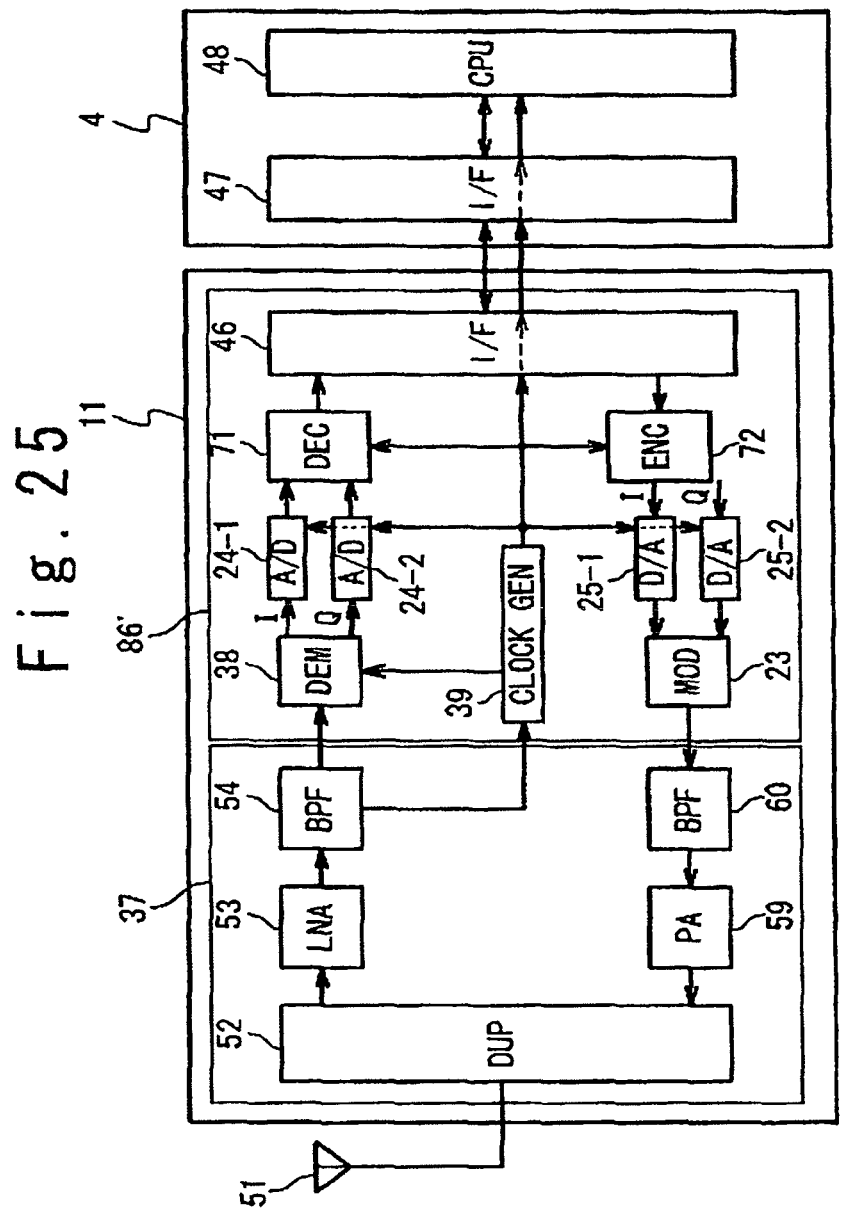
FIG. 25 shows a modification of the information processing terminal system according to the sixth embodiment of the present invention.

In this case, in a modification of the data processing terminal system in the sixth embodiment of the present invention, as shown in FIG. 25, the high-frequency processing unit 21 is provided with the duplexer (DUP) 52, the low noise amplifier (LNA) 53, the band-pass filters (BPF) 54 and 60, and the power amplifier (PA) 59. The band-pass filter (BPF) 54 is provided with a reception signal band-pass filter (not shown) and a reference phase signal band-pass filter (not shown).

In the reception signal band-pass filter of the band-pass filter (BPF) 54, the frequency band of the reception RF signal is set. The reception signal band-pass filter extracts only the reception RF signal supplied from the low noise amplifier (LNA) 53, and outputs the extracted reception RF signal to the demodulator (DEM) 38. In the reference signal band-pass filter of the band-pass filter (BPF) 54, the frequency band of the reference phase signal is set. The reference phase signal band-pass filter extracts only the reference phase signal superimposed on the reception RF signal supplied from the low noise amplifier (LNA) 53, and outputs the extracted reference phase signal to the clock generator 39.

Based upon the reference phase signal from the band-pass filter (BPF) 54, the clock generator 39 generates (recovers) the reception symbol clock, and outputs the generated (recovered) reception symbol clock to the A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48 operate in synchronization with the reception symbol clock from the clock generator 39. Also, based upon the reference phase signal from the band-pass filter (BPF) 54, the clock generator 39 generates (recovers) the carrier wave, and outputs the generated (recovered) carrier wave to the demodulator (DEM) 38.

The demodulator (DEM) 38 converts the reception RF signal from the band-pass filter (BPF) 54 into the reception analog BB signal (the analog I signal and the analog Q signal), and outputs the converted reception analog BB signal to the A/D converters 24-1 and 24-2.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

[Seventh Embodiment]

Figure 8:
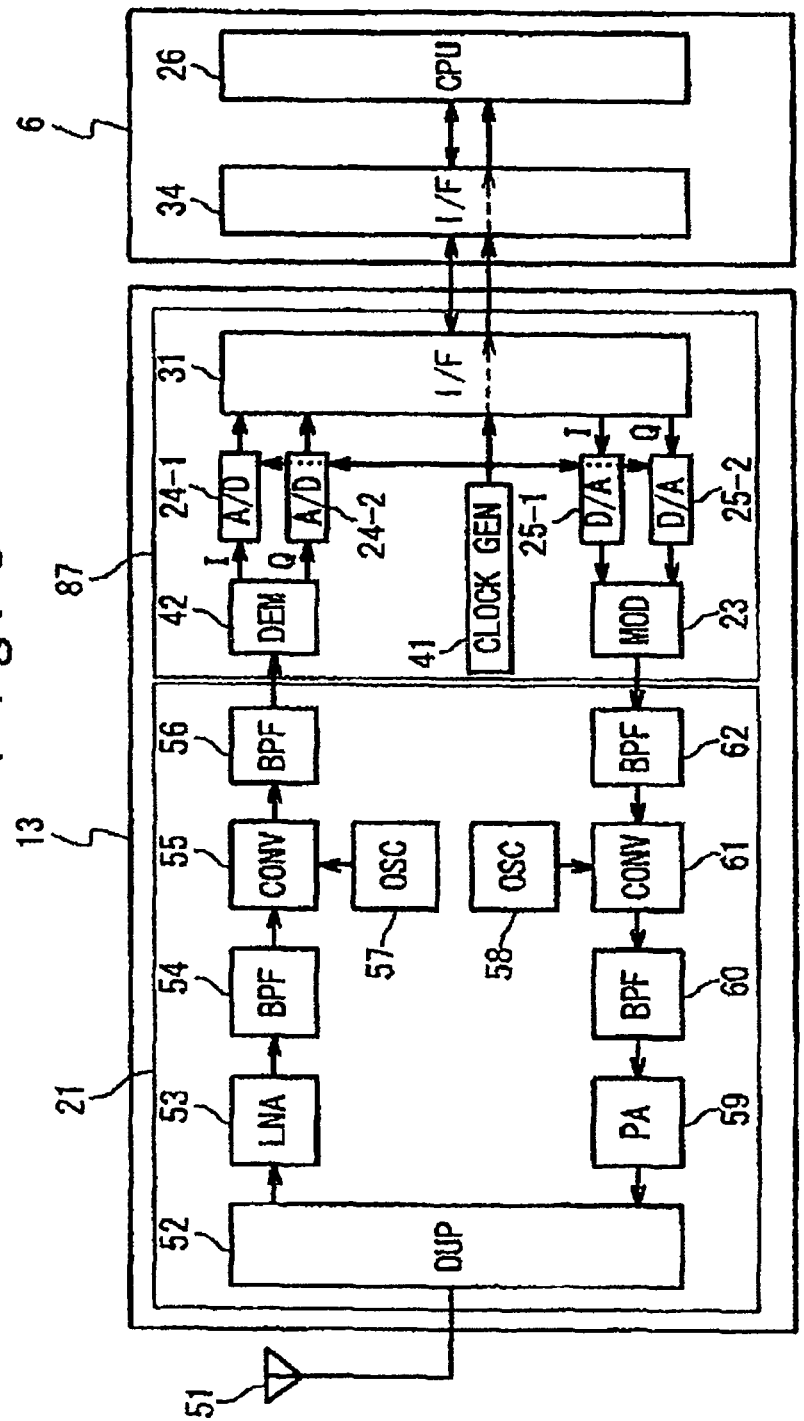
FIG. 8 shows a configuration of the information processing terminal system according to a seventh embodiment of the present invention.

FIG. 8 shows a configuration of the data processing terminal system using a microwave-band quadrature amplitude modulation wave, as the data processing terminal system in the seventh embodiment of the present invention. In the data processing terminal system in the seventh embodiment, in addition to the effect of the fourth embodiment, the reception symbol clock recovering circuit is not necessary. In the seventh embodiment, the description overlapped with the foregoing is omitted.

The data processing terminal system in the seventh embodiment has the antenna 51 connected to a network, a microwave transmitting and receiving unit 13, and a microprocessor signal processing unit 6. The antenna 51 and the microwave transmitting and receiving unit 13 are a transmitting and receiving apparatus (communication apparatus). The microprocessor signal processing unit 6 is a data processing terminal. That is, the data processing terminal system in the seventh embodiment has the microwave transmitting and receiving unit 13, instead of the microwave transmitting and receiving unit 7 in the data processing terminal system in the fourth embodiment.

The data processing terminal system in the seventh embodiment can be configured in such a manner that the microwave transmitting and receiving unit 13 can be attached to and detached from the microprocessor signal processing unit 6. When the microwave transmitting and receiving unit 13 and the microprocessor signal processing unit 6 are separated, the user can use the data processing terminal system in the seventh embodiment as the data processing terminal, only with the function of the microprocessor signal processing unit 6.

The microwave transmitting and receiving unit 13 is provided with the high-frequency processing unit 21 and a modulation and demodulation processing unit 87. The high-frequency processing unit 21 is the same as that of the first embodiment (see FIG. 2).

The modulation and demodulation processing unit 87 is provided with a demodulator (DEM) 42, the modulator (MOD) 23, and a baseband processing unit. The baseband processing unit is provided with the analog/digital (A/D) converters 24-1 and 24-2, the digital/analog (D/A) converters 25-1 and 25-2, the microwave transmitting and receiving unit interface (I/F) 31, and a system clock generator (CLOCK GEN) 41. The modulator (MOD) 23, the A/D converters 24-1 and 24-2, the D/A converters 25-1 and 25-2, and the microwave transmitting and receiving unit interface 31, are the same as those of the fourth embodiment (see FIG. 5). That is, the modulation and demodulation processing unit 87 is provided with the demodulator (DEM) 42 and the system clock generator 41, instead of the demodulator (DEM) 22 and the clock generator 35 of the modulation and demodulation processing unit 84 in the fourth embodiment.

The demodulator (DEM) 42 of the modulation and demodulation processing unit 87 is provided with a carrier-wave recovering circuit (not shown). The carrier-wave recovering circuit of the demodulator (DEM) 42 is the same as the carrier-wave recovering circuit of the demodulator (DEM) 22 of the modulation and demodulation processing unit 81 in the first embodiment.

The system clock generator 41 generates a system clock through self-oscillation, and outputs the generated system clock to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26.

Next, an operation when the data processing terminal system in the seventh embodiment receives a signal will be described. The description of the operation overlapped with the fourth embodiment is omitted.

In the demodulator (DEM) 42, the reception IF signal from the band-pass filter (BPF) 56 is converted into the analog I signal and the analog Q signal as the reception analog BB signal, and then is outputted to the A/D converters 24-1 and 24-2.

Through the self-oscillation of the system clock generator 41, a system clock is outputted from the system clock generator 41 to the A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26.

In the A/D converters 24-1 and 24-2, the analog I signal and the analog Q signal from the demodulator (DEM) 38 are sampled with a sampling clock synchronous with the system clock from the system clock generator 41, are converted into the digital I signal and the digital Q signal as the reception digital BB signal, and are then outputted to the microwave transmitting and receiving unit interface 31.

In the converting circuit of the microwave transmitting and receiving unit interface 31, the reception digital BB signal (the digital I signal and the digital Q signal from the A/D converters 24-1 and 24-2) is subjected to the signal level converting process and the parallel bit converting process in synchronization with the system clock from the system clock generator 41, and is then outputted to the microprocessor signal processing unit interface 34 in synchronization with the system clock.

In the converting circuit of the microprocessor signal processing unit interface 34, the reception digital BB signal (the digital I signal and the digital Q signal) from the microwave transmitting and receiving unit interface 31 is subjected to the signal level converting process and the parallel bit converting process in synchronization with the system clock from the system clock generator 41, and is then outputted to the microprocessor signal processing circuit (CPU) 26 in synchronization with the system clock.

Based on the communication processing program executed by the microprocessor signal processing circuit (CPU) 26, the reception digital BB signal (the digital I signal and the digital Q signal) from the microprocessor signal processing unit interface 34 is subjected to an error correction process, a decoding process, an identification data removing process, Fourier transform, and a digital waveform shaping processing in synchronization with the system clock from the system clock generator 41, to be converted into the reception data. Thus, in the microprocessor signal processing circuit (CPU) 26, the digital waveform shaping processing is also carried out to the reception digital BB signal (the digital I signal and the digital Q signal) in order to recover a waveform to determine the reception data. The microprocessor signal processing circuit (CPU) 26 processes the reception data based on an application program (for example, an e-mail processing program).

Next, an operation when the data processing terminal system in the seventh embodiment transmits a signal will be described. The description of the operation overlapped with the fourth embodiment is omitted.

After generating the transmission data based on the application program (for example, the e-mail processing program), the microprocessor signal processing circuit (CPU) 26, carries out a redundant data adding process for the error correction, an encoding process, an identification data adding process, inverse Fourier transform, and the digital waveform shaping processing to the transmission data based on the communication processing program in synchronization with the system clock from the system clock generator 41 to convert the transmission data into the transmission digital BB signal (the digital I signal and the digital Q signal); and outputs the converted transmission digital BB signal to the microprocessor signal processing unit interface 34 in synchronization with the system clock.

In the converting circuit of the microprocessor signal processing unit interface 34, the transmission digital BB signal (the digital I signal and the digital Q signal) from the microprocessor signal processing circuit (CPU) 26 is subjected to the signal level converting process and the parallel bit converting process in synchronization with the system clock from the system clock generator 41, and is then outputted to the microwave transmitting and receiving unit interface 31 in synchronization with the system clock.

In the converting circuit of the microwave transmitting and receiving unit interface 31, the transmission digital BB signal (the digital I signal and the digital Q signal) from the microprocessor signal processing unit interface 34 is subjected to the signal level converting process and the parallel bit converting process in synchronization with the system clock from the system clock generator 41, and is then outputted to the D/A converters 25-1 and 25-2 in synchronization with the system clock.

In the D/A converters 25-1 and 25-2, the transmission digital BB signal (the digital I signal and the digital Q signal) from the microwave transmitting and receiving unit interface 31 is converted into the transmission analog BB signal (the analog I signal and the analog Q signal) in synchronization with the system clock from the system clock generator 41, and is then outputted to the modulator (MOD) 23.

In the modulator (MOD) 23, the transmission analog BB signal (the analog I signal and the analog Q signal from the D/A converters 25-1 and 25-2) is converted into the transmission IF signal, and is then outputted to the band-pass filter (BPF) 62.

In the data processing terminal system in the seventh embodiment, the digital waveform shaping processing is also carried out to the digital BB signal (the digital I signal and the digital Q signal) in the microprocessor signal processing circuit (CPU) 26, in order to recover the waveform to determine the reception data. For this reason, the reception symbol clock recovering circuit for recovering the reception symbol clock is not necessary in the demodulator (DEM) 42. Thus, in the data processing terminal system in the seventh embodiment, the reception symbol clock recovering circuit is unnecessary, in addition to the effect of the fourth embodiment.

Additionally, in the data processing terminal system in the seventh embodiment, the modulation and demodulation processing unit 87, at the time of the reception, converts the reception intermediate frequency signal (reception IF signal) as a reception modulation wave signal from the high-frequency processing unit 21, into the reception digital BB signal, and outputs the converted reception digital BB signal to the microprocessor signal processing unit 6; and at the time of the transmission, converts the transmission digital BB signal from the microprocessor signal processing unit 6 into the transmission intermediate frequency signal (transmission IF signal) as a transmission modulation wave signal, and outputs the converted transmission IF signal to the high-frequency processing unit 21. However, the present invention is not limited to the foregoing. That is, it is also possible that the modulation and demodulation processing unit 87, at the time of the reception, converts the reception RF signal as the reception modulation wave signal from the high-frequency processing unit 21 into the reception digital BB signal, and outputs the converted reception digital BB signal to the microprocessor signal processing unit 6; and at the time of the transmission, converts the transmission digital BB signal from the microprocessor signal processing unit 6 into the transmission RF signal as the transmission modulation wave signal, and outputs the converted transmission RF signal to the high-frequency processing unit 21.

Figure 16:
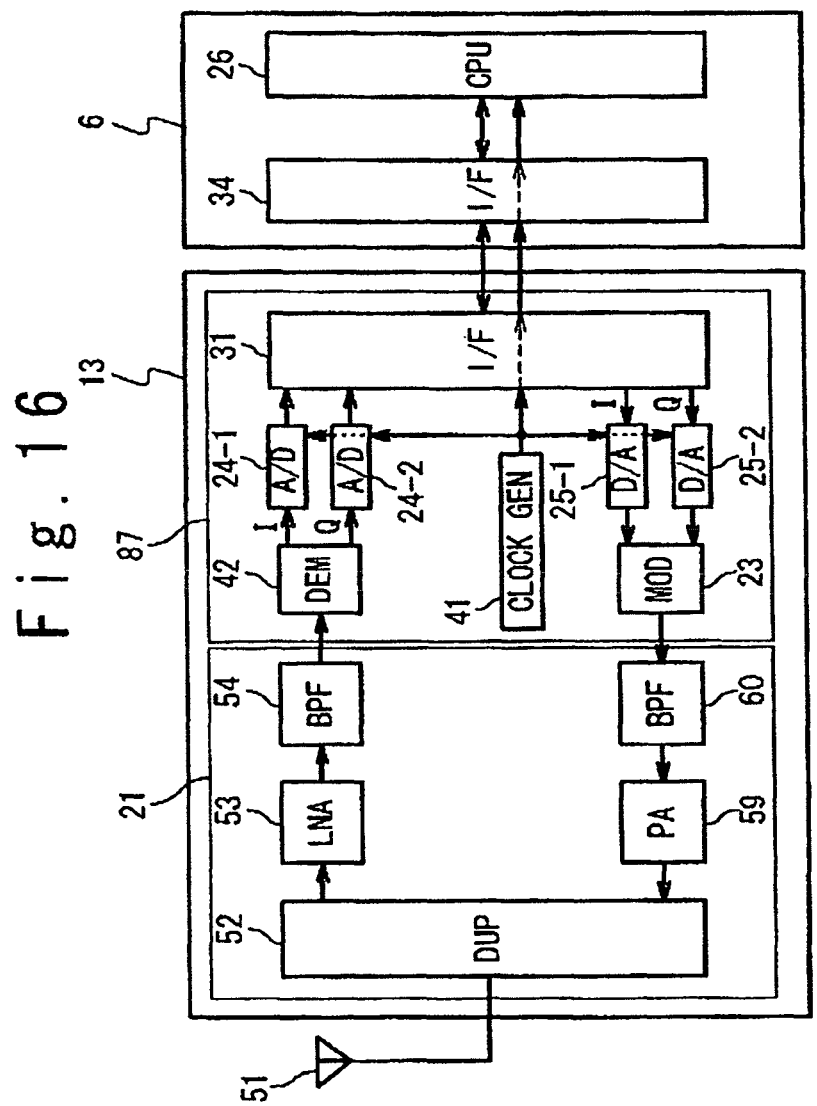
FIG. 16 shows a modification of the information processing terminal system according to the seventh embodiment of the present invention.

In this case, in a modification of the data processing terminal system in the seventh embodiment of the present invention, as shown in FIG. 16, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 42 converts the reception RF signal from the band-pass filter (BPF) 54 into the reception analog BB signal (the analog I signal and the analog Q signal), and outputs the converted reception analog BB signal to the A/D converters 24-1 and 24-2. The A/D converters 24-1 and 24-2, the D/A converters 25-1 and 25-2, the microwave transmitting and receiving unit interface 31, the microprocessor signal processing unit interface 34, and the microprocessor signal processing circuit (CPU) 26 operate in synchronization with the system clock from the system clock generator 41.

The modulator (MOD) 23 converts the transmission analog BB signal (the analog I signal and the analog Q signal) into the transmission RF signals; and outputs the converted transmission RF signals to the power amplifier (PA) 59 through the band-pass filter (BPF) 60.

Figure 21:
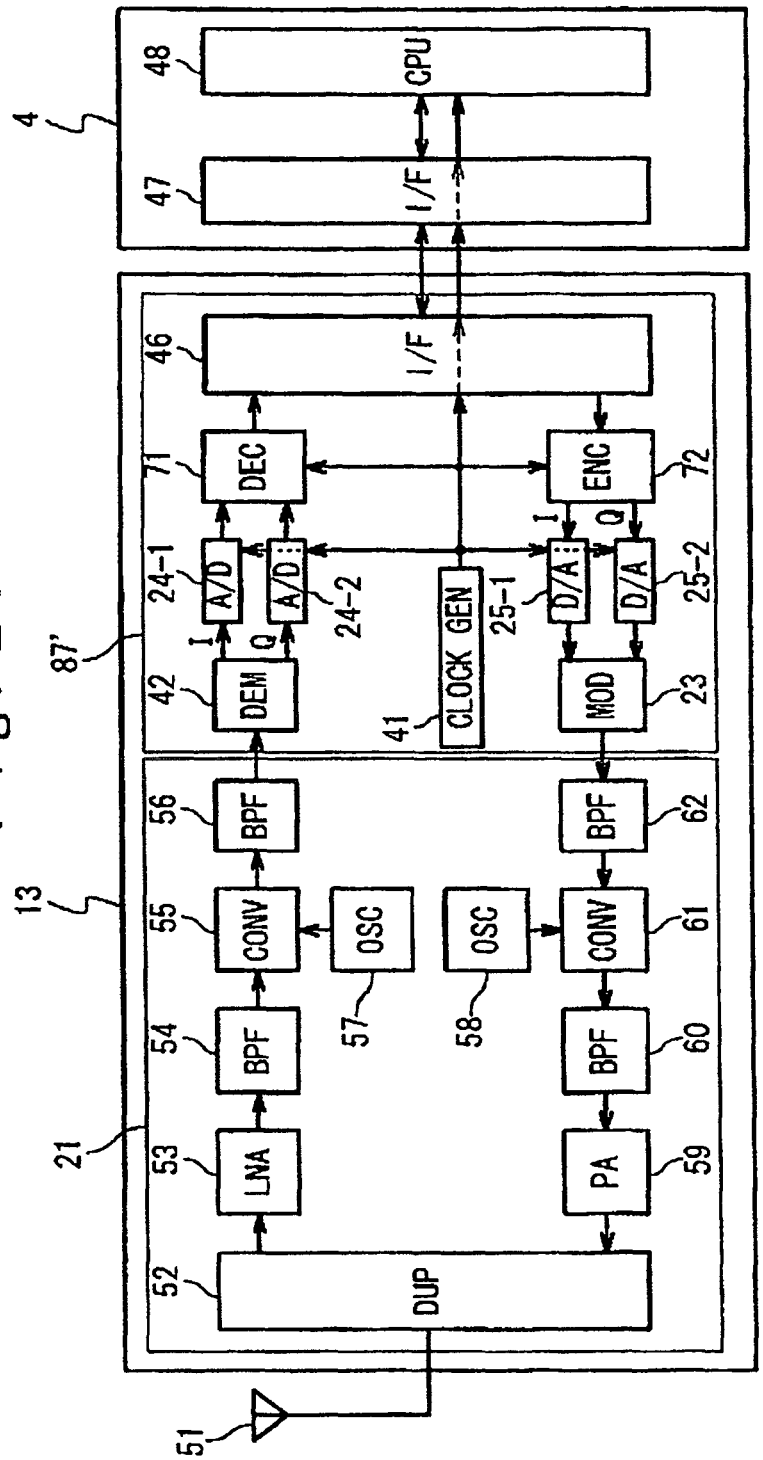
FIG. 21 shows a configuration of the information processing terminal system in which the information processing terminal system according to the seventh embodiment to the information processing terminal system according to the second embodiment.

Also, in the data processing terminal system in the seventh embodiment of the present invention, as shown in FIG. 21, the data processing terminal system in the seventh embodiment can be applied to the data processing terminal system in the second embodiment.

The data processing terminal system in the seventh embodiment may have a microprocessor signal processing unit 4 in the second embodiment instead of the microprocessor signal processing unit 6. The microprocessor signal processing unit 4 is provided with the microprocessor signal processing unit interface 47 and the microprocessor signal processing circuit (CPU) 48, as mentioned above. In the data processing terminal system in the seventh embodiment, the microwave transmitting and receiving unit 13 is provided with a modulation and demodulation processing unit 87' instead of the modulation and demodulation processing unit 87. The modulation and demodulation processing unit 87' is provided with the demodulator (DEM) 42 and the baseband processing unit. The baseband processing unit is provided with the modulator (MOD) 23, the A/D converters 24-1 and 24-2, the D/A converters 25-1 and 25-2, the decoder (DEC) 71, the encoder (ENC) 72, the microwave transmitting and receiving unit interface 46, and the system clock generator 41.

In this case, the system clock generator 41 generates a system clock through the self-oscillation, and outputs the generated system clock to the A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48 operate in synchronization with the system clock from the system clock generator 41.

Also, in the data processing terminal system in the seventh embodiment, the modulation and demodulation processing unit 87', at the time of the reception, converts the reception intermediate frequency signal (reception IF signal) as the reception modulation wave signal from the high-frequency processing unit 21, into the reception data, and outputs the converted reception data to the microprocessor signal processing unit 4; and at time of the transmission, converts the transmission data from the microprocessor signal processing unit 4 into the transmission intermediate frequency signal (transmission IF signal) as the transmission modulation wave signal, and outputs the converted transmission IF signal to the high-frequency processing unit 21. However, the present invention is not limited to the foregoing. That is, it is also possible that the modulation and demodulation processing unit 87', at the time of the reception, converts the reception RF signal as the reception modulation wave signal from the high-frequency processing unit 21 into the reception data, and outputs the converted reception data to the microprocessor signal processing unit 4; and at the time of the transmission, converts the transmission data from the microprocessor signal processing unit 4 into the transmission RF signal as the transmission modulation wave signal, and outputs the converted transmission RF signal to the high-frequency processing unit 21.

Figure 26:
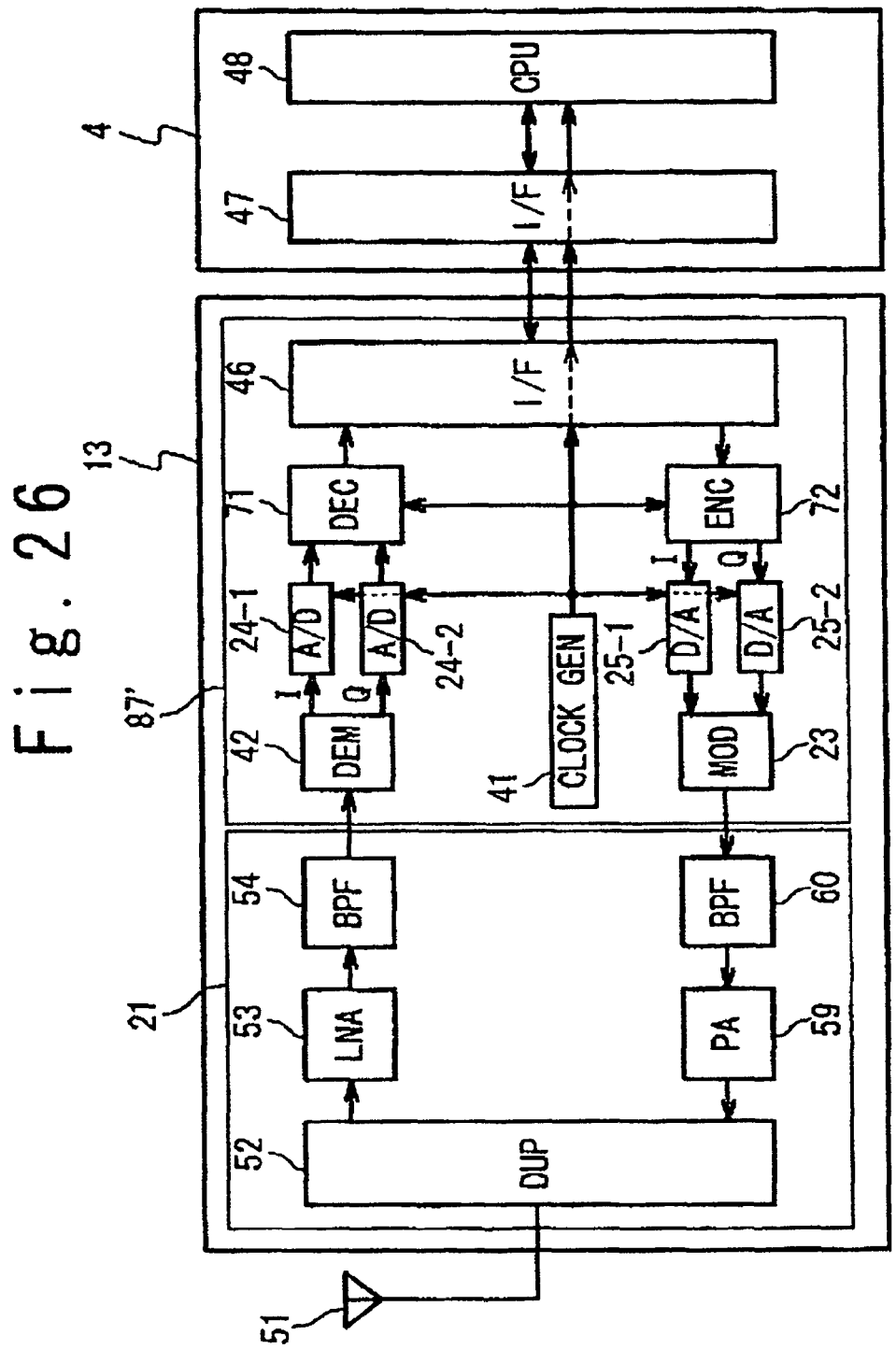
FIG. 26 shows a modification of the information processing terminal system according to the seventh embodiment of the present invention.

In this case, in a modification of the data processing terminal system in the seventh embodiment of the present invention, as shown in FIG. 26, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 42 converts the reception RF signals from the band-pass filter (BPF) 54 into the reception analog BB signal (the analog I signal and the analog Q signal), and outputs the converted reception analog BB signal to the A/D converters 24-1 and 24-2. The A/D converters 24-1 and 24-2, the D/A converters 25-1 and 25-2, the decoder (DEC) 71, the encoder (ENC) 72, the microwave transmitting and receiving unit interface 46, the microprocessor signal processing unit interface 47, and the microprocessor signal processing circuit (CPU) 48 operate in synchronization with the system clock from the system clock generator 41.

The modulator (MOD) 23 converts the transmission analog BB signal (the analog I signal and the analog Q signal) into the transmission RF signals; and outputs the converted transmission RF signals to the power amplifier (PA) 59 through the band-pass filter (BPF) 60.

[Eighth Embodiment]

Figure 9:
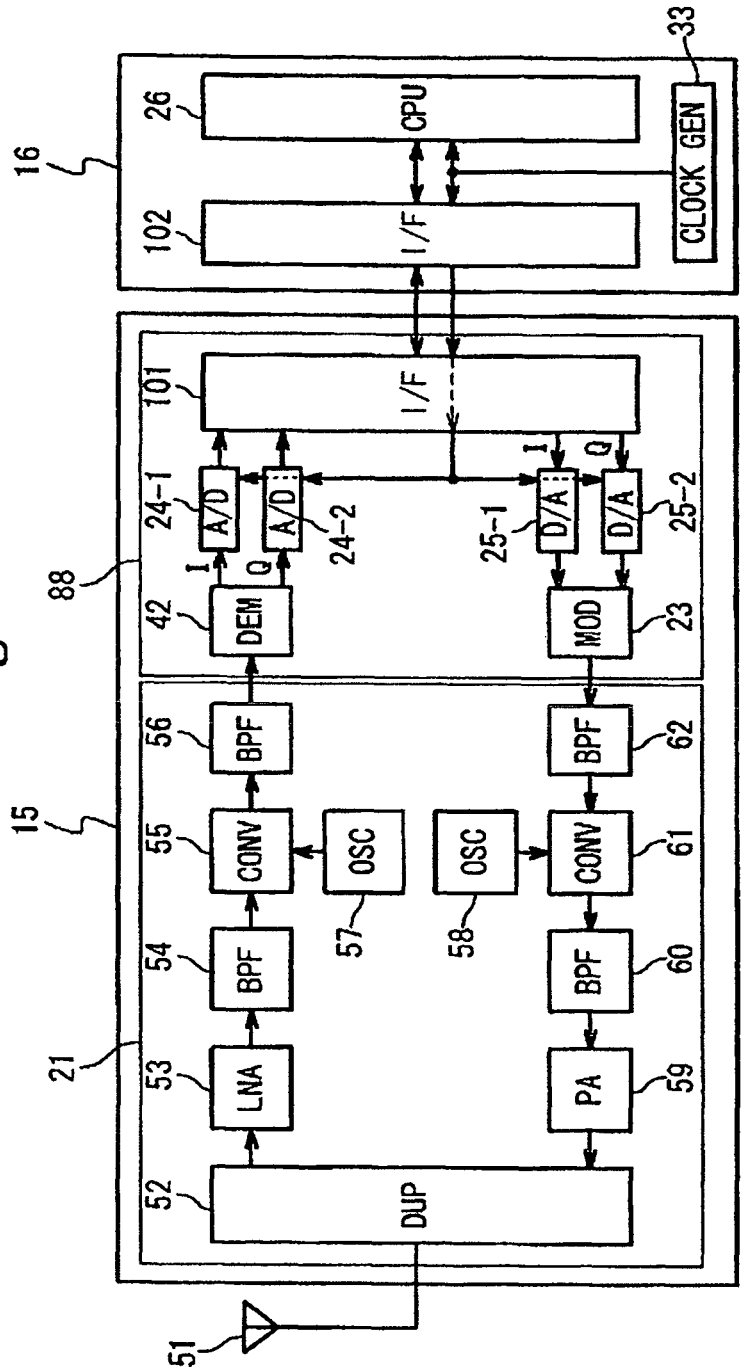
FIG. 9 shows a configuration of the information processing terminal system according to the eighth embodiment of the present invention.

FIG. 9 shows a configuration of the data processing terminal system using a microwave-band quadrature amplitude modulation wave, as the data processing terminal system in the eighth embodiment of the present invention. In the data processing terminal system in the eighth embodiment, in addition to the effect of the seventh embodiment, the microprocessor signal processing circuit (CPU) in the microprocessor signal processing unit operates at all times even if a microwave transmitting and receiving unit and a microprocessor signal processing unit are separated for some reason. In the eighth embodiment, the description overlapped with the foregoing is omitted.

The data processing terminal system in the eighth embodiment has the antenna 51 connected to the network, the microwave transmitting and receiving unit 15, and the microprocessor signal processing unit 16. The antenna 51 and the microwave transmitting and receiving unit 15 are a transmitting and receiving apparatus (communication apparatus). The microprocessor signal processing unit 16 is a data processing terminal. That is, the data processing terminal system in the eighth embodiment has the microwave transmitting and receiving unit 15 and the microprocessor signal processing unit 16 instead of the microwave transmitting and receiving unit 13 and the microprocessor signal processing unit 6 in the data processing terminal system in the seventh embodiment.

The microwave transmitting and receiving unit 15 is provided with the high-frequency processing unit 21 and a modulation and demodulation processing unit 88. The high-frequency processing unit 21 is the same as that of the first embodiment (see FIG. 2).

The modulation and demodulation processing unit 88 is provided with the demodulator (DEM) 42, the modulator (MOD) 23, and a baseband processing unit. The baseband processing unit is provided with the analog/digital (A/D) converters 24-1 and 24-2, the digital/analog (D/A) converters 25-1 and 25-2, and a microwave transmitting and receiving unit interface (I/F) 101. The demodulator (DEM) 42, the modulator (MOD) 23, the A/D converters 24-1 and 24-2, and the D/A converters 25-1 and 25-2 are the same as those of the seventh embodiment (see FIG. 8). The microwave transmitting and receiving unit interface (I/F) 101 has the same function as the microwave transmitting and receiving unit interface (I/F) 31 mentioned above, but has different input and output of a system clock from the microwave transmitting and receiving unit interface (I/F) 31 mentioned above.

The microprocessor signal processing unit 16 is provided with a microprocessor signal processing unit interface (I/F) 102, the microprocessor signal processing circuit (CPU) 26, and a system clock generator (CLOCK GEN) 33. The microprocessor signal processing circuit 26 is the same as that of the seventh embodiment (see FIG. 8). The microprocessor signal processing unit interface (I/F) 102 has the same function as the microprocessor signal processing unit interface (I/F) 34 mentioned above, but has different input and output of a system clock from the microprocessor signal processing unit interface (I/F) 34 mentioned above.

The system clock generator 33 generates a system clock through self-oscillation, and outputs the generated system clock to the A/D converters 24-1 and 24-2, the D/A converters 25-1 and 25-2, the microwave transmitting and receiving unit interface 101, the microprocessor signal processing unit interface 102, and the microprocessor signal processing circuit (CPU) 26.

The data processing terminal system in the eighth embodiment can be configured in such a manner that the microwave transmitting and receiving unit 15 can be attached to and detached from the microprocessor signal processing unit 16. Even when the microwave transmitting and receiving unit 15 and the microprocessor signal processing unit 16 are separated, it is possible for the microprocessor signal processing circuit (CPU) 26 to execute a general program (not shown) for spreadsheet processing and word-processing, which does not use a microwave transmitting and receiving function, from among a plurality of programs stored in a memory in synchronization with the system clock from the system clock generator 33. Also, it is possible for the microprocessor signal processing circuit (CPU) 26 to carry out the general data processing (processing in which only a function of the data processing terminal is used). In other words, the user can use the data processing terminal system in the eighth embodiment as the data processing terminal, only with the function of the microprocessor signal processing unit 16.

Next, an operation when the data processing terminal system in the eighth embodiment receives a signal will be described. The description of the operation overlapped with the seventh embodiment is omitted.

In the demodulator (DEM) 42, the reception IF signal from the band-pass filter (BPF) 56 is converted into the analog I signal and the analog Q signal as the reception analog BB signal, and is then outputted to the A/D converters 24-1 and 24-2.

Through the self-oscillation of the system clock generator 33, the system clock is outputted from the system clock generator 33 to the A/D converters 24-1 and 24-2, the D/A converters 25-1 and 25-2, the microwave transmitting and receiving unit interface 101, the microprocessor signal processing unit interface 102, and the microprocessor signal processing circuit (CPU) 26.

In the A/D converters 24-1 and 24-2, the analog I signal and the analog Q signal from the demodulator (DEM) 38 are sampled with a sampling clock synchronous with the system clock from the system clock generator 33, and are converted into the digital I signal and the digital Q signal as the reception digital BB signal, to be then outputted to the microwave transmitting and receiving unit interface 101 in synchronization with the system clock.

In the converting circuit of the microwave transmitting and receiving unit interface 101, the reception digital BB signal (the digital I signal and the digital Q signal) from the A/D converters 24-1 and 24-2 is subjected to the signal level converting process and the parallel bit converting process in synchronization with the system clock from the system clock generator 33, and is then outputted to the microprocessor signal processing unit interface 102 in synchronization with the system clock.

In the converting circuit of the microprocessor signal processing unit interface 102, the reception digital BB signal (the digital I signal and the digital Q signal) from the microwave transmitting and receiving unit interface 101 is subjected to the signal level converting process and the parallel bit converting process in synchronization with the system clock from the system clock generator 33, and is then be outputted to the microprocessor signal processing circuit (CPU) 26 in synchronization with the system clock.

Based on the communication processing program executed by the microprocessor signal processing circuit (CPU) 26, the reception digital BB signal (the digital I signal and the digital Q signal) from the microprocessor signal processing unit interface 102 is subjected to an error correction process, a decoding process, an identification data removing process, Fourier transform, and a digital waveform shaping processing in synchronization with the system clock from the system clock generator 33, and is then converted into the reception data in synchronization with the system clock. Thus, in the microprocessor signal processing circuit (CPU) 26, the digital waveform shaping processing is carried out to the reception digital BB signal (the digital I signal and the digital Q signal) in order to recover a waveform to determine the reception data. The microprocessor signal processing circuit (CPU) 26 processes the reception data with an application program (for example, an e-mail processing program).

Next, an operation when the data processing terminal system in the eighth embodiment transmits a signal will be described. The description of the operation overlapped with the seventh embodiment is omitted.

After generating the transmission data based on the application program (for example, the e-mail processing program), the microprocessor signal processing circuit (CPU) 26 carries out a redundant data adding process for the error correction, an encoding process, an identification data adding process, inverse Fourier transform, and the digital waveform shaping processing to the transmission data based on the communication processing program, in synchronization with the system clock from the system clock generator 33; and outputs the transmission digital BB signal (the digital I signal and the digital Q signal) to the microprocessor signal processing unit interface 102 in synchronization with the system clock.

In the converting circuit of the microprocessor signal processing unit interface 102, the transmission digital BB signal (the digital I signal and the digital Q signal) from the microprocessor signal processing circuit (CPU) 26 is subjected to the signal level converting process and the parallel bit converting process in synchronization with the system clock from the system clock generator 33, and is then outputted to the microwave transmitting and receiving unit interface 101 in synchronization with the system clock.

In the converting circuit of the microwave transmitting and receiving unit interface 101, the transmission digital BB signal (the digital I signal and the digital Q signal) from the microprocessor signal processing unit interface 102 is subjected to the signal level converting process and the parallel bit converting process in synchronization with the system clock from the system clock generator 33, and is then outputted to the D/A converters 25-1 and 25-2 in synchronization with the system clock.

In the D/A converters 25-1 and 25-2, the transmission digital BB signal (the digital I signal and the digital Q signal) from the microwave transmitting and receiving unit interface 101 is converted into the transmission analog BB signal (the analog I signal and the analog Q signal) in synchronization with the clock from the clock generator 33, and is then outputted to the modulator (MOD) 23.

In the modulator (MOD) 23, the transmission analog BB signal (the analog I signal and the analog Q signal) from the D/A converters 25-1 and 25-2 are converted into the transmission IF signal, to be then outputted to the band-pass filter (BPF) 62.

In the data processing terminal system in the eighth embodiment as mentioned above, the system clock generator 33 of the microprocessor signal processing unit 16 outputs the system clock to the A/D converters 24-1 and 24-2, the D/A converters 25-1 and 25-2, the microwave transmitting and receiving unit interface 101, the microprocessor signal processing unit interface 102, and the microprocessor signal processing circuit (CPU) 26. For this reason, even if the microwave transmitting and receiving unit 15 and the microprocessor signal processing unit 16 are separated for some reason, the system clock is outputted to the microprocessor signal processing circuit (CPU) 26 through the self-oscillation of the system clock generator 33. Therefore, the microprocessor signal processing circuit (CPU) 26 operates at timing synchronous with the system clock from the system clock generator 33. Thus, in the data processing terminal system in the eighth embodiment, in addition to the effect of the seventh embodiment, the microprocessor signal processing circuit (CPU) 26 in the microprocessor signal processing unit 16 operates at all times, even if the microwave transmitting and receiving unit 15 and the microprocessor signal processing unit 16 are separated for the above reason.

Additionally, in the data processing terminal system in the eighth embodiment, the modulation and demodulation processing unit 88, at the time of the reception, converts the reception intermediate frequency signal (reception IF signal) as the reception modulation wave signal from the high-frequency processing unit 21, into the reception digital BB signal, and outputs the converted reception digital BB signal to the microprocessor signal processing unit 16; and at the time of the transmission, converts the transmission digital BB signal from the microprocessor signal processing unit 16 into the transmission intermediate frequency signal (transmission IF signal) as the transmission modulation wave signal, and outputs the converted transmission IF signal to the high-frequency processing unit 21. However, the present invention is not limited to the foregoing. It is also possible that the modulation and demodulation processing unit 88, at the time of the reception, converts the reception RF signal as the reception modulation wave signal from the high-frequency processing unit 21 into the reception digital BB signal, and outputs the converted reception digital BB signal to the microprocessor signal processing unit 16; and at the time of the transmission, converts the transmission digital BB signal from the microprocessor signal processing unit 16 into the transmission RF signal as the transmission modulation wave signal, and outputs the converted transmission RF signal to the high-frequency processing unit 21.

Figure 17:
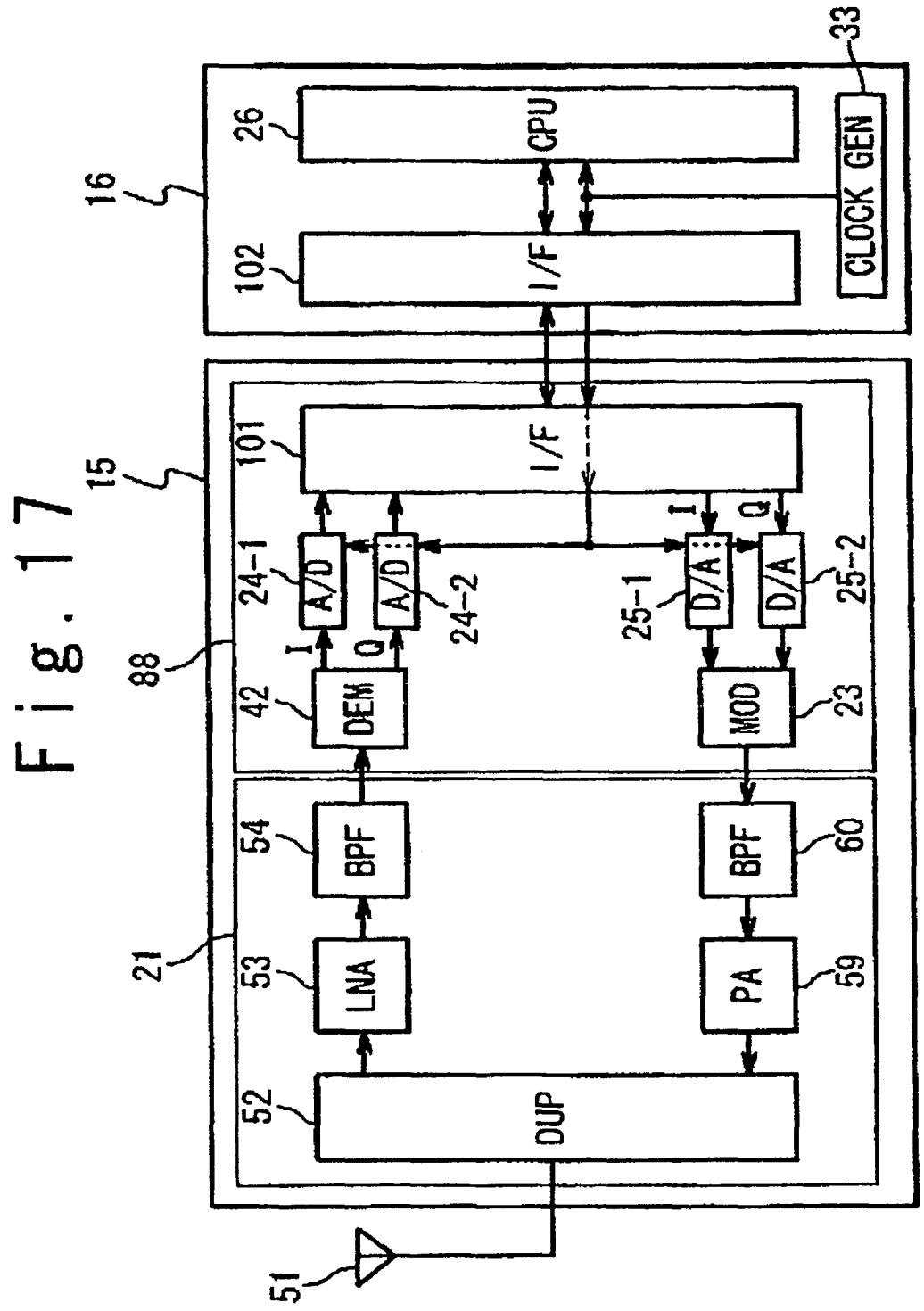
FIG. 17 shows a modification of the information processing terminal system according to the eighth embodiment of the present invention.

In this case, as a modification of the data processing terminal system in the eighth embodiment of the present invention, as shown in FIG. 17, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 42 converts the reception RF signal from the band-pass filter (BPF) 54 into the reception analog BB signal (the analog I signal and the analog Q signal), and outputs the converted reception analog BB signal to the A/D converters 24-1 and 24-2. The A/D converters 24-1 and 24-2, the D/A converters 25-1 and 25-2, the microwave transmitting and receiving unit interface 101, the microprocessor signal processing unit interface 102, and the microprocessor signal processing circuit (CPU) 26 operate in synchronization with the system clock from the system clock generator 33.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

Figure 22:
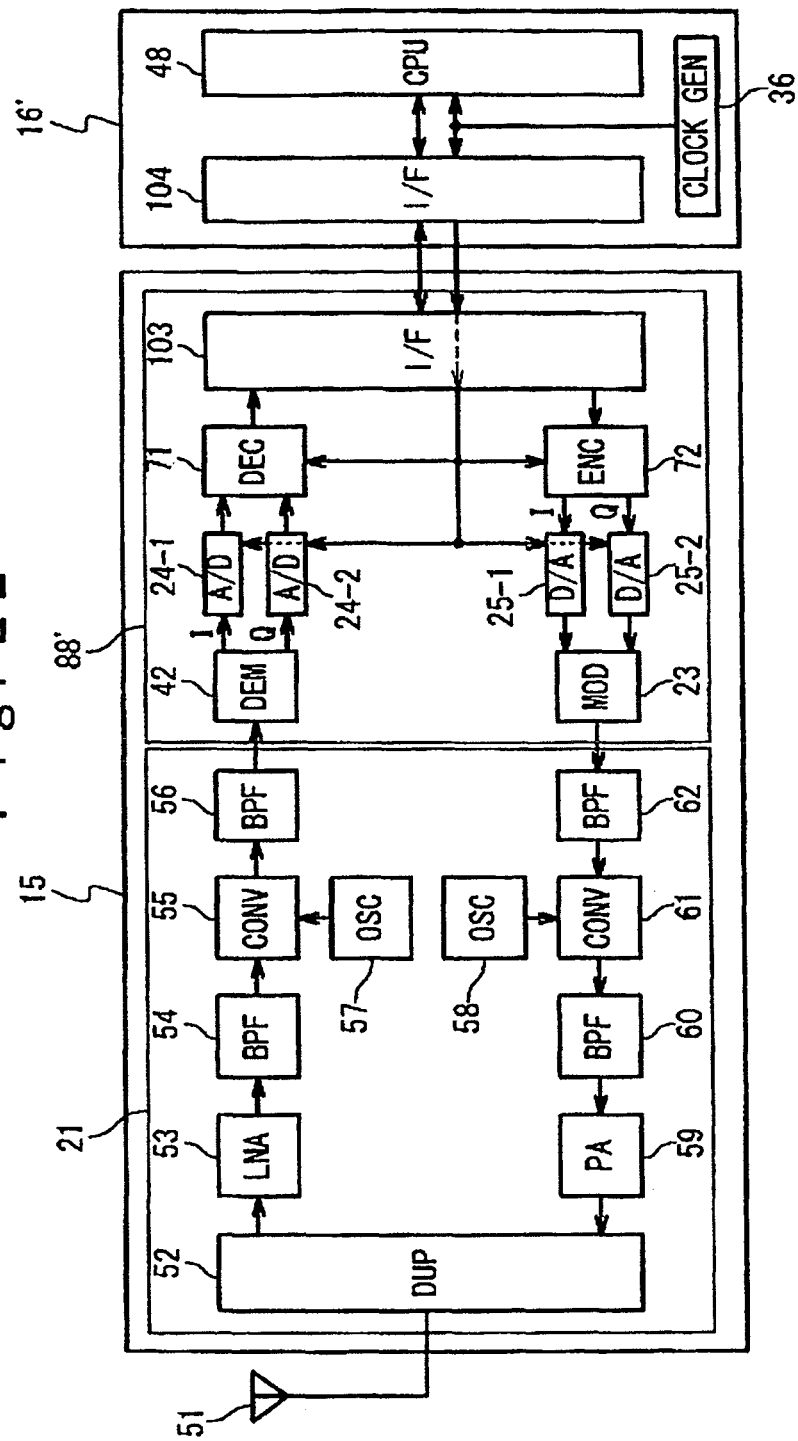
FIG. 22 shows a configuration of the information processing terminal system in which the information processing terminal system according to the eighth embodiment to the information processing terminal system according to the second embodiment.

Also, in the data processing terminal system in the eighth embodiment in the present invention, as shown in FIG. 22, the data processing terminal system in the eighth embodiment can be applied to the data processing terminal system in the second embodiment.

The data processing terminal system in the eighth embodiment has a microprocessor signal processing unit 16' instead of the microprocessor signal processing unit 16. The microprocessor signal processing unit 16' is provided with the microprocessor signal processing circuit (CPU) 48 in the second embodiment, a microprocessor signal processing unit interface 104, and the system clock generator 33 mentioned above. The microprocessor signal processing unit interface 104 has the same function as the microprocessor signal processing unit interface 47 mentioned above, but has different input and output of the system clock from the microprocessor signal processing unit interface 47 mentioned above.

In the data processing terminal system in the eighth embodiment, the microwave transmitting and receiving unit 9 is provided with a modulation and demodulation processing unit 88' instead of the modulation and demodulation processing unit 88. The modulation and demodulation processing unit 88' is provided with the demodulator (DEM) 42, the modulator (MOD) 23, and the baseband processing unit. The baseband processing unit is provided with the A/D converters 24-1 and 24-2, the D/A converters 25-1 and 25-2, the decoder (DEC) 71, the encoder (ENC) 72, and a microwave transmitting and receiving unit interface 103. The microwave transmitting and receiving unit interface 103 has the same function as the microwave transmitting and receiving unit interface 46 mentioned above, but has different input and output of the system clock from the microwave transmitting and receiving unit interface 46 mentioned above.

In this case, the system clock generator 33 generates a system clock through the self-oscillation, and outputs the generated system clock to the A/D converters 24-1 and 24-2, the D/A converters 25-1 and 25-2, the decoder (DEC) 71, the encoder (ENC) 72, the microwave transmitting and receiving unit interface 103, the microprocessor signal processing unit interface 104, and the microprocessor signal processing circuit (CPU) 48. The A/D converters 24-1 and 24-2, the D/A converters 25-1 and 25-2, the decoder (DEC) 71, the encoder (ENC) 72, the microwave transmitting and receiving unit interface 103, the microprocessor signal processing unit interface 104, and the microprocessor signal processing circuit (CPU) 48 operate in synchronization with the system clock from the system clock generator 33.

Also, in the data processing terminal system in the eighth embodiment, the modulation and demodulation processing unit 88', at the time of the reception, converts the reception intermediate frequency signal (reception IF signal) as the reception modulation wave signal from the high-frequency processing unit 21, into the reception data, and outputs the converted reception data to the microprocessor signal processing unit 16'; and at the time of the transmission, converts the transmission data from the microprocessor signal processing unit 16' into the transmission intermediate frequency signal (transmission IF signal) as the transmission modulation wave signal, and outputs the converted transmission IF signal to the high-frequency processing unit 21. However, the present invention is not limited to the foregoing. It is also possible that the modulation and demodulation processing unit 88', at the time of the reception, converts the reception RF signal as the reception modulation wave signal from the high-frequency processing unit 21 into the reception data, and outputs the converted reception data to the microprocessor signal processing unit 16'; and at the time of the transmission, converts the transmission data from the microprocessor signal processing unit 16' into the transmission RF signal as the transmission modulation wave signal, and outputs the converted transmission RF signal to the high-frequency processing unit 21.

Figure 27:
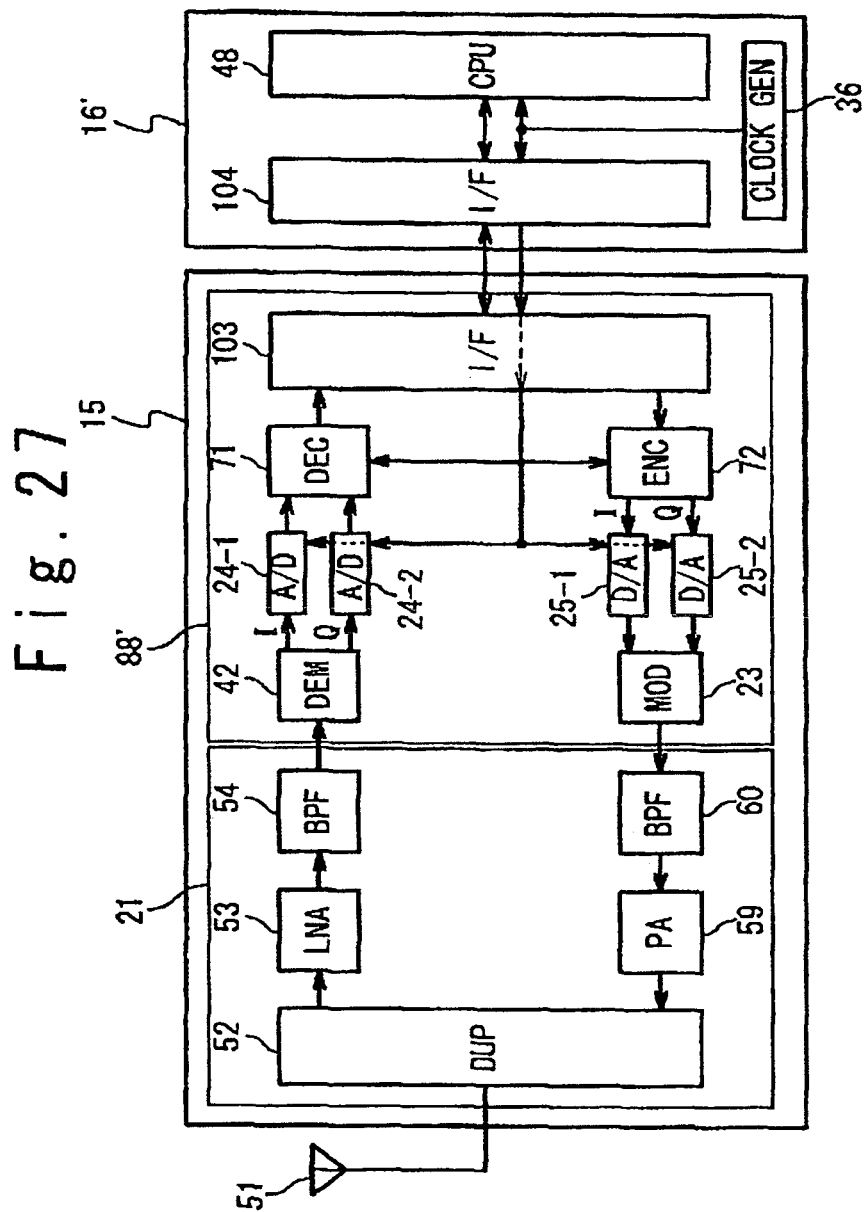
FIG. 27 shows a modification of the information processing terminal system according to the eighth embodiment of the present invention.

In this case, in a modification of the data processing terminal system in the eighth embodiment of the present invention, as shown in FIG. 27, the high-frequency processing unit 21 is provided with the duplexer (DUP) 52, the low noise amplifier (LNA) 53, the band-pass filters (BPF) 54 and 60, and the power amplifier (PA) 59.

The demodulator (DEM) 42 converts the reception RF signal from the band-pass filter (BPF) 54 into the reception analog BB signal (the analog I signal and the analog Q signal), and output the converted reception analog BB signal to the A/D converters 24-1 and 24-2. The A/D converters 24-1 and 24-2, the D/A converters 25-1 and 25-2, the decoder (DEC) 71, the encoder (ENC) 72, the microwave transmitting and receiving unit interface 103, the microprocessor signal processing unit interface 104, and the microprocessor signal processing circuit (CPU) 48 operate in synchronization with the system clock from the system clock generator 33.

The modulator (MOD) 23 converts the transmission analog BB signal (the analog I signal and the analog Q signal) into the transmission RF signal; and outputs the converted transmission RF signal to the power amplifier (PA) 59 through the band-pass filter (BPF) 60.

In the first to eighth embodiments and the modifications, the cases of the quadrature amplitude modulation signal (QAM modulation signal) have been described. However, the present invention may also be applied to case where digital data is transmitted in units of symbol including amplitude modulation, phase modulation, frequency modulation, and other modulation. Also, in the first to eighth embodiments, the present invention may be applied not only to wireless communication using microwaves but also to wire communication using light. In this case, a high-frequency RF signal can be replaced by a high-frequency signal as a modulation wave using light in the carrier wave.

According to the data processing terminal system in the first embodiment and the second embodiment of the present invention, downsizing can be realized. According to the data processing terminal system in the first embodiment and the second embodiment of the present invention, low power consumption can be realized. According to the data processing terminal system in the first embodiment and the second embodiment of the present invention, lowered generated heat can be realized. According to the data processing terminal system in the first embodiment and the second embodiment of the present invention, lowered costs can be realized. According to the data processing terminal system in the second embodiment of the present invention, reduction in throughput can be prevented. According to the data processing terminal system in the first embodiment and the second embodiment of the present invention, usefulness (portability, economical efficiency) is improved. According to the data processing terminal system in the third embodiment of the present invention, in addition to the effect of the first embodiment, the effect of the second embodiment is realized. According to the data processing terminal system in the fourth embodiment of the present invention, in addition to the effect of the third embodiment, a symbol clock synchronous with a reception symbol clock can be changed in accordance by use on a receiving side of the symbol clock. According to the data processing terminal system in the fifth embodiment of the present invention, in addition to the effect of the third embodiment, the microprocessor signal processing circuit (CPU) in the microprocessor signal processing unit operates at all times, even if the reception symbol clock is not outputted from the microwave transmitting and receiving unit to the microprocessor signal processing unit. According to the data processing terminal system in the sixth embodiment of the present invention, in addition to the effect of the fourth embodiment, the carrier-wave recovering circuit for recovering the carrier wave and the reception symbol clock recovering circuit for recovering the reception symbol clock can be simplified, and the phase noise of the recovered carrier wave and reception symbol clock can be improved. According to the data processing terminal system in the seventh embodiment of the present invention, in addition to the effect of the fourth embodiment, the reception symbol clock recovering circuit is unnecessary. According to the data processing terminal system in the eighth embodiment of the present invention, in addition to the effect of the seventh embodiment, the microprocessor signal processing circuit (CPU) in the microprocessor signal processing unit operates at all times, even when the microwave transmitting and receiving unit and the microprocessor signal processing unit are separated for some reasons.

The invention claimed is:

1. A radio system comprising:
    a radio unit; and
    a signal processing unit provided separately from said radio unit,
    wherein said radio unit comprises:
    a reception signal converting circuit configured to generate a reception digital signal from a reception radio signal;
    a clock generating circuit configured to generate a clock; and
    a first interface configured to operate in response to said clock, and
    said signal processing unit comprises:
    a second interface connected with said first interface and configured to operate in response to said clock; and a processing section configured to convert said reception digital signal supplied through said first and second interfaces.

2. The radio system according to claim 1, wherein said reception signal converting circuit operates in response to said clock.

3. The radio system according to claim 2, wherein said processing section operates in response to said clock.

4. The radio system according to claim 3, wherein said signal processing unit further comprises:
a supply circuit configured to supply a transmission digital signal to said radio unit through said second interface, and
said radio unit further comprises:
a transmission signal converting circuit configured to generate said a transmission radio signal from said transmission digital signal supplied through said first and second interfaces,
wherein said supply circuit operates in response to said clock.

5. The radio system according to claim 4, wherein said transmission signal converting circuit operates in response to said clock.

6. The radio system according to claim 1, wherein one of said first and second interfaces has a parallel bit converting function.

7. A radio system comprising:
a radio unit; and
a signal processing unit provided separately from said radio unit,
wherein said signal processing unit comprises:
a clock generating circuit configured to generate a clock,
said radio unit comprises:
a reception signal converting circuit configured to generate a reception digital signal from a reception radio signal; and
a first interface configured to operate in response to said clock, and
said signal processing unit further comprises:
a second interface connected with said first interface and configured to operate in response to said clock; and
a processing section configured to convert said reception digital signal supplied through said first and second interfaces.

8. The radio system according to claim 7, wherein said reception signal converting circuit operates in response to said clock.

9. The radio system according to claim 8, wherein said processing section operates in response to said clock.

10. The radio system according to claim 9, wherein said signal processing unit further comprises:
a supply circuit configured to supply a transmission digital signal to said radio unit through said second interface, and
said radio unit further comprises:
a transmission signal converting circuit configured to generate said a transmission radio signal from said transmission digital signal supplied through said first and second interfaces,
wherein said supply circuit operates in response to said clock.

11. The radio system according to claim 10, wherein said transmission signal converting circuit operates in response to said clock.

12. The radio system according to claim 7, wherein one of said first and second interfaces has a parallel bit converting function.

13. A radio system comprising:
a radio unit; and
a signal processing unit provided separately from said radio unit,
wherein said radio unit comprises:
reception signal converting means for generating a reception digital signal from a reception radio signal;
clock generating means for generating a clock; and
first interface means for operating in response to said clock, and
said signal processing unit comprises:
second interface means connected with said first interface means for operating in response to said clock; and
demodulation processing means for converting said reception digital signal supplied through said first and second interface means.

14. A radio system comprising:
a radio unit; and
a signal processing unit provided separately from said radio unit,
wherein said signal processing unit comprises: clock generating means for generating a clock, said radio unit comprises:
reception signal converting means for generating a reception digital signal from a reception radio signal; and
first interface means for operating in response to said clock, and
said signal processing unit further comprises: a second interface means connected with said first interface means, for operating in response to said clock; and
processing means for converting said reception digital signal supplied through said first and second interface means.

* * * * *